United States Patent [19]

Shimazu et al.

[11] Patent Number: 5,724,454
[45] Date of Patent: Mar. 3, 1998

[54] METHOD AND APPARATUS FOR CORRECTING A MULTI-TONE IMAGE

[75] Inventors: Shigeaki Shimazu; Souichi Kimura, both of Kyoto, Japan

[73] Assignee: Dainippon Screen Mfg. Co., Ltd., Kyoto, Japan

[21] Appl. No.: 573,599

[22] Filed: Dec. 7, 1995

Related U.S. Application Data

[63] Continuation of Ser. No. 202,243, Feb. 25, 1994, abandoned.

[30] Foreign Application Priority Data

Mar. 3, 1993 [JP] Japan ................................. 5-069261

[51] Int. Cl.$^6$ .............................. G06K 9/42; G06K 9/44; G06K 9/54; G06K 9/60
[52] U.S. Cl. ................. 382/258; 382/302; 382/270; 382/199; 358/455
[58] Field of Search ................................. 382/258, 276, 382/277, 302, 270, 199, 257; 395/134; 358/455

[56] References Cited

U.S. PATENT DOCUMENTS

| | | | |
|---|---|---|---|
| 4,520,505 | 5/1985 | Yamamoto et al. | 382/55 |
| 4,698,843 | 10/1987 | Burt et al. | 382/55 |
| 4,837,877 | 6/1989 | Shirasaka et al. | 382/55 |
| 4,855,933 | 8/1989 | Kondo | 382/55 |
| 4,956,869 | 9/1990 | Miyatake et al. | 382/22 |
| 5,131,058 | 7/1992 | Ting et al. | 382/22 |
| 5,181,255 | 1/1993 | Bloomberg | 382/55 |
| 5,341,224 | 8/1994 | Eschbach | 358/455 |
| 5,355,233 | 10/1994 | Okamoto | 358/455 |
| 5,355,421 | 10/1994 | Koyama | 382/266 |

FOREIGN PATENT DOCUMENTS

| | | | |
|---|---|---|---|
| 0 458 308 A2 | 11/1991 | European Pat. Off. | G06K 9/44 |
| 2201562 | 9/1988 | United Kingdom | H04N 1/41 |

OTHER PUBLICATIONS

Frank Yeong–Chyang Shih et al., "Threshold Decomposition of Gray–Scale Morphology into Binary Morphology", IEEE Transactions on Pattern Analysis and Machine Intelligence, vol. 11, No. 1, Jan. 1989, pp. 31–42.

Long–Wen Chang et al., "A New Fast Implementation of Cellular Array for Morphological Filters, Stack Filters and Median Filters," Proceedings of the SPIE, Applications of Digtial Image Processing XV, vol. 1771, 21–24 Jul. 1992, San Diego, CA, pp. 322–333.

An Improved Algorithm For The Sequential Extraction of Boundaries From A Raster Scan, by David Capson, Computer Vision, Graphics, and Image Processing, vol. 28, pp. 109–125, 1984.

Automatic Extraction and Removing of Linear Objects in Pictures, Nippon Print Bulletin vol. 29–5(1992), pp. 474–479 (No Translation).

Primary Examiner—Leo Boudreau
Assistant Examiner—Bipin Shalwala
Attorney, Agent, or Firm—Lowe, Price, LeBlanc & Becker

[57] ABSTRACT

The multi-tone image data is converted to a plural sets of binary image data with a plurality of density levels as threshold values. Contraction and expansion are sequentially executed on the plural sets of binary image data to correct a contour of each binary image. The plural sets of the processed binary image data are re-converted to multi-tone image data which represents a multi-tone image having a corrected contour.

30 Claims, 52 Drawing Sheets

Fig. 3 (A) ORIGINAL IMAGE WITH NO DEFECT
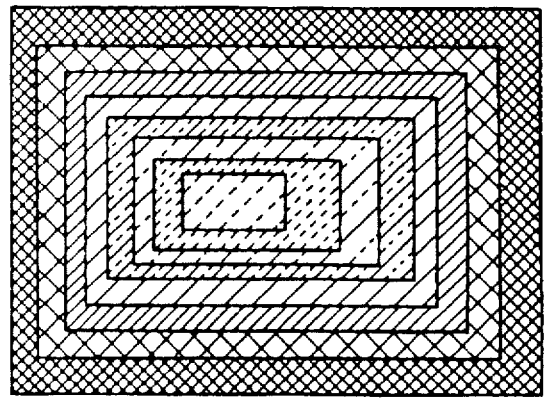
Fig. 3 (B) ORIGINAL IMAGE WITH DEFECT
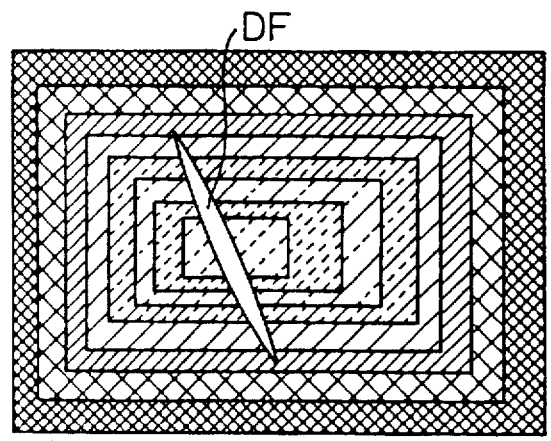
Fig. 3 (C)
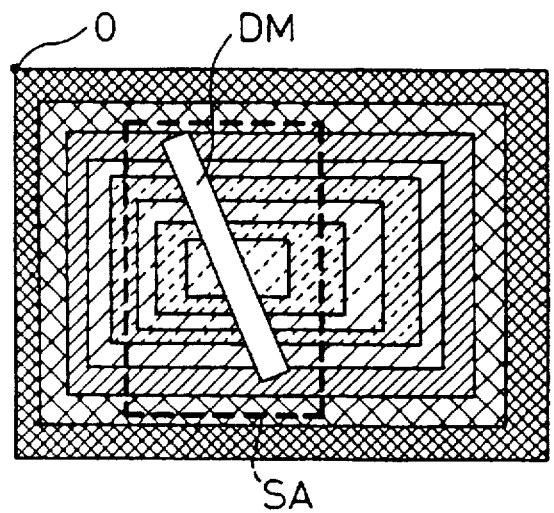

MULTI-TONE IMAGE

BINARY IMAGE

Fig. 7(A)   Fig. 7(B)   Fig. 7(C)
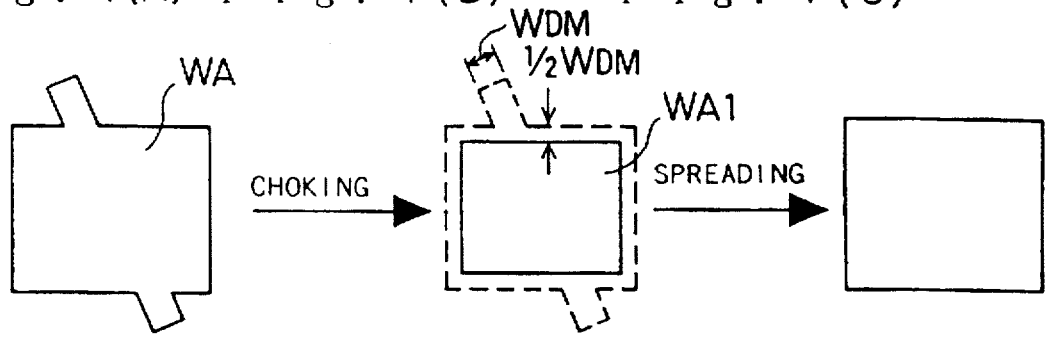
Fig. 7(D) BEFORE CHOKING AND SPREADING PROCESS
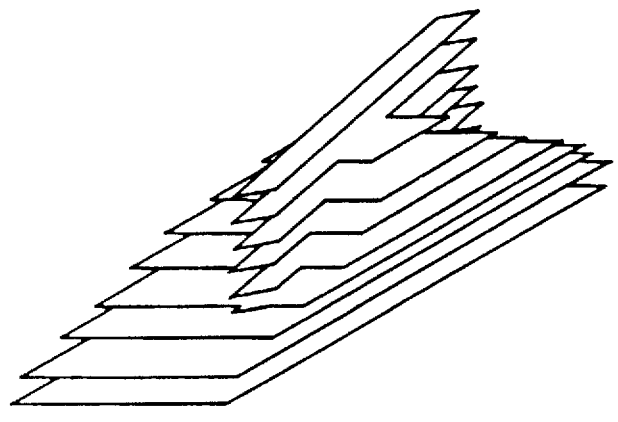
Fig. 7(E) AFTER CHOKING AND SPREADING PROCESS
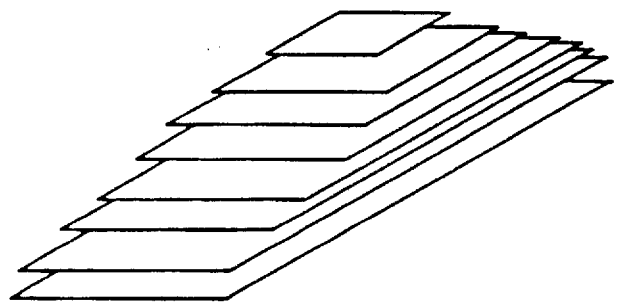

BINARY IMAGES

MULTI-TONE IMAGE

MULTI-TONE IMAGE

DEFECT DATA

Fig. 10(A)   Fig. 10(B)   Fig. 10(C)
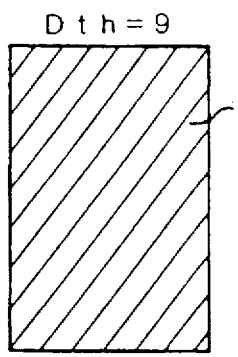 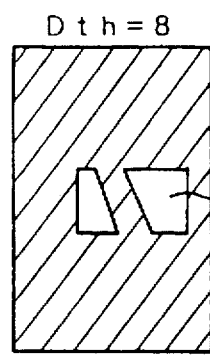 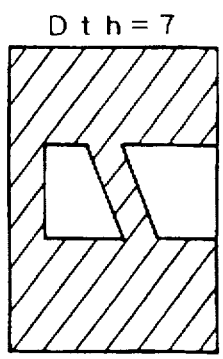
Fig. 10(D)   Fig. 10(E)   Fig. 10(F)
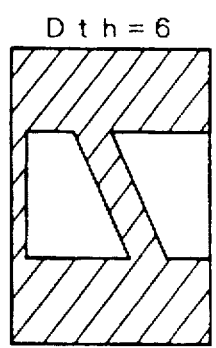 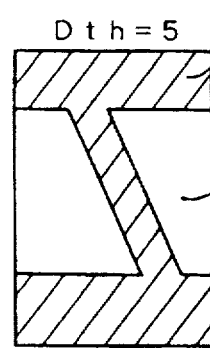 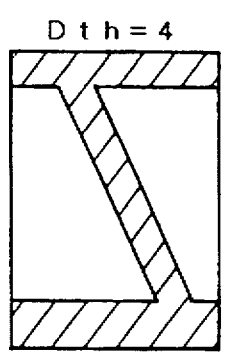
Fig. 10(G)   Fig. 10(H)   Fig. 10(I)
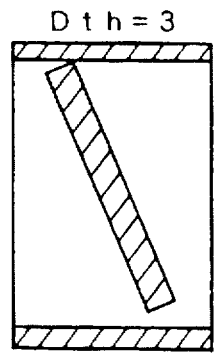 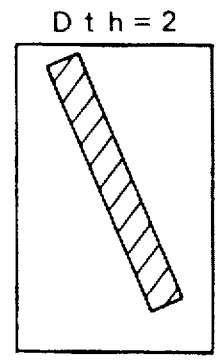 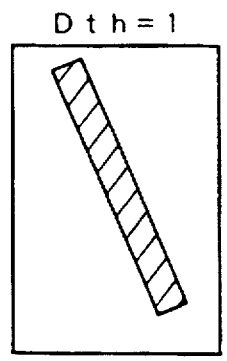

PIXEL-CENTERED CONTOUR

PIXEL-BOUNDARY CONTOUR (Yb↘ Xb↗)   (Xb↗Yb↗)   (Yb↗Xb↘)   (Xb↘Yb↘)

COORDINATES OF INTERMEDIATE POINT AFTER CONTRACTION

| Fig. | UP-DOWN OF COORDINATE | | COORDINATE OF INTERMEDIATE POINT AFTER CONTRACTION |
|---|---|---|---|
| | V1 | V2 | |
| 16 (A1) | Yb↓ | Xb↑ | (Xm+WDM/2, Ym+WDM/2) |
| 16 (A2) | Xb↑ | Yb↑ | (Xm−WDM/2, Ym+WDM/2) |
| 16 (A3) | Yb↑ | Xb↓ | (Xm−WDM/2, Ym−WDM/2) |
| 16 (A4) | Xb↓ | Yb↓ | (Xm+WDM/2, Ym−WDM/2) |
| 16 (B1) | Xb↓ | Yb↑ | (Xm−WDM/2, Ym−WDM/2) |
| 16 (B2) | Yb↓ | Xb↓ | (Xm+WDM/2, Ym−WDM/2) |
| 16 (B3) | Xb↑ | Yb↓ | (Xm+WDM/2, Ym+WDM/2) |
| 16 (B4) | Yb↑ | Xb↑ | (Xb−WDM/2, Yb+WDM/2) |

Fig. 19

COORDINATES OF INTERMEDIATE POINT AFTER EXPANSION

| Fig. | UP-DOWN OF COORDINATE | | COORDINATE OF INTERMEDIATE POINT AFTER EXPANSION |
|---|---|---|---|
| | V1 | V2 | |
| − | Yb↓ | Xb↑ | (Xm−WDM/2, Ym−WDM/2) |
| − | Xb↑ | Yb↑ | (Xm+WDM/2, Ym−WDM/2) |
| − | Yb↑ | Xb↓ | (Xm+WDM/2, Ym+WDM/2) |
| − | Xb↓ | Yb↓ | (Xm−WDM/2, Ym+WDM/2) |
| − | Xb↓ | Yb↑ | (Xm+WDM/2, Ym+WDM/2) |
| − | Yb↓ | Xb↓ | (Xm−WDM/2, Ym+WDM/2) |
| − | Xb↑ | Yb↓ | (Xm−WDM/2, Ym−WDM/2) |
| − | Yb↑ | Xb↑ | (Xb+WDM/2, Yb−WDM/2) |

INITIALIZATION

HORIZONTAL EDGE BUFFER 52

0 #1 #2 #3 #4 (BOUNDARY COORDINATE Xb)
| 0 | 0 | 0 | 0 | 0 |

PAINT BUFFER 54

0 1 2 3 (PIXEL COORDINATE Xp)

Fig.21(c) Fig.21(d) CONTOUR VECTOR SEQUENCE

Fig.21(e) IMAGE DATA BUFFER 20

VERTICAL SORT BUFFER 56

TERMINAL POINT MEMORY 58

| ADDRESS | Xs | Xe | LINK |
|---|---|---|---|
| *0 | | | NC |
| *1 | | | NC |
| *2 | | | NC |
| *3 | | | NC |
| *4 | | | NC |

VERTICAL SORTING
Fig.22(a)
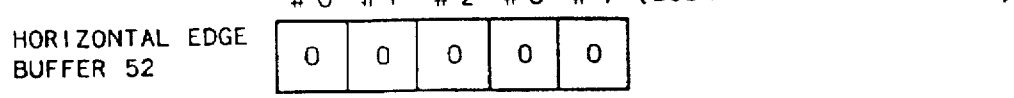
HORIZONTAL EDGE BUFFER 52 — #0 #1 #2 #3 #4 (BOUNDARY COORDINATE Xb)
Fig.22(b)
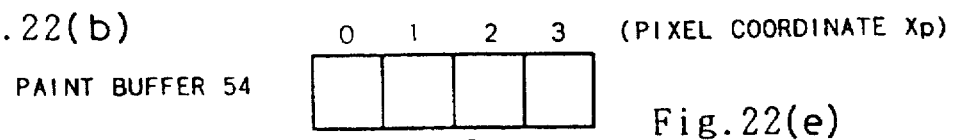
PAINT BUFFER 54 — 0 1 2 3 (PIXEL COORDINATE Xp)

VERTICAL SORT BUFFER 56
Fig.22(d) CONTOUR VECTOR SEQUENCE 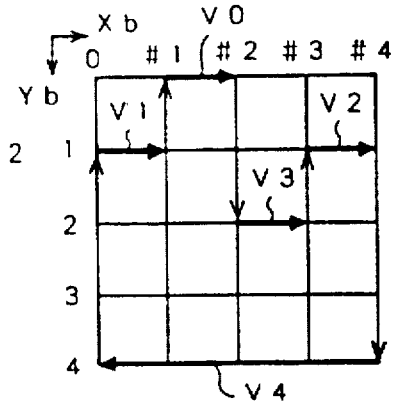
Fig.22(e) IMAGE DATA BUFFER 20 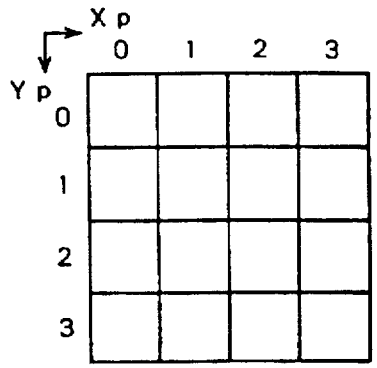
Fig.22(f) TERMINAL POINT MEMORY 58
| VECTOR | ADDRESS | Xs | Xe | LINK |
|---|---|---|---|---|
| V0: | *0 | #1 | #2 | NC |
| V1: | *1 | #0 | #1 | NC |
| V2: | *2 | #3 | #4 | NC →*1 |
| V3: | *3 | | | NC |
| V4: | *4 | | | NC |

AT COMPLETION OF VERTICAL SORTING
Fig.23(a)
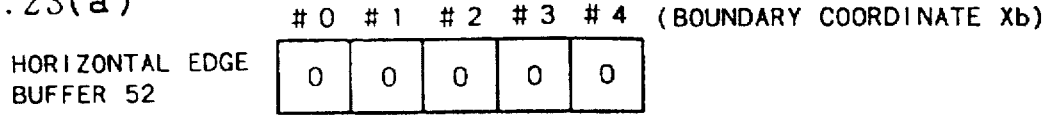
Fig.23(b)
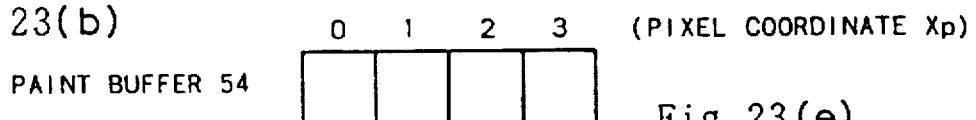
Fig.23(c)
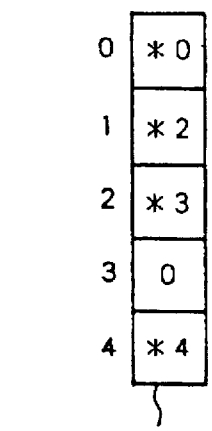
VERTICAL SORT BUFFER 56
Fig.23(d) CONTOUR VECTOR SEQUENCE
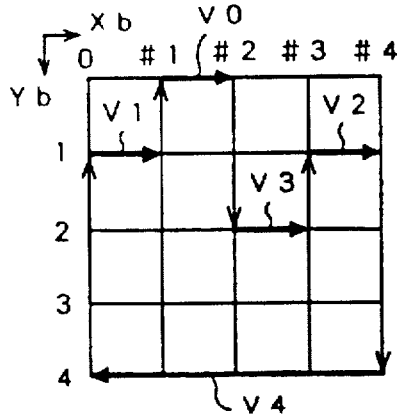
Fig.23(e) IMAGE DATA BUFFER 20
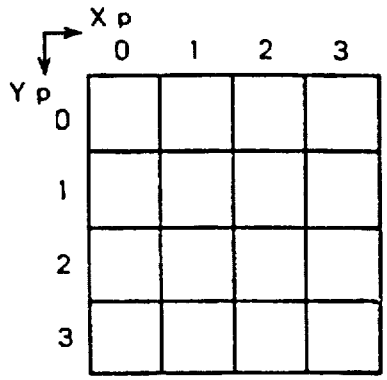
Fig.23(f)
TERMINAL POINT MEMORY 58
| VECTOR | ADDRESS | Xs | Xe | LINK |
|---|---|---|---|---|
| V0: | *0 | #1 | #2 | NC |
| V1: | *1 | #0 | #1 | NC |
| V2: | *2 | #3 | #4 | *1 |
| V3: | *3 | #2 | #3 | NC |
| V4: | *4 | #4 | #0 | NC | n = 1
Fig.25(a)  HORIZONTAL EDGE BUFFER 52  #0 #1 #2 #3 #4 (BOUNDARY COORDINATE Xb)
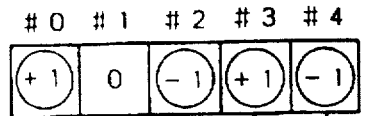
Fig.25(b)  PAINT BUFFER 54  0 1 2 3 (PIXEL COORDINATE Xp)
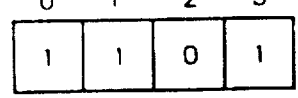
COPY
Fig.25(c) VERTICAL SORT BUFFER 56
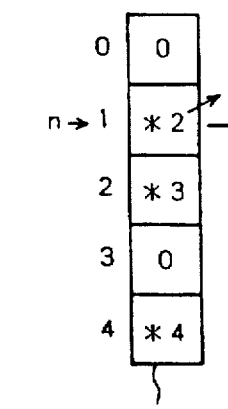
Fig.25(d) CONTOUR VECTOR SEQUENCE
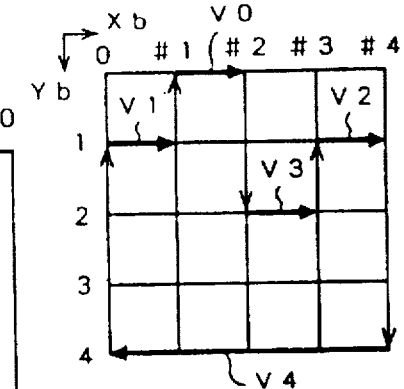
Fig.25(e) IMAGE DATA BUFFER 20
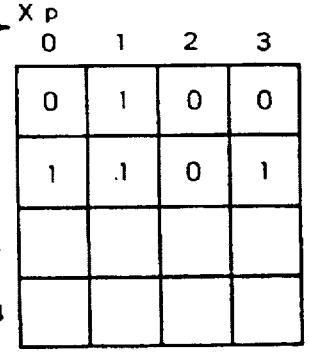
Fig.25(f) TERMINAL POINT MEMORY 58
| ADDRESS | Xs | Xe | LINK |
|---|---|---|---|
| *0 | #1 | #2 | NC |
| *1 | #0 | #1 | NC |
| *2 | #3 | #4 | *1 |
| *3 | #2 | #3 | NC |
| *4 | #4 | #0 | NC |
TO HORIZONTAL EDGE BUFFER 52 n = 2
Fig. 26(a) #0 #1 #2 #3 #4 (BOUNDARY COORDINATE Xb)
HORIZONTAL EDGE BUFFER 52
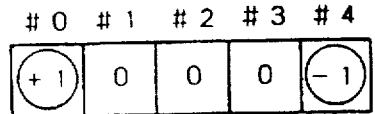
Fig. 26(b) 0 1 2 3 (PIXEL COORDINATE Xp)
PAINT BUFFER 54
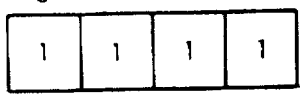
COPY
Fig. 26(c)
VERTICAL SORT BUFFER 56
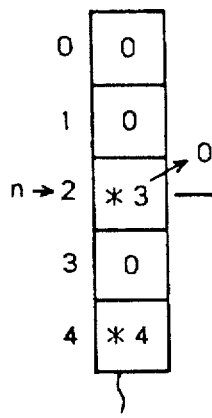
Fig. 26(d) CONTOUR VECTOR SEQUENCE
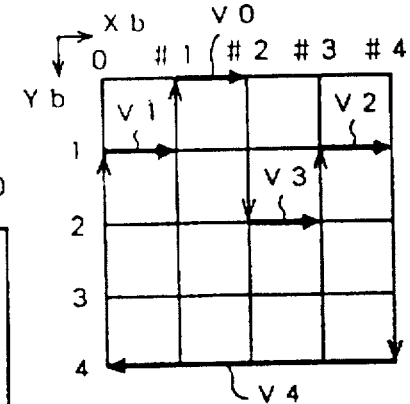
Fig. 26(e) IMAGE DATA BUFFER 20
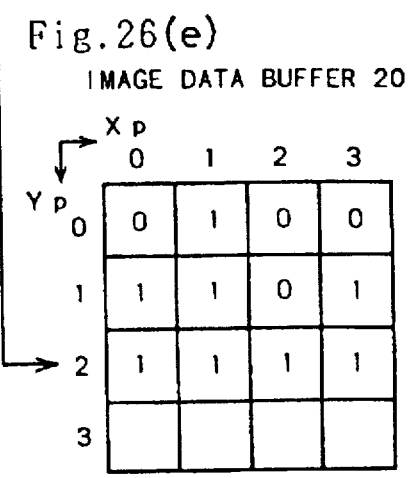
Fig. 26(f)
TERMINAL POINT MEMORY 58
| ADDRESS | Xs | Xe | LINK |
|---|---|---|---|
| *0 | #1 | #2 | NC |
| *1 | #0 | #1 | NC |
| *2 | #3 | #4 | *1 |
| *3 | #2 | #3 | NC |
| *4 | #4 | #0 | NC |
TO HORIZONTAL EDGE BUFFER 52

$n = 3$
Fig.27(a) HORIZONTAL EDGE BUFFER 52
0 #1 #2 #3 #4 (BOUNDARY COORDINATE Xb)
| (+1) | 0 | 0 | 0 | (-1) |
Fig.27(b) PAINT BUFFER 54
0 1 2 3 (PIXEL COORDINATE Xp)
| 1 | 1 | 1 | 1 | COPY
Fig.27(c) VERTICAL SORT BUFFER 56
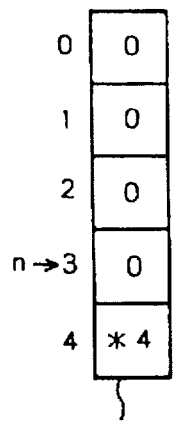
Fig.27(d) CONTOUR VECTOR SEQUENCE
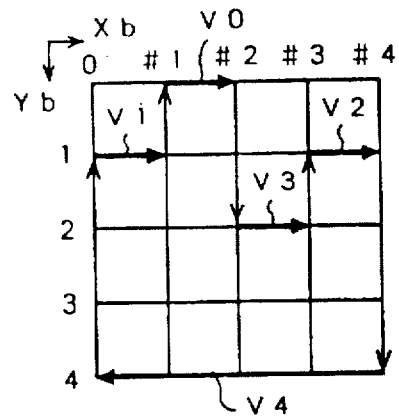
Fig.27(e) IMAGE DATA BUFFER 20
| Xp | 0 | 1 | 2 | 3 |
|---|---|---|---|---|
| Yp 0 | 0 | 1 | 0 | 0 |
| 1 | 1 | 1 | 0 | 1 |
| 2 | 1 | 1 | 1 | 1 |
| 3 | 1 | 1 | 1 | 1 |
Fig.27(f) TERMINAL POINT MEMORY 58
| ADDRESS | Xs | Xe | LINK |
|---|---|---|---|
| *0 | #1 | #2 | NC |
| *1 | #0 | #1 | NC |
| *2 | #3 | #4 | *1 |
| *3 | #2 | #3 | NC |
| *4 | #4 | #0 | NC |

Fig.28(a)
HORIZONTAL EDGE BUFFER 52
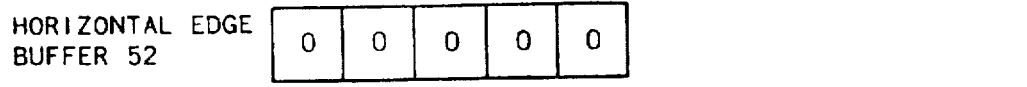
Fig.28(b)
PAINT BUFFER 54
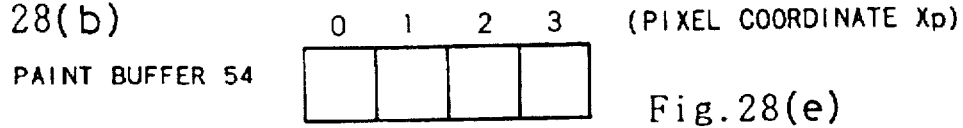
Fig.28(c)
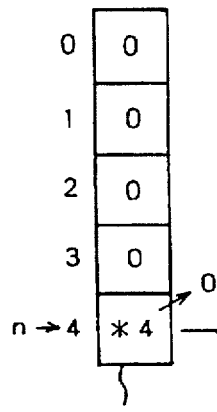
VERTICAL SORT BUFFER 56
Fig.28(d) CONTOUR VECTOR SEQUENCE
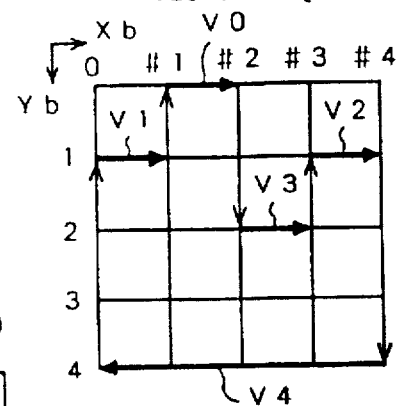
Fig.28(e) IMAGE DATA BUFFER 20
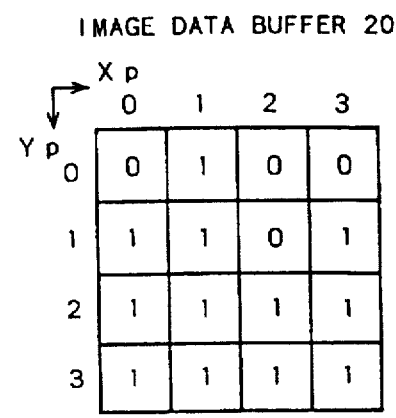
Fig.28(f)
TERMINAL POINT MEMORY 58
| ADDRESS | Xs | Xe | LINK |
|---|---|---|---|
| *0 | #1 | #2 | NC |
| *1 | #0 | #1 | NC |
| *2 | #3 | #4 | *1 |
| *3 | #2 | #3 | NC |
| *4 | #4 | #0 | NC |
TO HORIZONTAL EDGE BUFFER 52

CONTOUR VECTORS

VECTOR DATA MEMORY 6

| ADDRESS | COORDINATE DATA | LINK |
|---|---|---|
| *1 | (1, 1) | *2 |
| *2 | (3, 1) | NC |
| *3 | | |
| *4 | | |
| *5 | | |
| *6 | | |

WORKING BUFFER 5

| | #0 | #1 | #2 | #3 | #4 |
|---|---|---|---|---|---|
| prev. | — | — | — | #1 | — |

| | #0 | #1 | #2 | #3 | #4 |
|---|---|---|---|---|---|
| column | — | *1 | — | *2 | — |

| | #0 | #1 | #2 | #3 | #4 |
|---|---|---|---|---|---|
| next | — | #3 | — | — | — |

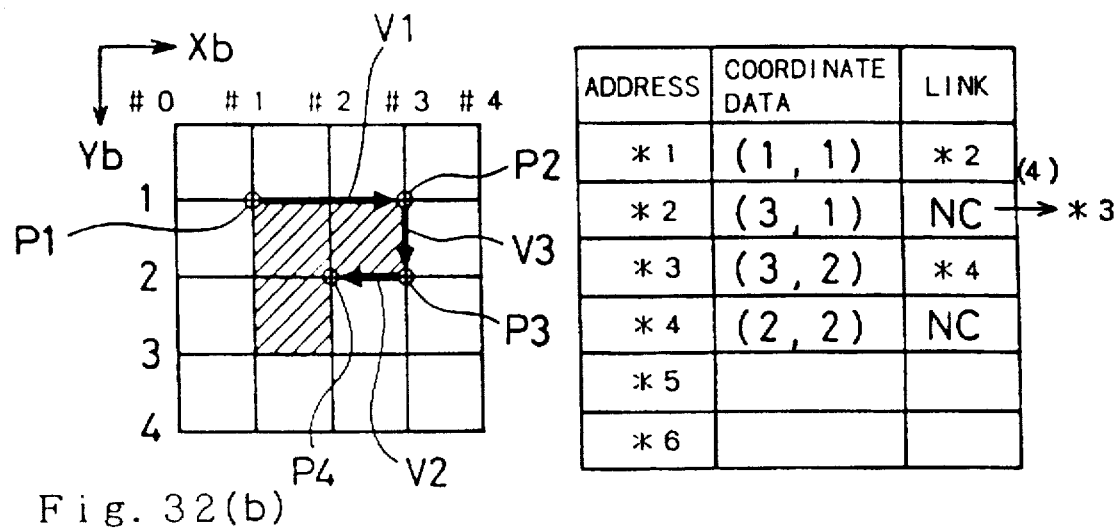

Fig. 33(a)
CONTOUR VECTORS
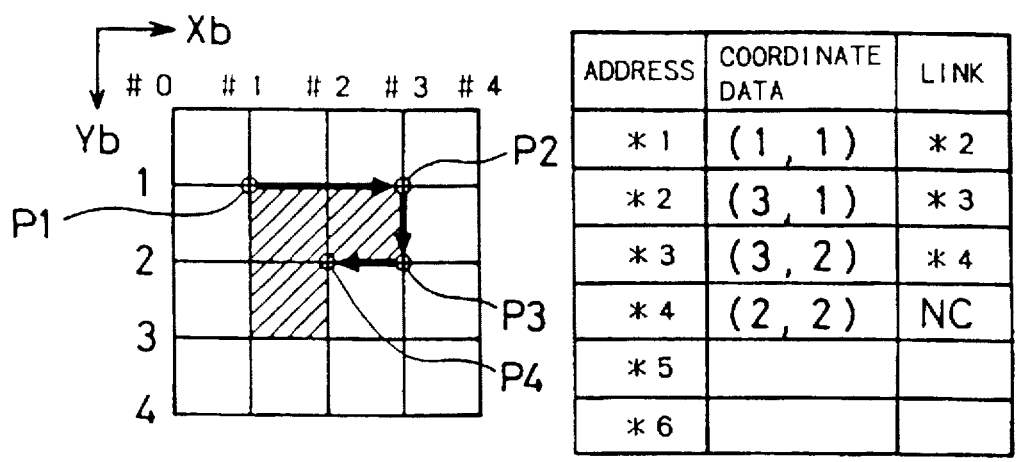
Fig. 33(c)
VECTOR DATA MEMORY 6
Fig. 33(b)
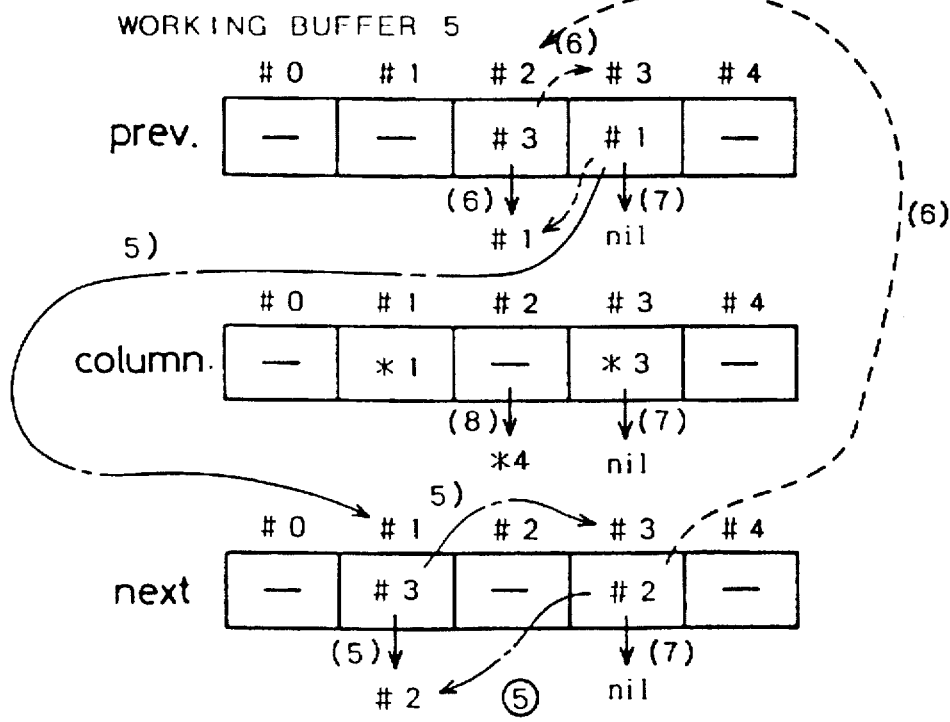

Fig. 34(a)
CONTOUR VECTORS
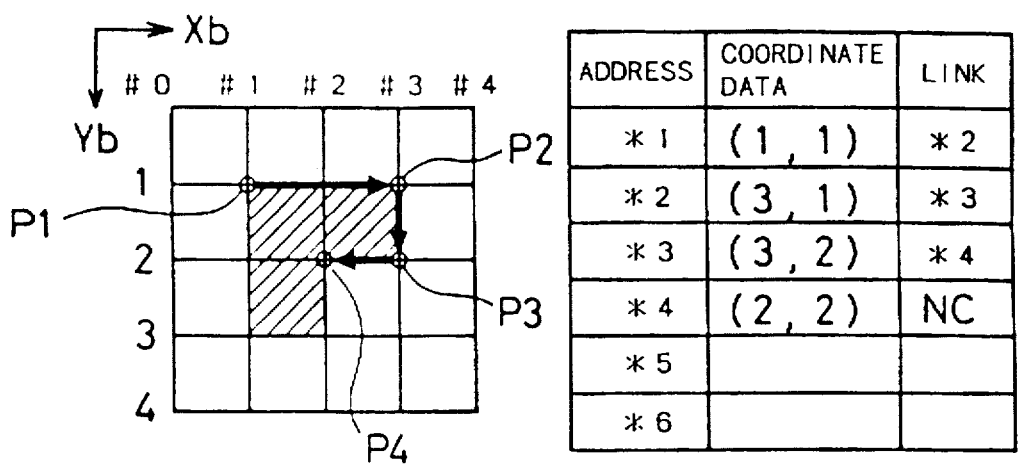
Fig. 34(c)
VECTOR DATA MEMORY 6
Fig. 34(b)
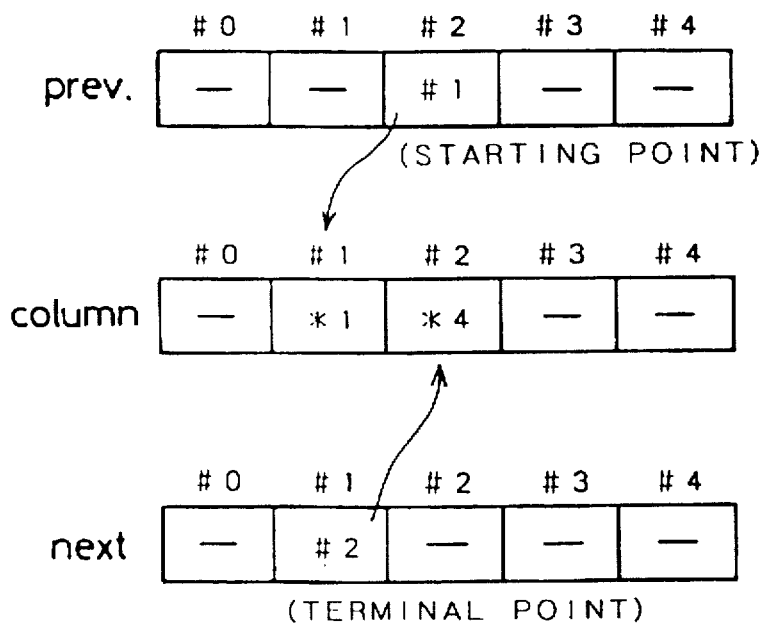

CONTOUR VECTORS

VECTOR DATA MEMORY 6

| ADDRESS | COORDINATE DATA | LINK |
|---|---|---|
| *1 | (1, 1) | *2 |
| *2 | (3, 1) | *3 |
| *3 | (3, 2) | *4  (9) |
| *4 | (2, 2) | NC →*5 |
| *5 | (2, 3) | *6  (11) |
| *6 | (1, 3) | NC →*1 |

WORKING BUFFER 5 prev.

| #0 | #1 | #2 | #3 | #4 |
|---|---|---|---|---|
| — | — | #1 | — | — |

(10) ↓
2 column

| #0 | #1 | #2 | #3 | #4 |
|---|---|---|---|---|
| — | *1 | *4 | — | — | next

| #0 | #1 | #2 | #3 | #4 |
|---|---|---|---|---|
| — | #2 | — | — | — |

(10) ↓
1

Fig. 40(a)
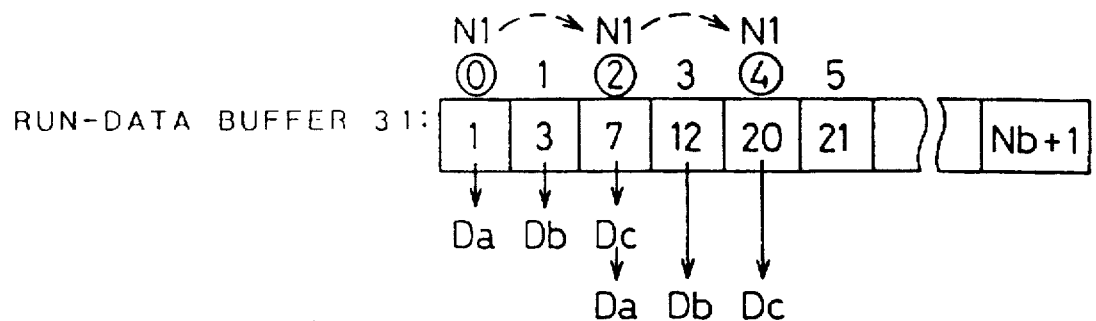
Fig. 40(b)
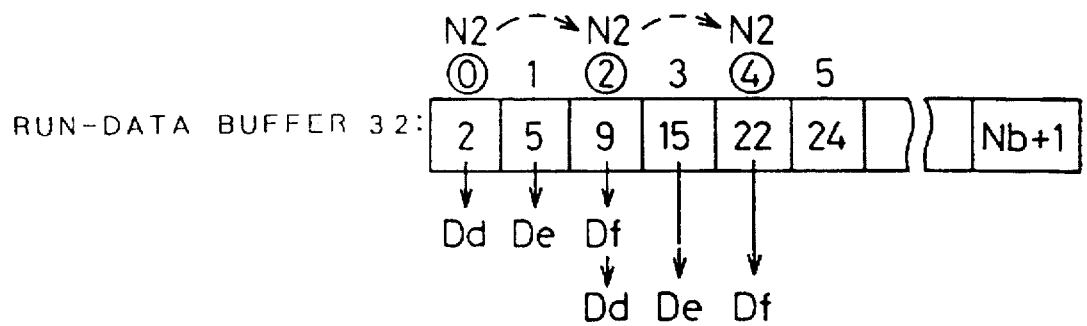
Fig. 40(c)
WORK DATA:
| Da | 1 |
| Db | 3 |
| Dc | 7 |
| Dd | 2 |
| De | 5 |
| Df | 9 |

CONDITION 3 [ Da ≦ De and Dd ≦ Db ] and
CONDITION 4 [ Db ≦ Df and De ≦ Dc ]

CONDITION 3 [ Da ≦ De and Dd ≦ Db ] and
CONDITION 4 [ Db ≦ Df and De ≦ Dc ]

CONDITION 3 [ $Da \leq De$ and $Dd \leq Db$ ] and
CONDITION 5 [ $Df < Db$ ]

CONDITION 3 [ $Da \leq De$ and $Dd \leq Db$ ] and
CONDITION 6 [ $Dc < De$ ]

Fig. 47(a)
CONTOUR VECTORS
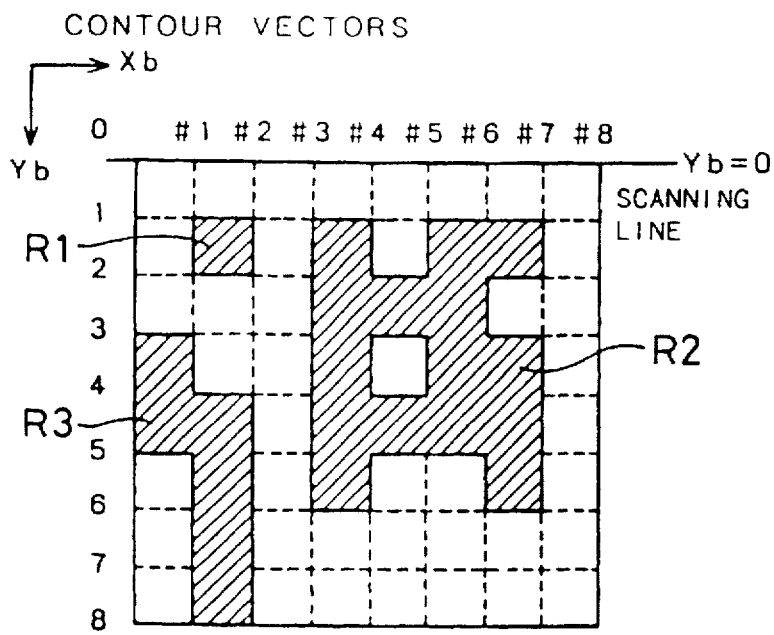
Fig. 47(b)
RUN-DATA BUFFER 3
(31)
(32)
Fig. 47(c)
WORKING BUFFER 5
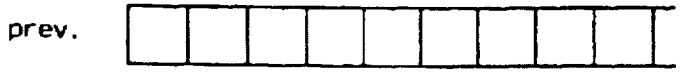
prev.
clum
next
Fig. 47(d)
VECTOR DATA MEMORY 6
| ADDRESS | COORDINATE | LINK |
|---|---|---|
| *1 | | |
| *2 | | |
| *3 | | |
| *4 | | |
| *5 | | |
| *6 | | |
| *7 | | |
| *8 | | |
| *9 | | |
| *10 | | |
| *11 | | |
| *12 | | |
| *13 | | |
| *14 | | |
| *15 | | |
| *16 | | |
| *17 | | |
| *18 | | |
| *19 | | |
| *20 | | |
| *21 | | |
| *22 | | |
| *23 | | |
| *24 | | |
| *25 | | |
| *26 | | |
| *27 | | |
| *28 | | |
| *29 | | |
| *30 | | |
| *31 | | |
| *32 | | |
(Xb,Yb)  CLOSED LOOP VECTOR DATA
☐ VACANCY

CONTOUR VECTORS

RUN-DATA BUFFER 3

(31) | e | | | | | | | | | |

(32) | 1 | 2 | 3 | 4 | 5 | 7 | e | | | |

WORKING BUFFER 5

|      | #0  | #1 | #2 | #3 | #4 | #5 | #6  | #7 | #8  |
|------|-----|----|----|----|----|----|-----|----|-----|
| prev.| -   | -  | #1 | -  | #3 | -  | -   | #5 | -   |
| clum | nil | *1 | *2 | *3 | *4 | *5 | nil | *6 | nil |
| next | -   | #2 | -  | #4 | -  | #7 | -   | -  | -   |

VECTOR DATA MEMORY 6

| ADDRESS | COORDINATE | LINK |
|---------|------------|------|
| *1      | ( 1, 1 )   | *2   |
| *2      | ( 2, 1 )   | nc   |
| *3      | ( 3, 1 )   | *4   |
| *4      | ( 4, 1 )   | nc   |
| *5      | ( 5, 1 )   | *6   |
| *6      | ( 7, 1 )   | nc   |
| *7      |            |      |
| *8      |            |      |
| *9      |            |      |
| *10     |            |      |
| *11     |            |      |
| *12     |            |      |
| *13     |            |      |
| *14     |            |      |
| *15     |            |      |
| *16     |            |      |
| *17     |            |      |
| *18     |            |      |
| *19     |            |      |
| *20     |            |      |
| *21     |            |      |
| *22     |            |      |
| *23     |            |      |
| *24     |            |      |
| *25     |            |      |
| *26     |            |      |
| *27     |            |      |
| *28     |            |      |
| *29     |            |      |
| *30     |            |      |
| *31     |            |      |
| *32     |            |      |

(Xb, Yb) CLOSED LOOP VECTOR DATA

☐ VACANCY

RUN-DATA BUFFER 3

(31) | 1 | 2 | 3 | 4 | 5 | 7 | e | | | |

(32) | 3 | 6 | e | | | | | | | |

WORKING BUFFER 5

| | #0 | #1 | #2 | #3 | #4 | #5 | #6 | #7 | #8 |
|---|---|---|---|---|---|---|---|---|---|
| prev. | - | - | - | - | - | - | 3 | - | - |
| clum | nil | nil | nil | *3 | nil | nil | *12 | nil | nil |
| next | - | - | - | 6 | - | - | - | - | - |

VECTOR DATA MEMORY 6

| ADDRESS | COORDINATE | LINK |
|---|---|---|
| *1 | ( 1, 1 ) | *2 |
| *2 | ( 2, 1 ) | *7 |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 | ( 2, 2 ) | *8 |
| *8 | ( 1, 2 ) | *1 |
| *9 | ( 4, 2 ) | *10 |
| *10 | ( 5, 2 ) | *5 |
| *11 | ( 7, 2 ) | *12 |
| *12 | ( 6, 2 ) | nc |
| *13 | | |
| *14 | | |
| *15 | | |
| *16 | | |
| *17 | | |
| *18 | | |
| *19 | | |
| *20 | | |
| *21 | | |
| *22 | | |
| *23 | | |
| *24 | | |
| *25 | | |
| *26 | | |
| *27 | | |
| *28 | | |
| *29 | | |
| *30 | | |
| *31 | | |
| *32 | | |

(Xb,Yb) CLOSED LOOP VECTOR DATA

☐ VACANCY

CONTOUR VECTORS

RUN-DATA BUFFER 3

(31) | 3 | 6 | e | | | | | | | |

(32) | 0 | 1 | 3 | 4 | 5 | 7 | e | | | |

WORKING BUFFER 5

|  | #0 | #1 | #2 | #3 | #4 | #5 | #6 | #7 | #8 |
|---|---|---|---|---|---|---|---|---|---|
| prev. | - | 0 | - | - | 5 | - | - | 3 | - |
| clum | *13 | *14 | nil | *3 | *16 | *15 | nil | *18 | nil |
| next | 1 | - | - | 7 | - | 4 | - | - | - |

VECTOR DATA MEMORY 6

| ADDRESS | COORDINATE | LINK |
|---|---|---|
| *1 | | |
| *2 | | |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 | | |
| *8 | | |
| *9 | ( 4, 2 ) | *10 |
| *10 | ( 5, 2 ) | *5 |
| *11 | ( 7, 2 ) | *12 |
| *12 | ( 6, 2 ) | *17 |
| *13 | ( 0, 3 ) | *14 |
| *14 | ( 1, 3 ) | nc |
| *15 | ( 5, 3 ) | *16 |
| *16 | ( 4, 3 ) | nc |
| *17 | ( 6, 3 ) | *18 |
| *18 | ( 7, 3 ) | nc |
| *19 | | |
| *20 | | |
| *21 | | |
| *22 | | |
| *23 | | |
| *24 | | |
| *25 | | |
| *26 | | |
| *27 | | |
| *28 | | |
| *29 | | |
| *30 | | |
| *31 | | |
| *32 | | |

(Xb, Yb)  CLOSED LOOP VECTOR DATA

☐  VACANCY

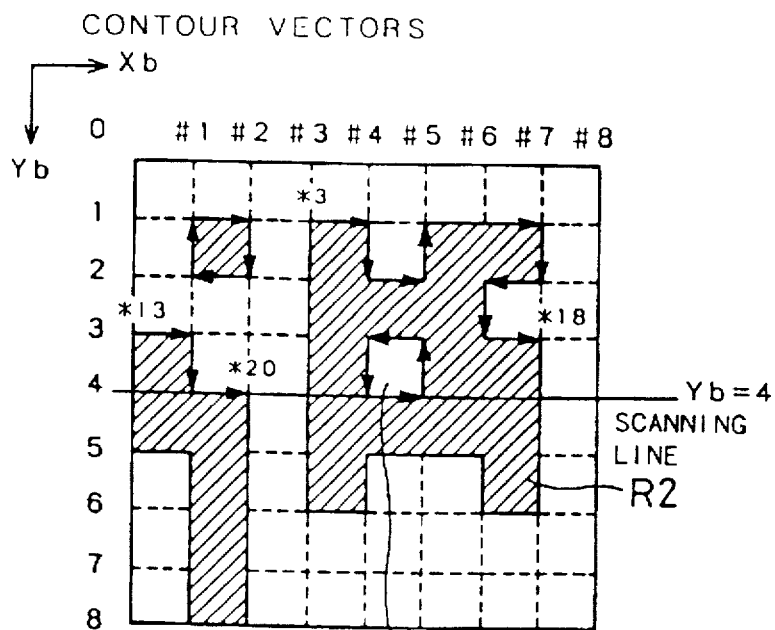
Fig. 51(a) CONTOUR VECTORS
Fig. 51(b) RUN-DATA BUFFER 3
Fig. 51(c) WORKING BUFFER 5
Fig. 51(d) VECTOR DATA MEMORY 6
| ADDRESS | COORDINATE | LINK |
|---|---|---|
| *1 | | |
| *2 | | |
| *3 | ( 3 , 1 ) | *4 |
| *4 | ( 4 , 1 ) | *9 |
| *5 | ( 5 , 1 ) | *6 |
| *6 | ( 7 , 1 ) | *11 |
| *7 | | |
| *8 | | |
| *9 | ( 4 , 2 ) | *10 |
| *10 | ( 5 , 2 ) | *5 |
| *11 | ( 7 , 2 ) | *12 |
| *12 | ( 6 , 2 ) | *17 |
| *13 | ( 0 , 3 ) | *14 |
| *14 | ( 1 , 3 ) | *19 |
| *15 | ( 5 , 3 ) | *16 |
| *16 | ( 4 , 3 ) | *21 |
| *17 | ( 6 , 3 ) | *18 |
| *18 | ( 7 , 3 ) | nc |
| *19 | ( 1 , 4 ) | *20 |
| *20 | ( 2 , 4 ) | nc |
| *21 | ( 4 , 4 ) | *22 |
| *22 | ( 5 , 4 ) | *15 |
| *23 | | |
| *24 | | |
| *25 | | |
| *26 | | |
| *27 | | |
| *28 | | |
| *29 | | |
| *30 | | |
| *31 | | |
| *32 | | |
(Xb,Yb) CLOSED LOOP VECTOR DATA
☐ VACANCY

CONTOUR VECTORS

RUN-DATA BUFFER 3

(31) | 0 | 2 | 3 | 7 | e | | | | |

(32) | 1 | 2 | 3 | 4 | 6 | 7 | e | | |

WORKING BUFFER 5

0 #1 #2 #3 #4 #5 #6 #7 #8 prev. | - | - | 1 | - | 6 | - | - | 3 | - | clum | nil | *23 | *20 | *3 | *26 | nil | *25 | *18 | nil | next | - | 2 | - | 7 | - | - | 4 | - | - |

VECTOR DATA MEMORY 6

| ADDRESS | COORDINATE | LINK |
|---|---|---|
| *1 | | |
| *2 | | |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 | | |
| *8 | | |
| *9 | ( 4, 2 ) | *10 |
| *10 | ( 5, 2 ) | *5 |
| *11 | ( 7, 2 ) | *12 |
| *12 | ( 6, 2 ) | *17 |
| *13 | ( 0, 3 ) | *14 |
| *14 | ( 1, 3 ) | *19 |
| *15 | | |
| *16 | | |
| *17 | ( 6, 3 ) | *18 |
| *18 | ( 7, 3 ) | nc |
| *19 | ( 1, 4 ) | *20 |
| *20 | ( 2, 4 ) | nc |
| *21 | | |
| *22 | | |
| *23 | ( 1, 5 ) | *24 |
| *24 | ( 0, 5 ) | *13 |
| *25 | ( 6, 5 ) | *26 |
| *26 | ( 4, 5 ) | nc |
| *27 | | |
| *28 | | |
| *29 | | |
| *30 | | |
| *31 | | |
| *32 | | |

| (Xb,Yb) | CLOSED LOOP VECTOR DATA |

| | VACANCY |

RUN-DATA BUFFER 3

(31) | 1 | 2 | 3 | 4 | 6 | 7 | e | | | |

(32) | 1 | 2 | e | | | | | | | |

WORKING BUFFER 5

|  | #0 | #1 | #2 | #3 | #4 | #5 | #6 | #7 | #8 |
|---|---|---|---|---|---|---|---|---|---|
| prev. | - | - | 1 | - | - | - | - | - | - |
| clum | nil | *23 | *20 | nil | nil | nil | nil | nil | nil |
| next | - | 2 | - | - | - | - | - | - | - |

VECTOR DATA MEMORY 6

| ADDRESS | COORDINATE | LINK |
|---|---|---|
| *1 | | |
| *2 | | |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 | | |
| *8 | | |
| *9 | ( 4, 2 ) | *10 |
| *10 | ( 5, 2 ) | *5 |
| *11 | ( 7, 2 ) | *12 |
| *12 | ( 6, 2 ) | *17 |
| *13 | ( 0, 3 ) | *14 |
| *14 | ( 1, 3 ) | *19 |
| *15 | | |
| *16 | | |
| *17 | ( 6, 3 ) | *18 |
| *18 | ( 7, 3 ) | *29 |
| *19 | ( 1, 4 ) | *20 |
| *20 | ( 2, 4 ) | nc |
| *21 | | |
| *22 | | |
| *23 | ( 1, 5 ) | *24 |
| *24 | ( 0, 5 ) | *13 |
| *25 | ( 6, 5 ) | *26 |
| *26 | ( 4, 5 ) | *27 |
| *27 | ( 4, 6 ) | *28 |
| *28 | ( 3, 6 ) | *3 |
| *29 | ( 7, 6 ) | *30 |
| *30 | ( 6, 6 ) | *25 |
| *31 | | |
| *32 | | |

(Xb,Yb) CLOSED LOOP VECTOR DATA

☐ VACANCY

CONTOUR VECTORS

Yb=7 SCANNING LINE

RUN-DATA BUFFER 3

(31) | 1 | 2 | e | | | | | | | |

(32) | 1 | 2 | e | | | | | | | |

WORKING BUFFER 5

| | #0 | #1 | #2 | #3 | #4 | #5 | #6 | #7 | #8 |
|---|---|---|---|---|---|---|---|---|---|
| prev. | - | - | 1 | - | - | - | - | - | - |
| clum | nil | *23 | *20 | nil | nil | nil | nil | nil | nil |
| next | - | 2 | - | - | - | - | - | - | - |

VECTOR DATA MEMORY 6

| ADDRESS | COORDINATE | LINK |
|---|---|---|
| *1 | | |
| *2 | | |
| *3 | | |
| *4 | | |
| *5 | | |
| *6 | | |
| *7 | | |
| *8 | | |
| *9 | | |
| *10 | | |
| *11 | | |
| *12 | | |
| *13 | (0, 3) | *14 |
| *14 | (1, 3) | *19 |
| *15 | | |
| *16 | | |
| *17 | | |
| *18 | | |
| *19 | (1, 4) | *20 |
| *20 | (2, 4) | nc |
| *21 | | |
| *22 | | |
| *23 | (1, 5) | *24 |
| *24 | (0, 5) | *13 |
| *25 | | |
| *26 | | |
| *27 | | |
| *28 | | |
| *29 | | |
| *30 | | |
| *31 | | |
| *32 | | |

(Xb, Yb) CLOSED LOOP VECTOR DATA

☐ VACANCY

RUN-DATA BUFFER 3

WORKING BUFFER 5

VECTOR DATA MEMORY 6

| ADDRESS | COORDINATE | LINK |
|---|---|---|
| *1 | | |
| *2 | | |
| *3 | | |
| *4 | | |
| *5 | | |
| *6 | | |
| *7 | | |
| *8 | | |
| *9 | | |
| *10 | | |
| *11 | | |
| *12 | | |
| *13 | ( 0, 3 ) | *14 |
| *14 | ( 1, 3 ) | *19 |
| *15 | | |
| *16 | | |
| *17 | | |
| *18 | | |
| *19 | ( 1, 4 ) | *20 |
| *20 | ( 2, 4 ) | *31 |
| *21 | | |
| *22 | | |
| *23 | ( 1, 5 ) | *24 |
| *24 | ( 0, 5 ) | *13 |
| *25 | | |
| *26 | | |
| *27 | | |
| *28 | | |
| *29 | | |
| *30 | | |
| *31 | ( 2, 8 ) | *32 |
| *32 | ( 1, 8 ) | *23 |

(Xb,Yb) CLOSED LOOP VECTOR DATA

VACANCY

Fig. 56

VECTOR DATA
MEMORY 6

| ADDRESS | COORDINATE | LINK |
|---|---|---|
| *1 |  | *2 |
| *2 |  | *7 |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 |  | *8 |
| *8 |  | *19 |
| *9 | ( 4, 2 ) | *10 |
| *10 | ( 5, 2 ) | *5 |
| *11 | ( 7, 2 ) | *12 |
| *12 | ( 6, 2 ) | *17 |
| *13 | ( 0, 3 ) | *14 |
| *14 | ( 1, 3 ) | nc |
| *15 | ( 5, 3 ) | *16 |
| *16 | ( 4, 3 ) | nc |
| *17 | ( 6, 3 ) | *18 |
| *18 | ( 7, 3 ) | nc |
| *19 |  |  |
| *20 |  |  |
| *21 |  |  |
| *22 |  |  |
| *23 |  |  |
| *24 |  |  |
| *25 |  |  |
| *26 |  |  |
| *27 |  |  |
| *28 |  |  |
| *29 |  |  |
| *30 |  |  |
| *31 |  |  |
| *32 |  |  |

BAP → *1

METHOD AND APPARATUS FOR CORRECTING A MULTI-TONE IMAGE

This application is a continuation of application Ser. No. 08/202,243 filed Feb. 25, 1994 now abandoned.

BACKGROUND OF THE INVENTION

1. Field of the Invention

The present invention relates to a method and apparatus for correcting a multi-tone image.

2. Description of the Related Art

In a prepress process, an original image such as a color photograph is scanned by a color scanner to produce image data. However, the image captured by a scanner often includes defects due to rubbing-off blemishes and dust on the original, electric noise, and stains in an optical system. In a conventional pre-press system, an operator checks a multi-tone image displayed on a CRT, and if a detect is found, pixel density data in a normal image area is copied to the defective area to eliminate the defect.

There are some other kinds of image correction process other than the elimination of defects, such as retouching. Recently, a colored image shown on a display can be electronically retouched with a light pen. In such electronic retouching, a multi-tone image may be corrected by copying image data of a normal image area to a target image area requiring correction.

The correction process is highly time-consuming because it requires an operator to specify a position of each pixel to be corrected and a position of an image area to be copied at the position of the pixel.

SUMMARY OF THE INVENTION

An object of the present invention is to provide a novel method and an apparatus for readily correcting a multi-tone image.

The present invention is directed to an apparatus for correcting a multi-tone image. The apparatus comprises: a first memory for storing first multi-tone image data representing image density for every pixel in the multi-tone image; binarization means for comparing the first multi-tone image data with each of a plurality of threshold values to thereby produce a plurality of first binary image data representing a plurality of binary images; a second memory for storing the plurality of first binary image data; contour correction means for correcting a contour of each of the plurality of binary images by executing contraction and expansion on each of the plurality of first binary image data, to thereby produce a plurality of second binary image data; and restoration means for re-converting the plurality of second binary image data to second multi-tone image data representing a corrected multi-tone image.

A plurality of first binary image data generated by the binarization means represent contours of a plurality of density levels in an original multi-tone image, and contraction and expansion on the plurality of first binary image data reduces unevenness or irregularities of the contours. The second multi-tone image obtained by the restoration means represent corrected contours consequently.

In a preferred embodiment, a contraction width in the contraction is equal to an expansion width in the expansion.

The apparatus further comprises: specification means for specifying a mask area to be corrected in the multi-tone image; and data correction means for extracting an image data segment representing the mask area of the corrected multi-tone image from the second multi-tone image data, and replacing a corresponding data segment of the first multi-tone image data with the image data segment to produce third multi-tone image data representing a corrected multi-tone image.

These additional means effectively prevent deterioration of the picture quality which may be observed if contraction and expansion are executed on the whole image.

Preferably, the contraction width is at least half of a width of the mask area.

The apparatus further comprises: means for changing a data value of the first multi-tone image in the mask area to a predetermined value. The predetermined value represents one of a white area and a black area.

According to an aspect of the present invention, the restoration means comprises: means for adding the plurality of second binary image data with respect to each pixel to thereby produce the second multi-tone image data.

Alternatively, the restoration means comprises: means for replacing a data value of one in each of the plurality of second binary image data by respective one of the plurality of threshold values, which is used in producing respective one of the plurality of first binary image data, to produce a plurality of intermediate image data, and over-writing the plurality of intermediate image data one after another in order of the plurality of threshold values to thereby produce the second multi-tone image data.

The present invention is also directed to an apparatus for correcting a multi-tone image comprising: first memory for storing first multi-tone image data representing image density for every pixel in the multi-tone image; binarization means for comparing the first multi-tone image data with each of a plurality of threshold values to thereby produce a plurality of binary image data representing a plurality of binary images; a second memory for storing the plurality of binary image data; contour extraction means for converting the plurality of binary image data to a plurality of first contour vector data each of which represents a contour of the plurality of binary images; contour correction means for correcting a contour of each of the plurality of binary images by executing contraction and expansion on each of the plurality of first contour vector data, to thereby produce a plurality of second contour vector data; and restoration means for re-converting the plurality of second contour vector data to second multi-tone image data representing a corrected multi-tone image.

The contour correction means can execute contraction and expansion of the contour vector data in a relatively high speed to reduce unevenness or irregularities of the contours.

The restoration means comprises: means for assigning respective one of the plurality of threshold values, which is used in producing respective one of the plurality of first binary image data, to every pixel in an area at a predetermined side of the contour represented by each of the plurality of second contour vector data to thereby produce a plurality of intermediate image data, and over-writing the plurality of intermediate image data one after another in order of the plurality of threshold values to thereby produce the second multi-tone image data.

The present invention is further directed to a method of correcting a multi-tone image comprising the steps of: (a) providing first multi-tone image data representing image density for every pixel in the multi-tone image; (b) comparing the first multi-tone image data with each of a plurality of threshold values to thereby produce a plurality of first binary image data representing a plurality of binary images;

(c) correcting a contour of each of the plurality of binary images by executing contraction and expansion on each of the plurality of first binary image data, to thereby produce a plurality of second binary image data; and (d) re-converting the plurality of second binary image data to second multi-tone image data representing a corrected multi-tone image.

The present invention is still further directed to a method of correcting a multi-tone image comprising the steps of: (a) providing first multi-tone image data representing image density for every pixel in the multi-tone image; (b) comparing the first multi-tone image data with each of a plurality of threshold values to thereby produce a plurality of binary image data representing a plurality of binary images; (c) converting the plurality of binary image data to a plurality of first contour vector data each of which represents a contour of the plurality of binary images; (d) correcting a contour of each of the plurality of binary images by executing contraction and expansion on each of the plurality of first contour vector data, to thereby produce a plurality of second contour vector data; and (e) re-converting the plurality of second contour vector data to second multi-tone image data representing a corrected multi-tone image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3(A) through 3(C) are plan views showing original images with and without a defect and an image with a defect mask;

FIGS. 7(A) through 7(E) show choking and spreading of a binary image;

FIGS. 10(A) through 10(I) respectively show binary images obtained through binarization of multi-tone images;

FIG. 17 shows a table indicating coordinates of intermediate point of two adjacent vectors after contraction;

FIG. 19 shows a table indicating coordinates of intermediate point of two adjacent vectors after expansion;

FIGS. 21(a) through 21(f) show a process of converting contour vector data back to binary image data;

FIGS. 22(a) through 22(f) show a process of converting contour vector data back to binary image data;

FIGS. 23(a) through 23(f) show a process of converting contour vector data back to binary image data;

FIGS. 25(a) through 25(f) show a process of converting contour vector data back to binary image data;

FIGS. 26(a) through 26(f) show a process of converting contour vector data back to binary image data;

FIGS. 27(a) through 27(f) show a process of converting contour vector data back to binary image data;

FIGS. 28(a) through 28(f) show a process of converting contour vector data back to binary image data;

FIGS. 32(a) through 32(c) show linkage process subsequent to detection of each contour vector;

FIGS. 33(a) through 33(c) show linkage process subsequent to detection of each contour vector;

FIGS. 34(a) through 34(c) show linkage process subsequent to detection of each contour vector;

FIGS. 40(a) through 40(c) are explanatory views illustrating data used in the vector detection;

FIGS. 47(a) through 47(d) show a process for extracting contour vectors along each boundary scanning line;

FIGS. 51(a) through 51(d) show a process for extracting contour vectors along each boundary scanning line;

FIG. 56 shows a method of managing vacant spaces in the vector data memory unit.

DESCRIPTION OF THE PREFERRED EMBODIMENT

Figure 1:
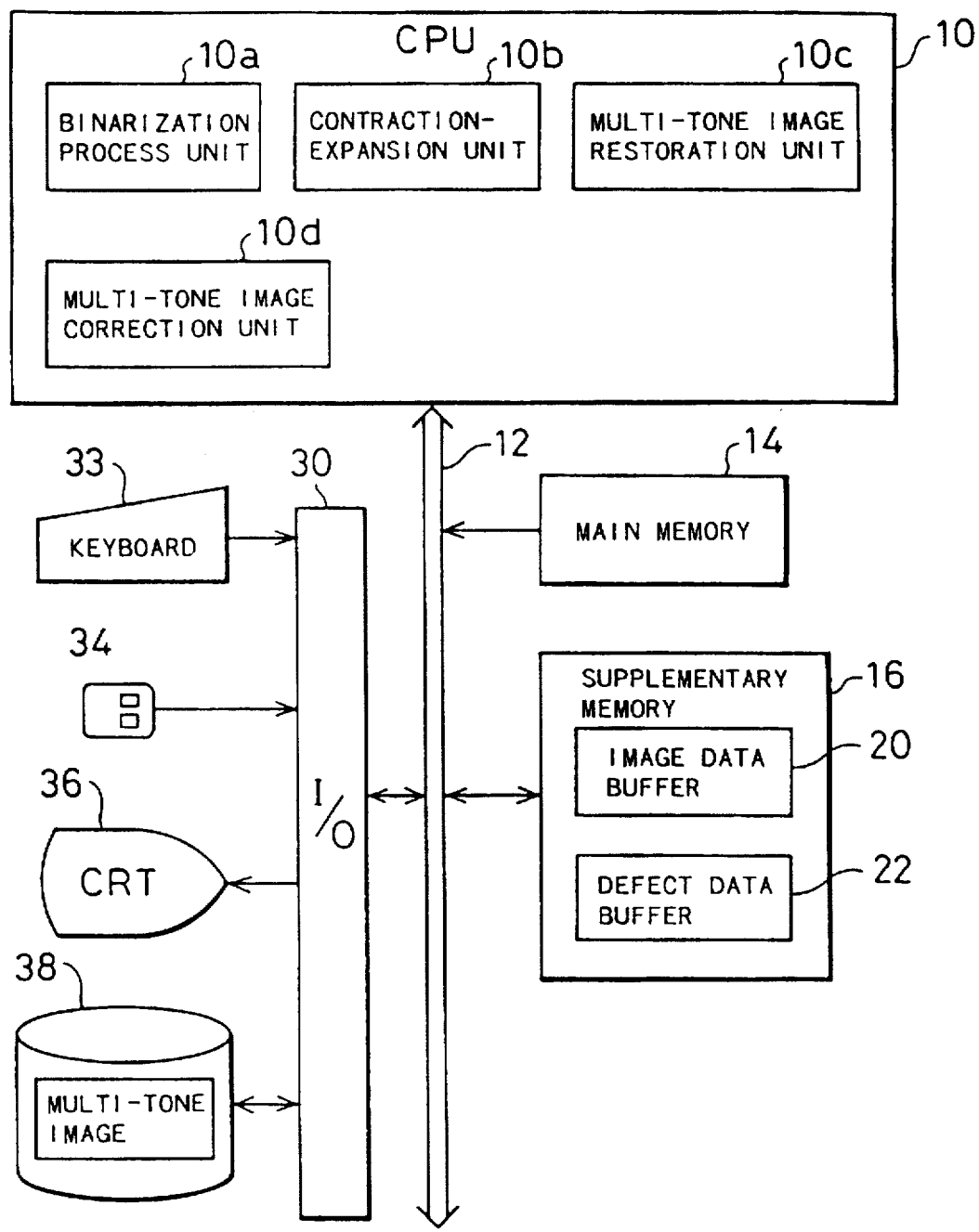
FIG. 1 is a block diagram showing an image processing system as a first embodiment according to the invention.

Preferred embodiments according to the invention will be described in the following order:
- A: First Embodiment
- A1: System Structure
- A2: Contour Correction Process
- A3: Modifications of First Embodiment
- B. Second Embodiment
- B1: Pixel-Centered Contour and Piexl-Boundary Contour
- B2: System Structure
- B3: Contour Correction Process
- B4: Restoration of Contour Vector Data to Image Data
- B5: Modifications of Second Embodiment
- C: Details of Contour Extraction Process
- C1: Structure of Contour Extraction System
- C2: Conversion of Image data to Run Data
- C3: Linkage Process After Detection of Contour Vector
- C4: Details of Linkage Process
- C5: Details of Vector Detection Process
- C6: General Flow of Contour Extraction Process
- C7: Modifications of Contour Extraction Process
- D. Other Modifications A: First Embodiment A1: System Structure FIG. 1 is a block diagram showing an image processing system as a first embodiment of the present invention. The image processing system includes a CPU 10 and a bus line 12 which is connected to a main memory 14 and an supplementary memory unit 16. The bus line 12 is also connected to a keyboard 33, a mouse 34, a color CRT 36, and a magnetic disk unit 38 via an input/output interface 30. The magnetic disk unit 38 stores multi-tone image data.

The supplementary memory unit 16 corresponds to the first memory means and the second memory means of the claimed invention while the mouse 34 works as the specification means. The CPU 10 executes software programs stored in the main memory 14 to implement a binarization process unit 10a, a contraction-expansion unit 10b, a multi-tone image restoration unit 10c, and a multi-tone image correction unit 10d, which respectively correspond to the data conversion means, the contour correction means, the restoration means, and the data correction means of the claimed invention. These units 10a, 10b, 10c, and 10d can be also implemented by hardwares alternatively.

A2: Contour Correction Process

Figure 2:
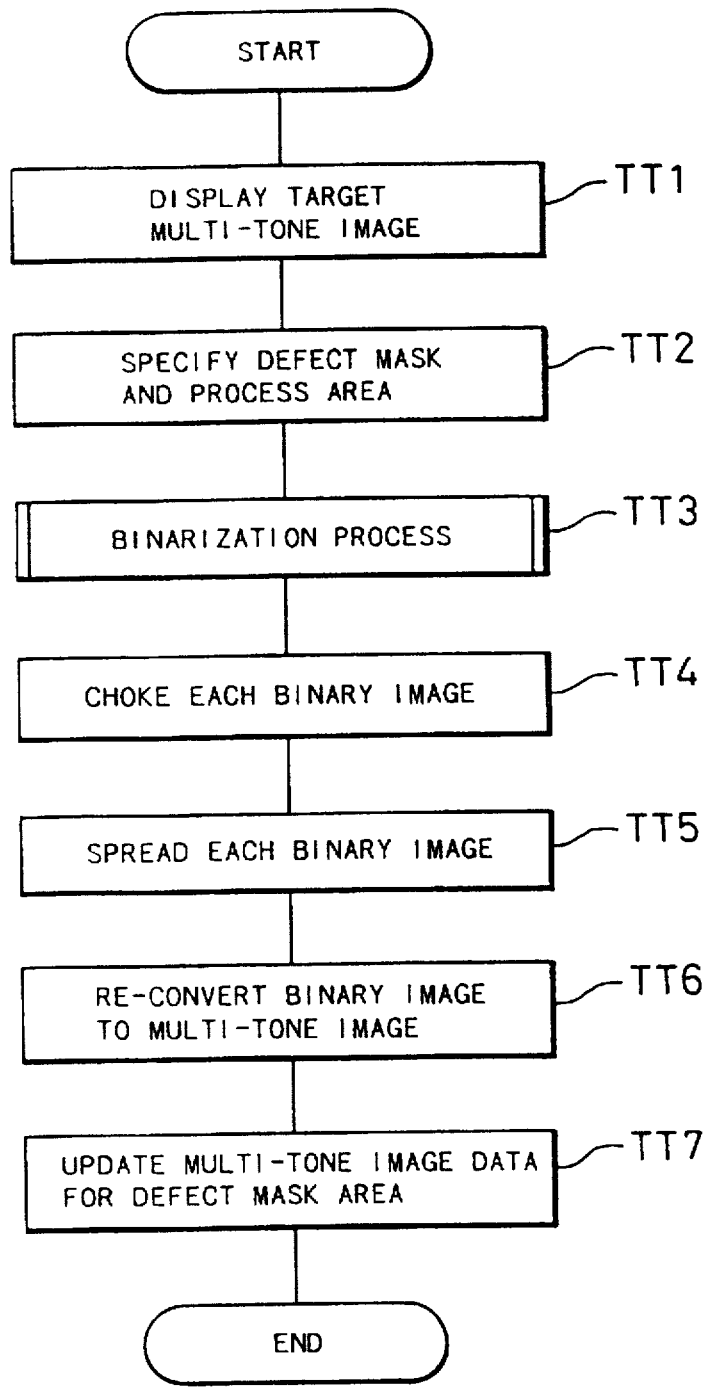
FIG. 2 is a flowchart showing a typical process executed in the first embodiment.

FIG. 2 is a flowchart showing the general procedure of the first embodiment. At step TT1, an operator specifies a target multi-tone image (hereinafter referred to as "original image"), which is then displayed on the color CRT 36. FIGS. 3(A) through 3(C) are plan views showing exemplified original images displayed on the color CRT 36. An original image shown in FIG. 3(A) is free of any defect whereas that shown in FIG. 3(B) has a blemish or defect DF. In this embodiment, each original image represents a colored image, and multi-tone image data corresponding to the original image includes luminance data of three primary colors R (red), G (green), and B (blue).

When the original image has a defect DF as shown in FIG. 3(B), the program proceeds to step TT2 at which the operator specifies a defect mask DM and a process area SA shown in FIG. 3(C) with the mouse 34. The defect mask DM defines a small area including the defect DF, for examples, a rectangular area, while the process area SA is a larger rectangular area including the defect mask DM. Multi-tone image data representing the process area SA are extracted from the original image data and stored in an image data buffer 20 of the supplementary memory unit 16 (FIG. 1). Inside the defect mask DM is painted in white (or black) in the image data buffer 20. For example, when the luminance of each color R, G, or B is expressed as 8-bit data, the luminance of each color in the defect mask DM is set equal to 255 indicating white, or 0 indicating black. Coordinates showing contour points of the defect mask DM, which are determined with regard to an origin O of the multi-tone image, are stored in a defect data buffer 22 of the supplementary memory unit 16 (FIG. 1).

The defect mask DM corresponds to the target area of the claimed invention. The defect mask DM may have any shape so that it includes the defect DF. Although the process area SA is specified by the operator in this embodiment, it can be determined automatically to include the defect mask DM; for example, a rectangular area circumscribing the defect mask DM can be used as the process area SA.

Figure 4:
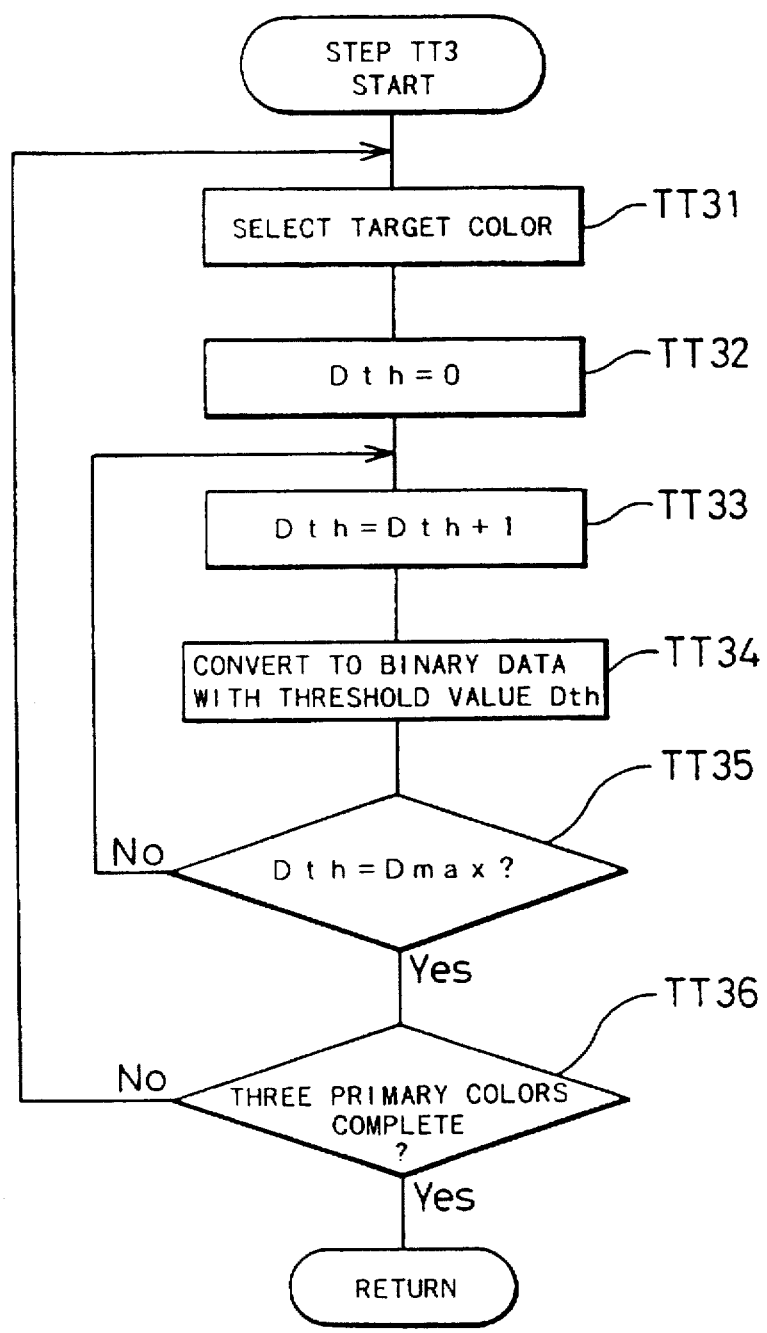
FIG. 4 is a flowchart showing details of a binarization process executed at step TT3 in the flowchart of FIG. 2.

At step TT3, the binarization process unit 10a converts non-processed multi-tone image data of the process area SA to binary data. FIG. 4 is a flowchart showing details of the binarization process executed at step TT3. At step TT31, the binarization process unit 10a selects a target color out of the three primary colors R, G, and B. The binarization process unit 10a initializes a binarization threshold value Dth to zero at step TT32 and increments the threshold value Dth by one at step TT33.

At step TT34, the binarization process unit 10a converts non-processed multi-tone image data to binary image data by comparing the non-processed multi-tone image data with the threshold value Dth. The value of the binary image data is set equal to zero (representing black) for those pixels whose image data value is smaller than the threshold value Dth. The value of the binary image data is set equal to one (representing white) for those pixels whose image data vale is no less than the threshold value Dth.

At step TT35, the threshold value Dth is compared with a predetermined maximum value Dmax which shows the upper limit of image data (255 in 8-bit data). When the threshold value Dth is not equal to the predetermined maximum value Dmax, the program returns to step TT33 at which the threshold value Dth is incremented by one for the subsequent binarization processing.

Figure 5A:
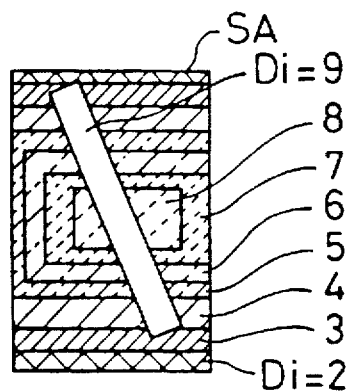
FIGS. 5(A) through 5(C) show results of the binarization process.
Figure 5B:
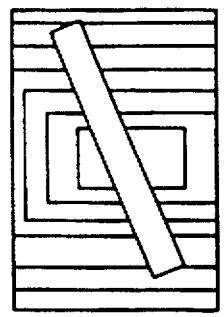
Figure 5C:
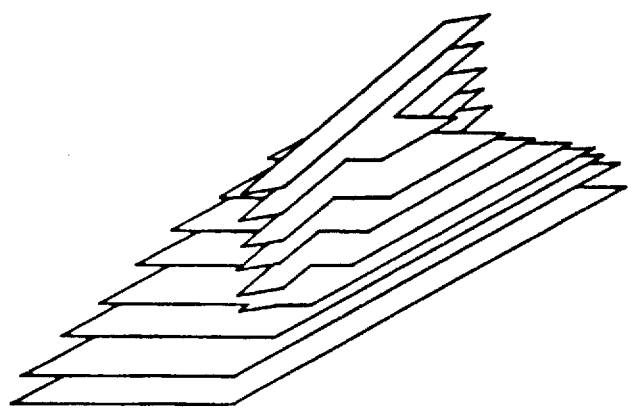

FIGS. 5(A) through 5(C) show results of the binarization process. FIG. 5(A) shows a multi-tone image in the process area SA, and FIG. 5(B) is a plan view showing a pile of binary images obtained through the binarization process. FIG. 5(C) is a perspective view showing the pile of binary images of FIG. 5(B) from the direction of the arrow C. For convenience of explanation, in the example of FIG. 5(A), values of multi-tone image data Di are limited within a range between 1 and 9 in the process area SA. Since the multi-tone image data represents the luminance in this embodiment, the higher the data value is, the brighter the area becomes. Therefore, the multi-tone image data Di is equal to 9, or the maximum value, in the white defect mask area. Nine different binary images as shown in FIGS. 6(A) through 6(I) are obtained by binarizing the multi-tone image data of FIG. 5(A) while varying the threshold value Dth from 1 to 9. The pile of binary images shown in FIGS. 5(B) and 5(C) is obtained by overlaying the white areas of these binary images. In each binary image shown in FIGS. 6(A) through 6I, non-filled, the white areas represent the areas whose binary image data Dp is equal to 1 whereas the shaded areas show the areas whose binary image data Dp is equal to 0. The shape of the defect mask DM is observed in the seven binary images shown in FIGS. 6(A) through 6G. Binary image data representing these nine binary images are stored in the image data buffer 20 of the supplementary memory unit 16. When the supplementary memory unit 16 does not have a sufficient capacity, the binary image data can be stored temporarily in the magnetic disk unit 38.

At step TT36 (FIG. 4), it is determined whether the binarization process is completed for all of the three primary colors R, G, and B. When the answer is NO at step TT36, the program returns to step TT31 to repeat the binarization process for a next color.

After completion of the binarization process for the three primary colors R, G, and B, each binary image is contracted or choked at step TT4 ((FIG. 2) and expanded or spread at step TT5 so as to eliminate the defect DF. FIGS. 7(A) through 7(E) show a process of choking and spreading the binary image. FIG. 7(A) shows a contour of a white area WA of the binary image shown in FIG. 6(E). The white area WA of FIG. 7(A) is contracted to make a white area WA1 shown in FIG. 7(B), which does not show the shape of the defect mask DM. The choking process is executed to eliminate the shape of the defect mask DM, and therefore the white area WA is contracted by a predetermined choking width no less than half a width WDM of the defect mask DM. The width WDM of the defect mask DM is determined according to the coordinates of the vertices of the defect mask DM stored in the defect data buffer 22 of the supplementary memory unit 16. After completion of the choking process, the choked white area WA1 is spread by a predetermined spread width which is equal to the choking width, thereby generating a binary image showing nothing indicative of the defect mask DM as shown in FIG. 7(C).

The choking and spreading process can be executed using an 8-neighbor window, which is well known in the the field of image processing. Choking of the white area WA is equivalent to spreading of a black area, and spreading of the white area WA is equivalent to choking of the black area.

Figures 6A, 6B, 6C:
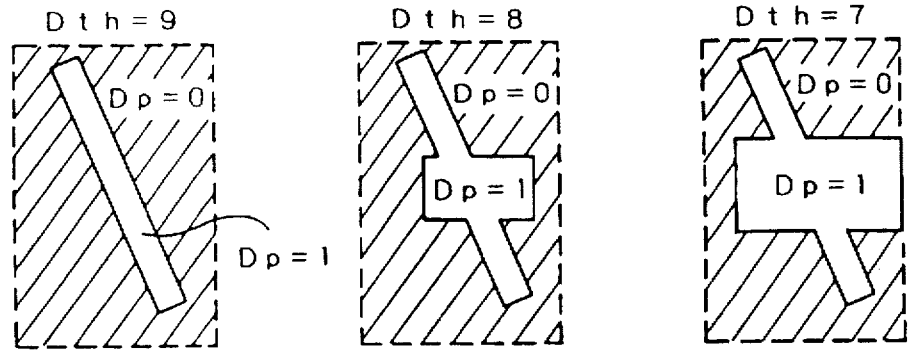
FIGS. 6(A) through 6(I) are plan views showing nine binary images obtained through binarization of a multi-tone image.
Figures 6D, 6E, 6F:
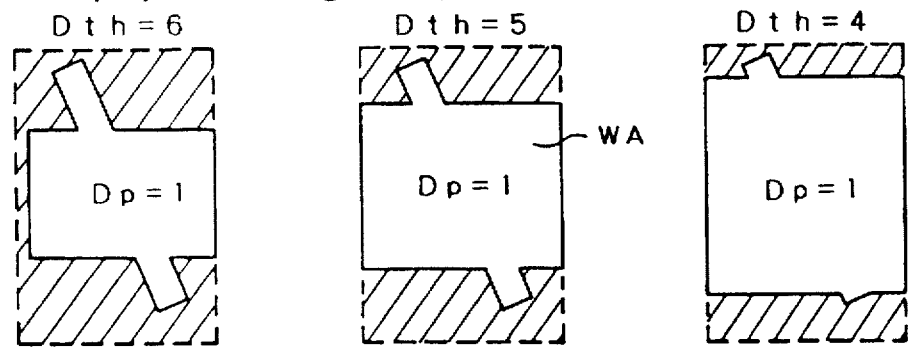
Figures 6G, 6H, 6I:
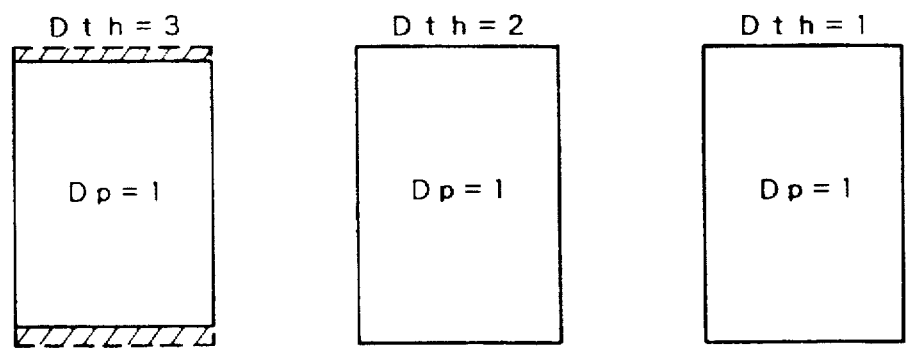
Figure 8:
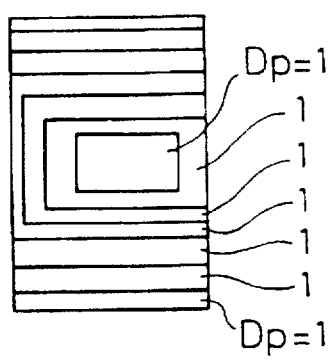
FIGS. 8(A) and 8(B) show restoration of binary image data to multi-tone image data.

Through choking and spreading the pile of binary images shown in FIG. 7(D), the shape of the defect mask in each binary image is eliminated as shown in FIG. 7(E). The original binary image shown in FIG. 6 is totally eliminated in FIG. 7(E) because it conforms to the shape of the defect mask DM. As a result, FIG. 7(E) includes eight binary images. FIG. 8(A) is a p;an view of the pile of the eight binary images, where only seven areas can be seen because the two binary images at the bottom, which correspond to those shown in FIGS. 6(H) and 6(I), have the same shape.

Again referring to the flowchart of FIG. 2, the program proceeds to step TT6 at which the multi-tone image restoration unit 10c re-converts the binary images to a multi-tone image. Since the value of the binary image data Dp is equal to one in the white areas of the eight binary images as shown in FIG. 8A, the re-converted multi-tone image data Di shown in FIG. 8(B) are obtained by simply adding the binary image data Dp of the eight binary images with respect to each pixel.

Figure 8B:
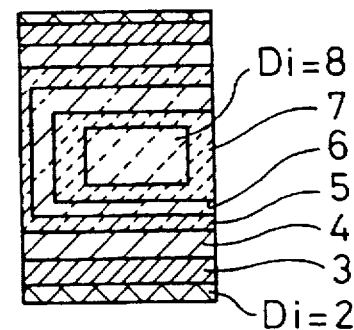
Figure 9A:
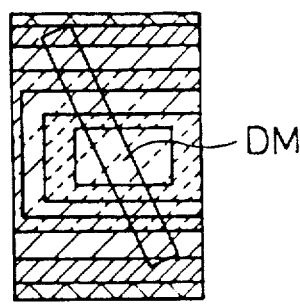
FIGS. 9(A) through 9(C) show a method of updating multi-tone data in a range of a defect mask DM.
Figure 9B:
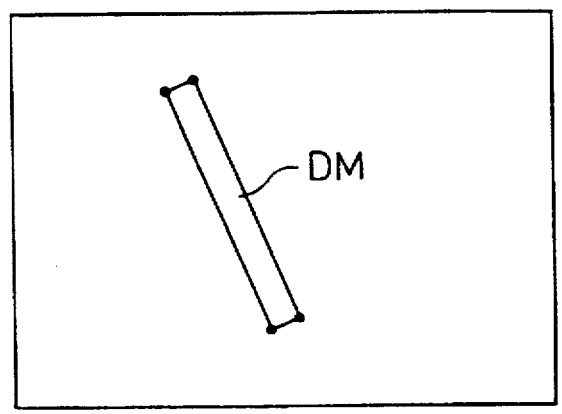
Figure 9C:
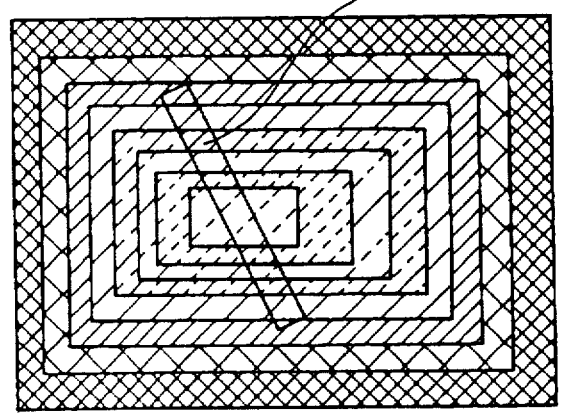

Although the resultant multi-tone image data Di represents a defect-free multi-tone image as shown in FIG. 8(B), the choking and spreading process may deteriorate the picture quality of the image area other than the defect. In order to solve this problem, at step TT7 (FIG. 2), the multi-tone image correction unit 10d extracts a data segment representing the area conforming to the defect mask DM (FIG. 9(A)) from the resultant multi-tone image data Di of the defect-free multi-tone image shown in FIG. 8(B), and replaces the corresponding data segment of the original multi-tone image data of the original image with the extracted data segment. In this process, the range of the defect mask DM is determined according to the coordinates of the contour points of the defect mask DM shown in FIG. 9(B), which are stored in the defect data buffer 22. The extracted data segment (FIG. 9(A)) is copied into the original multi-tone image data representing the original image. The final multi-tone image thus obtained is corrected only in the defect mask DM as shown in FIG. 9(C) and thereby attains a higher picture quality than the defect-free multi-tone image obtained by choking and spreading the whole image.

A3: Modifications of First Embodiment (1) Although the defect mask is white in the above first embodiment, it can be filled with black. In the latter case, black areas of the binary images are choked at step TT4 in the flowchart of FIG. 2 and then spread at step TT5. Alternatively, white areas of the binary images are spread at step TT4 and then choked at step TT5.

Figures 11A, 11B, 11C:
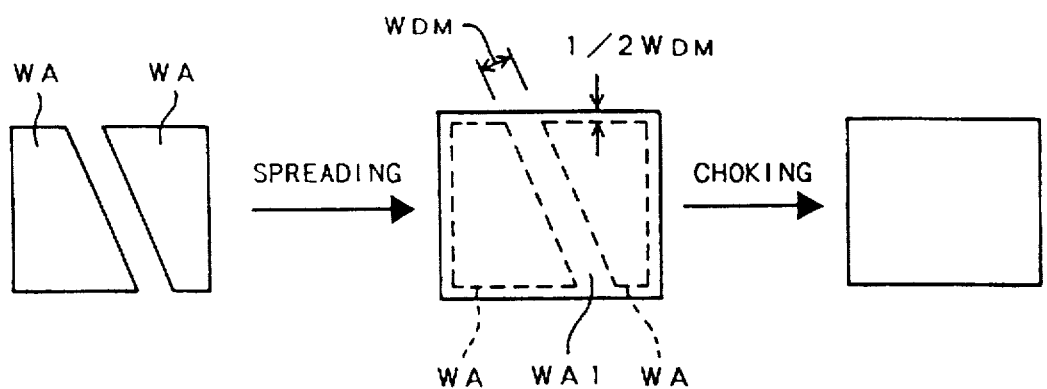
FIGS. 11(A) through 11(C) show choking and spreading a binary image.
Figures 54A, 54B, 54C, 54D:
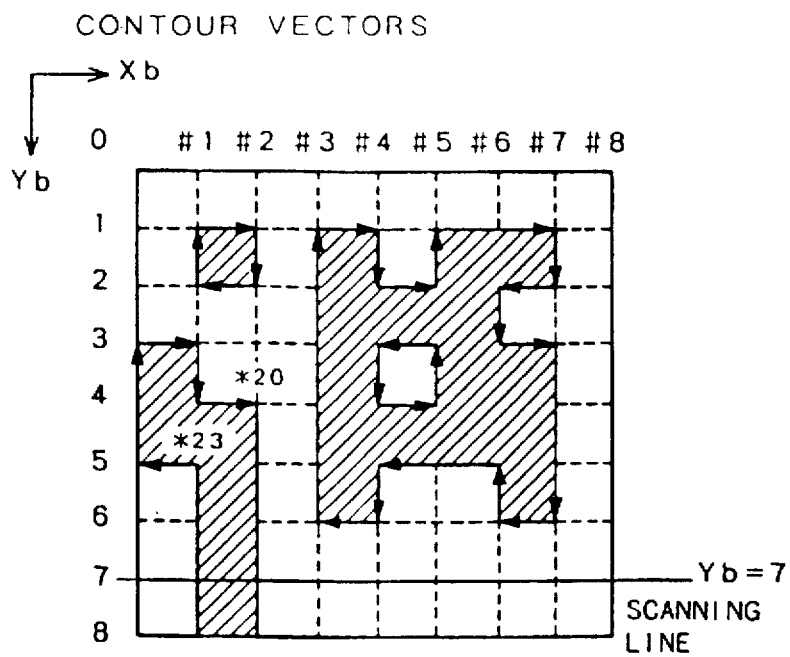
FIGS. 54(a) through 54(d) show a process for extracting contour vectors along each boundary scanning line.
Figures 55A, 55B, 55C, 55D:
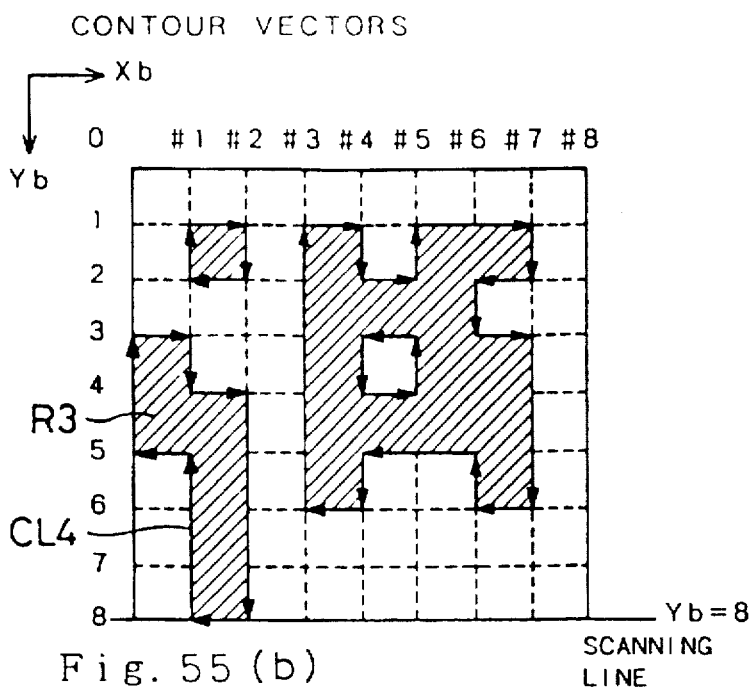
FIGS. 55(a) through 55(d) show a process for extracting contour vectors along each boundary scanning line.

FIGS. 10(A) through 10(I) show binary images with the threshold value Dth varying from 1 to 9, where the defect mask DM is filled with black. These drawings correspond to FIGS. 6(A) through 6(I). The whole shape of the defect mask DM is observed in three binary images of FIGS. 10(G) through 10I. FIGS. 11(A) through 11(C) corresponding to FIGS. 7(A) through 7(C) show a process of spreading and choking the binary image. FIG. 11(A) shows a contour of white areas WA of the binary image shown in FIG. 10(E). The white area WA of FIG. 11(A) is spread by a predetermined spread width no less than half a width WDM of the defect mask DM to make a spread white area WA1 as shown in FIG. 11(B). In the FIG. 11(B), the white areas WA before spreading is drawn by the broken lines. After completion of the spreading process, the spread white area WA1 is choked by a predetermined choking width which is equal to the spread width, thereby generating a defect-free binary image as shown in FIG. 54(C).

(2) At step TT7 in the flowchart of FIG. 2, a segment of the processed multi-tone image data for the whole process area SA can be extracted instead of the defect mask DM. The latter is, however, preferable since an area having updated image data is sufficiently small to minimize the deterioration of the picture quality.

B. Second Embodiment

In the above first embodiment, the original image is corrected through processing of binary image data. In a second embodiment described below, the original image is corrected through processing of contour vector data which is converted from binary image data to represent the contour of the image.

B1. Pixel-centered Contour and Pixel-boundary Contour

Figure 12A:
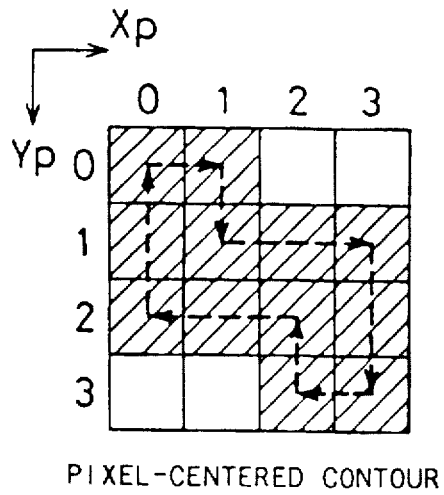
FIGS. 12(a) through 12(c) show the comparison between a pixel-centered contour and the pixel-boundary contour.
Figure 12B:
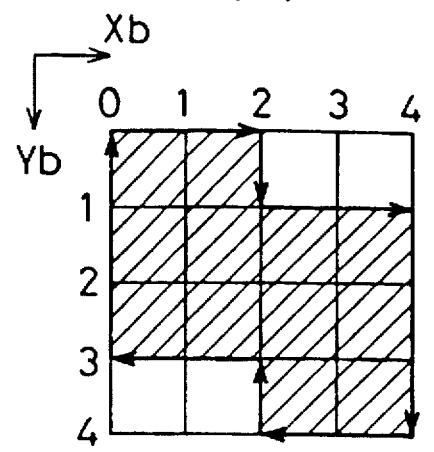
Figure 12C:
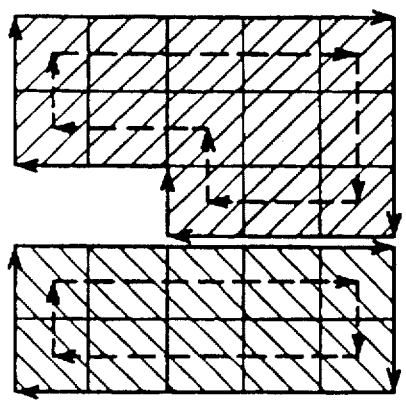

FIGS. 12(a) through 12(c) show the comparison between a pixel-centered contour and a pixel-boundary contour in a monochrome image. A pixel-centered contour is constituted by vectors whose end points are defined by pixel coordinates Xp, Yp as shown in FIG. 12(a). The contour vector of the pixel-centered contour passes through the centers of pixels. On the other hand, a pixel-boundary contour is constituted by vectors whose end points are defined by boundary coordinates (coordinates of the boundary between pixels) Xb, Yb as shown in FIG. 12(b). The contour vectors of the pixel-boundary contour runs along the outer boundary of pixels.

The pixel-boundary contour has the following advantages over the pixel-centered contour:

(1) The pixel-boundary contour can show an image area of one pixel width with vectors while the pixel-centered contour cannot.

(2) When two image areas are contacting each other as shown in FIG. 12(c), the contact is readily detected with the pixel-boundary contours PBC because they have an overlap of the contour vectors showing the contact, whereas it is difficult to detect the contact with the pixel-centered contours PCC because they have no the contour vectors overlapping each other.

(3) When image reduction processing such as data skipping is performed prior to outputting an image to devices with various resolutions, for example, a CRT (cathode ray tube) and a printer, the pixel-boundary contour has a smaller error inherent in the reduction processing than the pixel-centered contour. In the pixel-centered contour, the shape of the contour represents an arrangement of pixels linked by the contour vectors; namely, the size of a pixel affects the shape of the contour after the reduction. On the contrary, with the pixel-boundary contour, the contour vectors can reflect the shape of the original contour more precisely even after the reduction.

(4) The pixel-centered contour has a larger error inherent in affine conversion or other transform processing than the pixel-boundary contour for the reason mentioned in (3).

B2. System Structure

Figure 13:
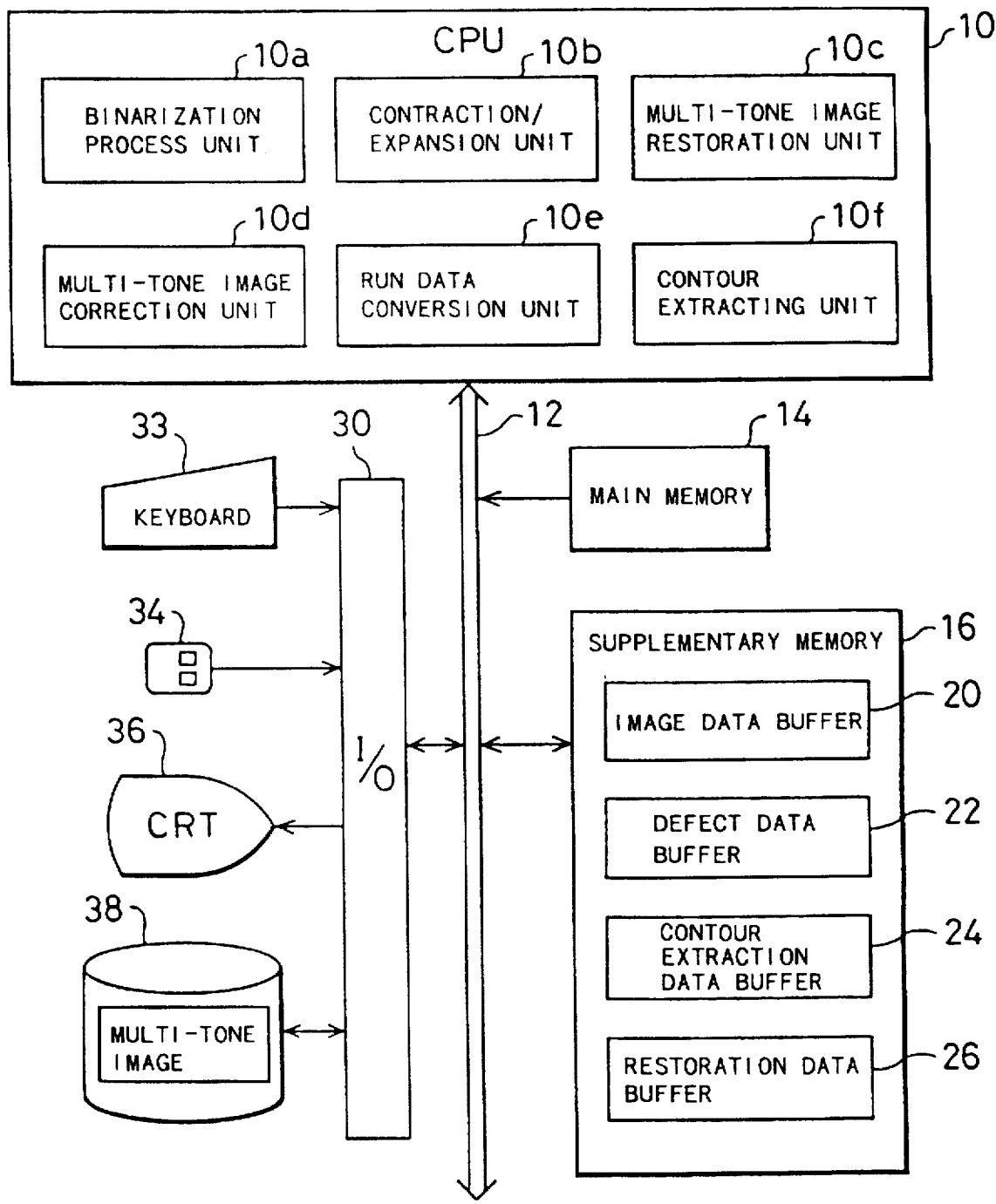
FIG. 13 is a block diagram showing an image processing system as a second embodiment according to the invention.

FIG. 13 is a block diagram showing an image processing system as the second embodiment of the present invention. The image processing system has a structure similar to that shown in FIG. 1 except the following points: the CPU 10 includes a run data conversion unit 10e and a contour extracting unit 10f other than the units 10a through 10d; the supplementary memory 16 includes a contour extraction data buffer 24 and a restoration data buffer 26 other than the run image data buffer 20 and the defect data buffer 22. The run data conversion unit 10e and the contour extracting unit 10f correspond to the contour extraction means of the claimed invention.

The run data conversion unit 10e converts binary image data to run data. The run data indicates edges of the binary image along a scanning direction by the pixel-boundary coordinates at the edges. A method of converting binary image data to run data will be described later. The contour extracting unit 10f processes the run data to detect contour points, to generate segment vectors representing segments of the contour, and to detect a closed loop formed by linking the segment vectors to one another. Details of the processing will be described later in detail.

The contour extraction data buffer 24 stores working data used in conversion of binary image data to contour vector data by the run data conversion unit 10e and the contour extracting unit 10f. The restoration data buffer 26 stores working data used in restoration of contour vector data to produce multi-tone image data by the multi-tone image restoration unit 10c.

B3: Contour Correction Process

Figure 14:
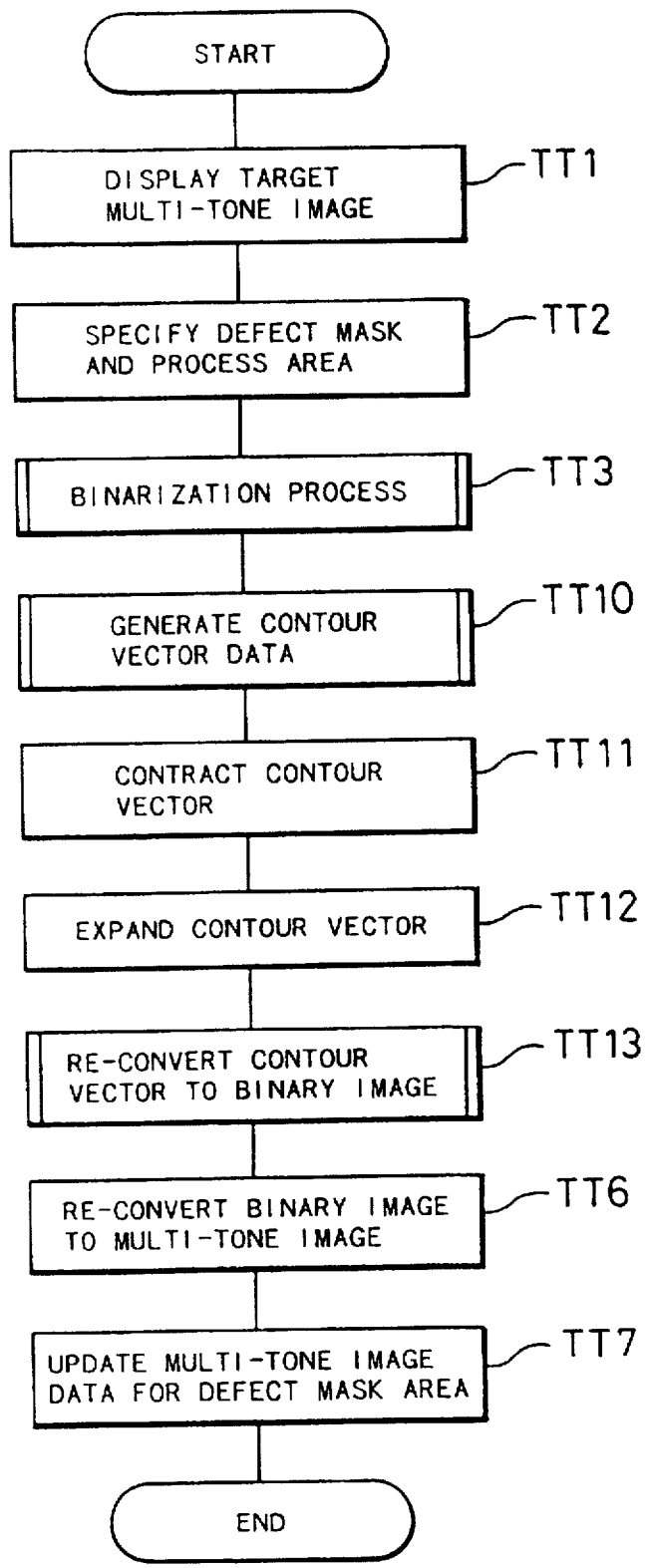
FIG. 14 is a flowchart showing a contour correction routine executed in the second embodiment.

FIG. 14 is a flowchart showing the procedure of contour correction process executed in the second embodiment. Steps TT1 through TT3 in FIG. 14 are identical with those shown in FIG. 2. After completion of these steps TT1 through TT3, for example, nine binary image data are obtained as shown in FIGS. 6(A) through 6(I).

Figures 15A, 15B, 15C:
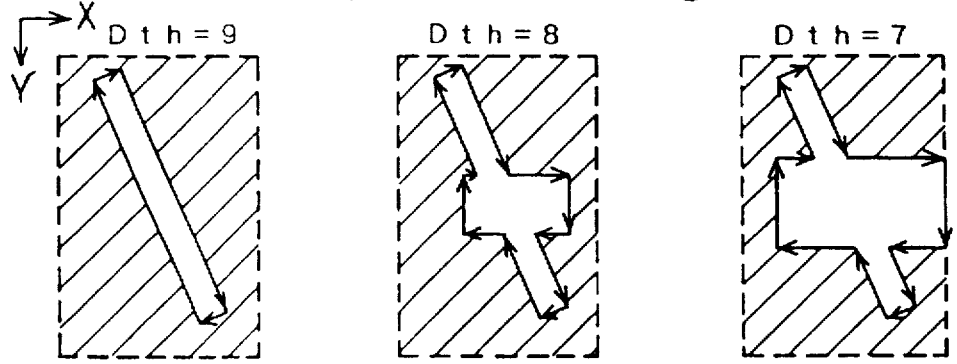
FIGS. 15(A) through 15(I) are conceptive views showing contour vectors corresponding to binary images in FIGS. 6(A) through 6I.
Figures 15D, 15E, 15F:
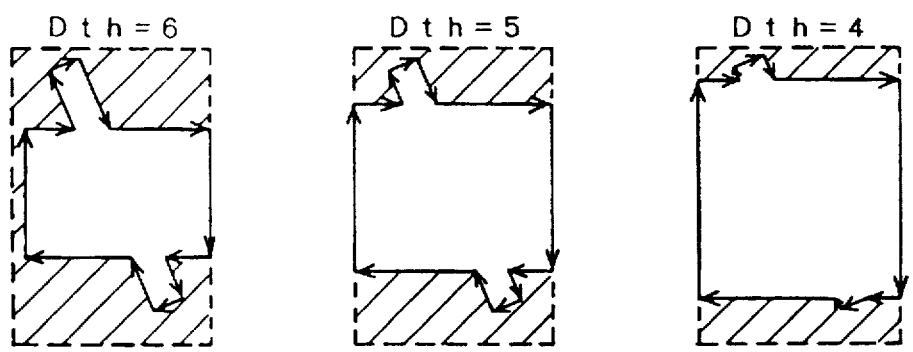
Figures 15G, 15H, 15I:
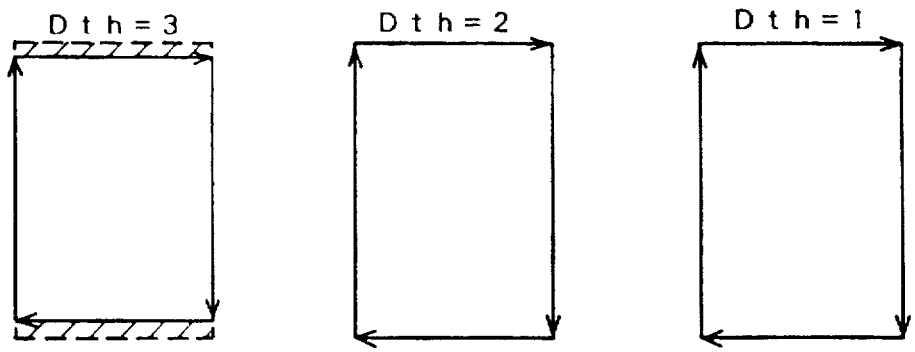

At step TT10, the run data conversion unit 10e and the contour extracting unit 10f generate contour vector data from the binary image data. FIGS. 15(A) through 15(I) show contour vectors of the binary images of FIGS. 6(A) through 6(I). The contour vector data represents a vector sequence indicative of a contour of a white area of each binary image, which binary image data Dp is equal to one as shown in FIGS. 6(A) through 6(I). This is because white areas are subject to contraction and expansion in this embodiment. The contour vector sequences includes only "boundary vectors" which run along pixel boundaries and which are parallel to either a primary scanning direction Y or a secondary scanning direction X. In FIG. 15, however, contour vector sequences are drawn to include oblique vectors for convenience of illustration. Details of the process of generating contour vector data will be described later in detail.

Figure 16:
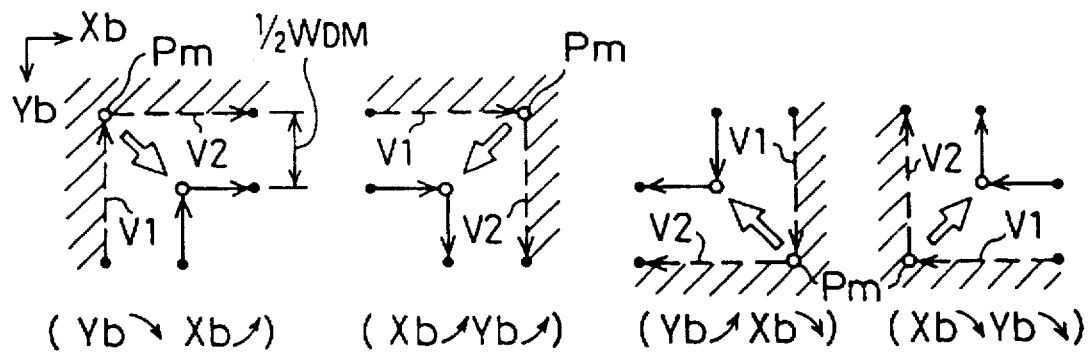
FIGS. 16(A1) through 16(A5) and 16(B1) through 16(B5) show typical methods of contracting a contour vector.
Figure 16:
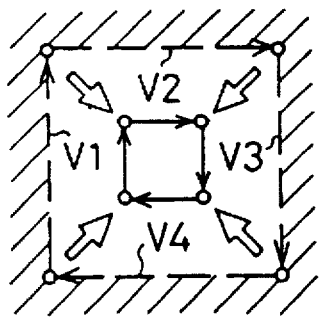
Figure 16:
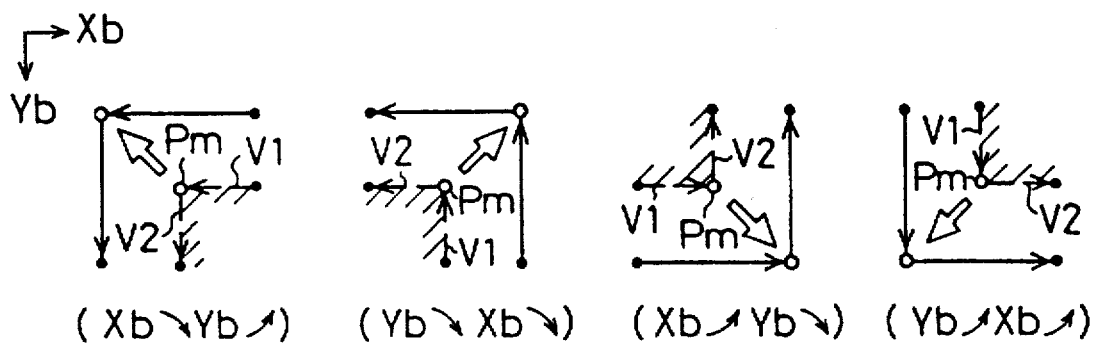
Figure 16:
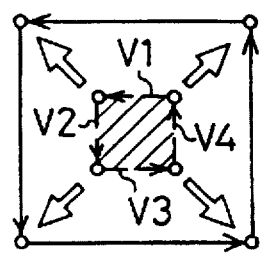

At step TT11, each of the nine contour vector sequences is contracted. FIGS. 16(A1) through 16(A5) and 16(B1) through 16(B5) show typical processes of contracting contour vector sequences. The vectors before the contracting process are drawn with broken lines whereas the contracted vectors are drawn with solid lines. A black area filled with slant lines is located on the left side of each vector sequence while a white area is located on the right side thereof in this embodiment.

In FIGS. 16(A1) through 16(A4), two adjacent vectors V1 and V2 turn clockwise, or turn right along the course of the vector sequence. In this case, an intermediate point Pm of the two vectors V1 and V2 shown by an open circle moves in a lower right direction with respect to the course of the vector sequence. As the intermediate points Pm moved in the lower right direction as shown in FIGS. 16(A1) through 16(A4), a white area defined by four vectors V1 through V4 is contracted as shown in FIG. 16(A5).

In FIGS. 16(B1) through 16(B4), two adjacent vectors V1 and V2 turn counterclockwise, or turn left along the course of the vector sequence. In this case, an intermediate point Pm of the two vectors V1 and V2 moves in an upper right direction with respect to the course of the vector sequence. As the intermediate points Pm moved in the upper right direction shown in FIGS. 16(B1) through 16(B4), a black area defined by four vectors V1 through V4 is expanded as shown in FIG. 16(B5).

Only the intermediate points Pm of the two adjacent vectors V1 and V2 moves in this contraction process; the starting point of the first vector V1 moves according to the turning direction of those two adjacent vectors whose intermediate point is the starting point of the vector V1, and the end point of the second vector V2 moves according to the turning direction of those two adjacent vectors whose intermediate point is the end point of the vector V2.

In the examples of FIGS. 16(A1) through 16(A5) and 16(B1) through 16(B5), coordinates of the intermediate point Pm after the contracting movement can be determined according to the following method. Since a contour vector sequence represents a boundary contour, each vector is in parallel with either of the coordinate axes of the boundary coordinates (Xb, Yb). A starting point and an end point of a certain vector have the same value for one of the boundary coordinates Xb and Yb, and different values for the other boundary coordinate. In the example of FIG. 16(A1), the starting point and the end point of the first vector V1 have the same value in the Xb coordinate and different values in the Yb coordinate while the starting point and the end point of the second vector V2 have the same value in the Yb coordinate and different values in the Xb coordinate. The turning direction of two adjacent vectors V1 and V2 can be determined by examining which coordinate goes up or down from the starting point to the end point with respect to each of the two vectors V1 and V2. FIG. 17 shows relations between the up-down in the coordinate values from the starting point to the end point with respect to two adjacent vectors V1 and V2 and corrected coordinates of intermediate points Pm(Xm, Ym) after the contracting movement in the examples of FIGS. 16(A1) through 16(A4) and 16(B1) through 16(B4), respectively. In FIG. 17, WDM represents a width of the defect mask. A contour vector sequence can be contracted by a desired width (WDM/2 in this embodiment) through one cycle of the contraction process.

Figure 18A:
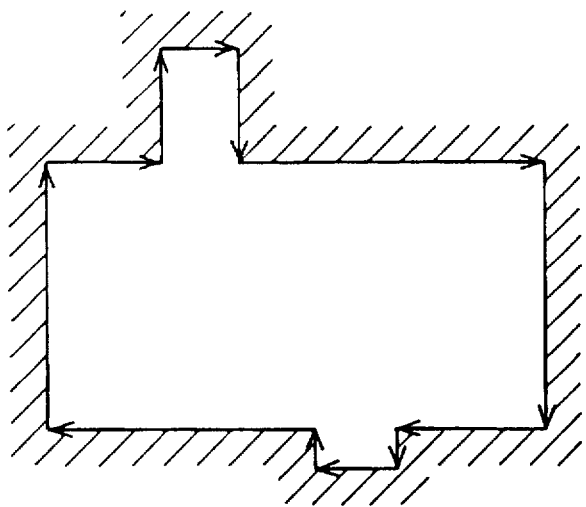
FIGS. 18(A) through 18(C) show a process of contracting a contour vector.
Figure 18B:
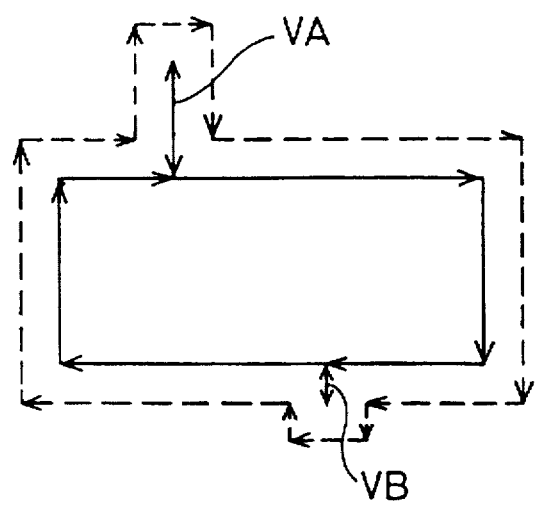
Figure 18C:
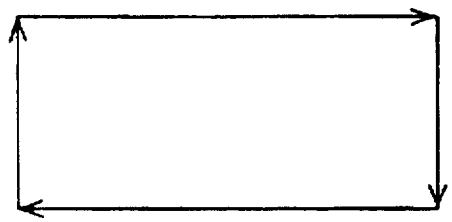

FIGS. 18(A) through 18(C) show a process of contracting a contour vector sequence shown in FIG. 15(E), where the shape of the contour is further simplified for convenience of explanation. FIG. 18(A) shows a contour vector before the contraction process. FIG. 18(B) shows a state after movement of intermediate points according to the method shown in FIGS. 16(A1) through 16(A5) and 16(B1) through 16(B5), and FIG. 18(C) shows a resultant contour after the contraction process. In FIG. 18(B), vectors running in opposite directions overlap each other at two parts VA and VB. These overlapped vectors VA and VB are cancelled out, and a contour vector sequence having no overlapping is generated as shown in FIG. 18(C).

After the contraction process of the contour vector sequence at step TT11 (FIG. 14), the contracted contour vector sequence is expanded back at step TT12. In this expanding process, as shown in FIG. 19, intermediate points are moved in directions opposite to those in the contraction process shown in FIG. 17.

Through the contraction and expansion process described above, any defect in the image is eliminated as in the first embodiment shown in FIGS. 7(A) through 7(E). At step TT13 (FIG. 12), the multi-tone image restoration unit 10c restores a binary image from the corrected contour vector sequence. Details of this restoration process will be described later in detail. After the restoration process, the program goes to step TT6 and then to step TT7 described before, thereby generating a final multi-tone image with no defect in the same manner as in the first embodiment.

In the second embodiment, each binary image is converted to a contour vector sequence, and the contour vector sequence is contracted and expanded to eliminate defects in the image. Since vectors can be contracted and expanded by a desired width through only one cycle of the contraction routine and the expansion routine, respectively, the contraction and expansion process can be executed quickly.

B4: Restoration Of Image Data from Contour Vector

Figure 20:
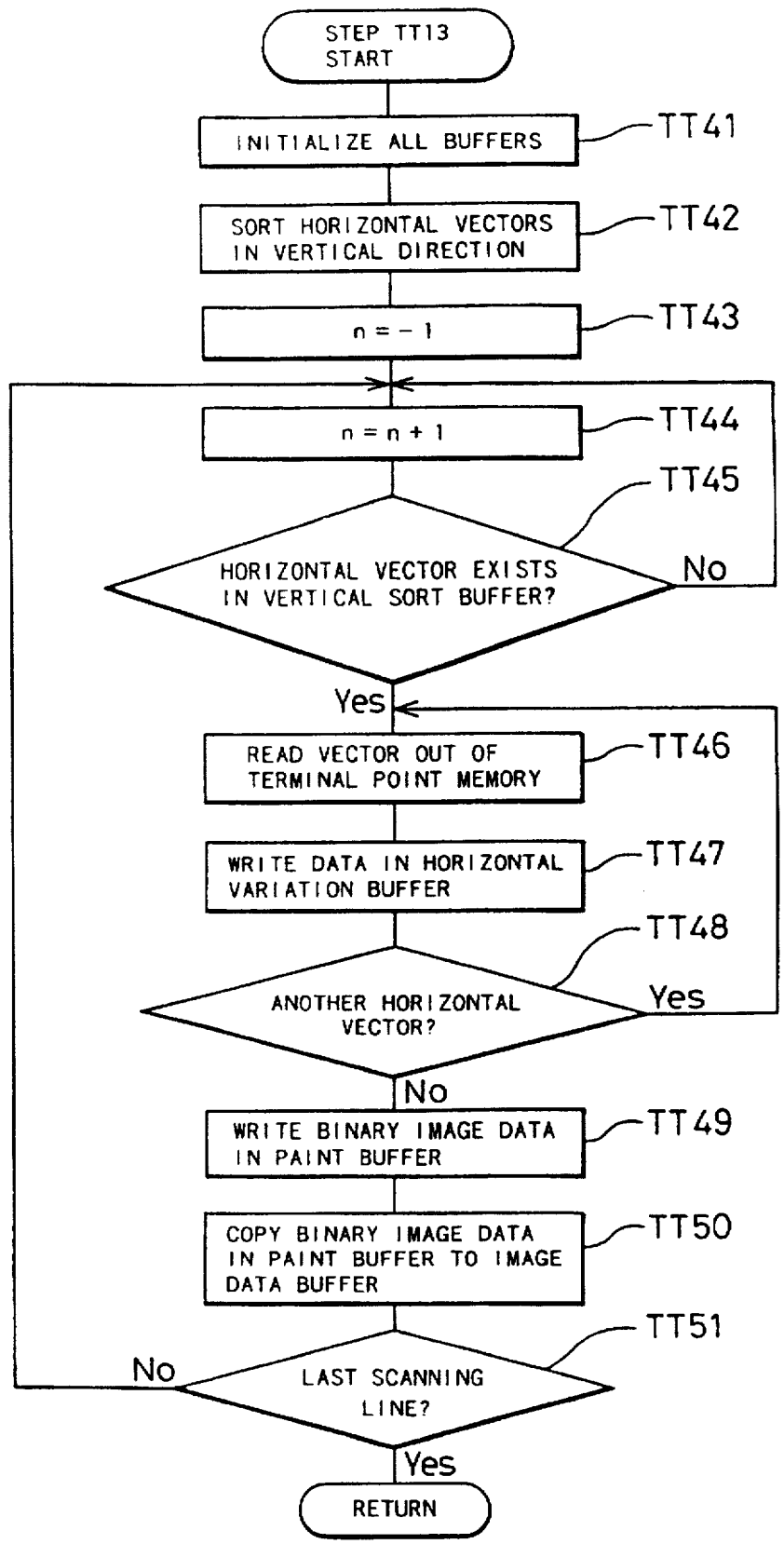
FIG. 20 is a flowchart showing details of a restoration process executed at step TT13 in the flowchart of FIG. 12.
Figures 21A, 21B, 21F:
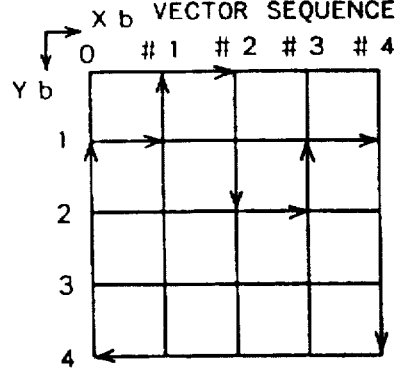

FIG. 20 is a flowchart showing details of the restoration process executed at step TT13 of FIG. 14. At step TT41, all buffers used in the restoration process are initialized. FIGS. 21(a) through 21(f) show the buffers initialized at step TT41 and a contour vector sequence to be processed in the restoration process.

The buffers used in the restoration process include a horizontal edge buffer 52, a paint buffer 54, a vertical sort buffer 56, and a terminal point memory 58. These buffers are assigned in specific areas of the restoration data buffer 26 (FIG. 13) in the supplementary memory unit 16. The horizontal edge buffer 52 stores boundary coordinates of black/white edges in a horizontal direction along the Xb axis. The paint buffer 54 temporarily stores binary image data obtained for one horizontal scanning line. The vertical sort buffer 56 is used for sorting horizontal vectors in a vertical direction. The terminal point memory 58 stores a starting point coordinate Xs and an end point coordinate Xe for horizontal vectors sorted in the vertical direction. Binary image data obtained through the restoration process are stored in the image data buffer 20.

Figure 22C:
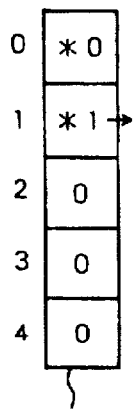

At step TT42, horizontal vectors are extracted from the contour vector sequence and sorted in the vertical direction. FIGS. 22(a) through 22(f) shows the sorting of horizontal vectors in the vertical direction. In this vertical sorting process, horizontal vectors V0 through V4, which are drawn with thick solid lines in FIG. 22(d), are extracted from the contour vector sequence. Boundary coordinates Xs and Xe of starting points and end points of the extracted horizontal vectors are stored in the terminal point memory 58. For example, a coordinate value Xs=#1 of the starting point and a coordinate value Xe=#2 of the end point are stored for the first vector V0. In the vertical sort buffer 56 shown in FIG. 22(c), an address *0 of the first horizontal vector V0 in the terminal point memory 58 is written at a position corresponding to the Yb coordinate (=0) of the first horizontal vector V0. Link data in the terminal point memory 58 (referred to as 'link' in the drawings) shows a linkage with another address, where 'NC' shows no connection with another address.

At the time when the third horizontal vector V2 is extracted, an address *1 of the second horizontal vector V1 has already been registered at a specific position in the vertical sort buffer 56 corresponding to the Yb coordinate (=1) of the second horizontal vector V2. In this case, link data representing connection with the address *1 is registered for the second horizontal vector V2 in the terminal point memory 58 as shown in FIG. 22(f), and an address *2 of the third horizontal vector V2 is over-written in the vertical sort buffer 56 as shown in FIG. 22(c). FIGS. 23(a) through 23(f) show a state after completion of sorting for all the horizontal vectors V0 through V4 in the vertical direction. This vertical sorting is executed at a remarkably high speed compared with a conventional sorting method.

At step TT43 of FIG. 20, a parameter n representing a position in the vertical sort buffer 56, or the value of the boundary coordinate Yb, is initialized to −1. At step TT44, the parameter n is incremented by one. At the subsequent steps TT45 through TT50, horizontal vectors along one horizontal scanning line are converted to binary images. FIGS. 24(a) through 24(f) show the processes of steps TT45 through TT50 for the parameter n=0, that is, for a scanning line having the boundary coordinate Yb=0.

Figure 24:
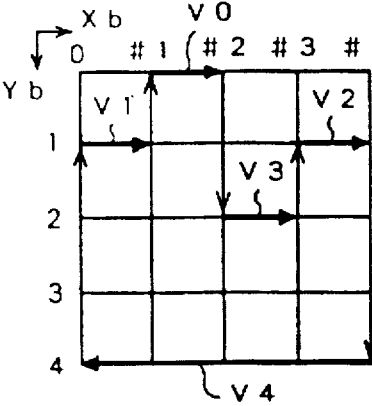
FIGS. 24(a) through 24(f) show a process of converting contour vector data back to binary image data.

At step TT45, it is determined whether any horizontal vector is registered at a specific position in the vertical sort buffer 56 indicated by the parameter n. When no horizontal vectors are registered, the program returns to step TT44 to increment the parameter n by one. In the example of FIG. 24(c), an address *0 is registered at the position of n=0, and the program goes to step TT46 at which the starting coordinate Xs and the end coordinate Xe the horizontal vector at the address *0, which is indicated in the vertical sort buffer 56, are read out of the terminal point memory 58 (FIG. 24(f)). At step TT47, a value '+1' is registered at that position in the horizontal edge buffer 52 which corresponds to the starting coordinate Xs(=#1), and another value '−1' is written at another position corresponding to the end coordinate Xe(=#2). At step TT48, it is determined whether link data is registered for the currently processed vector in the terminal point memory 58; in other words, whether another horizontal vector is linked with the horizontal vector currently processed. When another horizontal vector is linked with the currently processed vector, steps TT46 and TT47 are repeated for the linked vector. In the example of FIG. 24(f), link data at the address *0 is 'NC', which indicates no horizontal vector linked.

At step TT49, binary image data are written in the paint buffer 54 according to the data in the horizontal edge buffer 52. As shown in FIG. 24(b), the binary image data is set equal to one for pixels in a range between the boundary coordinate having a value '+1' and the boundary coordinate having a value '−1' in the horizontal edge buffer 52.

At step TT50, the binary image data in the paint buffer 54 are copied into the image data buffer 20 while the data in the vertical sort buffer 56 at the position indicated by the parameter n is initialized to zero as shown in FIG. 24(c).

AT step TT51, it is determined whether this restoration process is completed for the last scanning line in the original image. when the answer is NO, the program returns to step TT44 to repeat the processing at steps TT44 through TT50.

FIGS. 25(a) through 25(f) show the processing for the parameter n=1. In this example, an address *2 is registered in the vertical sort buffer 56 at the position indicated by the parameter n=1. The terminal memory 58 is referred to at the address *2 accordingly, and the starting coordinates Xs and the end coordinate Xe of a horizontal vector registered at the address *2 are read out of the terminal point memory 58 (step TT46). A value '+1' is added at that position in the horizontal edge buffer 52 which corresponds to the starting coordinate Xs(=#3) whereas another value '−1' is added at another position corresponding to the end coordinate Xe(= #4) (step TT47). Since the horizontal vector at the address *2 in the terminal point memory 58 has link data showing the address *1, steps TT46 and TT47 are executed for a linked horizontal vector registered at the address *1 in the terminal memory 58. Through execution of steps TT46 and TT47, '+1' is added to the position of the coordinate #0 in the horizontal edge buffer 52 and '−1' is added to the position of the coordinate #1. Since '+1' is written at the coordinate #1 in the horizontal edge buffer 52 through the previous process for the parameter n=0 (FIG. 24(a)), addition of '−1' to the coordinate #1 by the process for the parameter n=1 makes a resultant value at the coordinate #1 equal to zero in the horizontal edge buffer 52. The value at the coordinate #2 (=−1) is unchanged and shows the same value as that in FIG. 24(a).

Binary image data are written in the paint buffer according to the data of the horizontal edge buffer 52 (step TT49). Namely, the binary image data is set equal to '1' for pixels in a range between the boundary coordinate having a value '+1' and the boundary coordinate having a value '−1', in the horizontal edge buffer 52. The binary image data in the paint buffer 54 are subsequently copied into the image data buffer 20 (step TT50) while the data in the vertical sort buffer 56 at the position indicated by the parameter n=1 is initialized to zero.

FIGS. 26(a) through 26(f), 27(a) through 27(f), and 28(a) through 28(f) show processing when the parameter n is equal to 2, 3, and 4, respectively. When the parameter n is equal to 3 (FIGS. 27(a) through 27(f)), no address is registered at a corresponding position of n=3 in the vertical sort buffer 56. In this case, binary image data are written in the paint buffer 54 according to the data previously registered in the horizontal edge buffer 52 and are then copied into the image data buffer 20 as shown in FIG. 27(e).

When the parameter n is equal to 4 (FIGS. 28(a) through 28(f)), addition of '+1' and '−1' in the horizontal edge buffer 52 at the starting coordinates Xs and the end coordinate Xe in the terminal point memory 58 makes all data in the horizontal edge buffer 52 equal to zero. Data in the vertical sort buffer are also initialized to zero 56 at the position of n=4. This results in all data in the horizontal edge buffer 52 and the vertical sort buffer 56 equal to zero, which is the same condition as that at the time of initialization shown in FIGS. 21(a) and 21(c). When another contour vector sequence exists below the fourth horizontal vector V4 shown in FIG. 28(d), the contour vector sequence is also re-converted to a binary image by repeatedly executing steps TT44 through TT51.

B5: Modifications of Second Embodiment (1) Although each contour vector sequence is re-converted to a binary image in the above restoration process, the contour vector sequence can be directly converted to a multi-tone image in the following manner. With respect to the processed contour vector sequence obtained through contraction and expansion of an initial vector sequence shown in FIG. 15(E), for example, the threshold value Dth(=5) used in the binarization process is written instead of the value '1' into the paint buffer 54 (for example, FIG. 24(b)). The restoration process of FIG. 20 is executed in such an order that contour vector data obtained with the smaller threshold value Dth in binarization is processed first, that is, in the order from the contour vector of FIG. 15(I) up to that of FIG. 15(A). Multi-tone image data obtained through the above direct restoration are overwritten in the image data buffer 20 to thereby generate a final defect-free multi-tone image shown in FIG. 8(B). The direct conversion of contour vector data to multi-tone image data does not require the processing at step TT6 in FIG.

(2) Although boundary contour vectors are used in the above second embodiment, contour vectors running through pixel centers can be used for correction of an image contour.

C: Details of Contour Extraction

C1: Structure of Contour Extraction System

Figure 29:
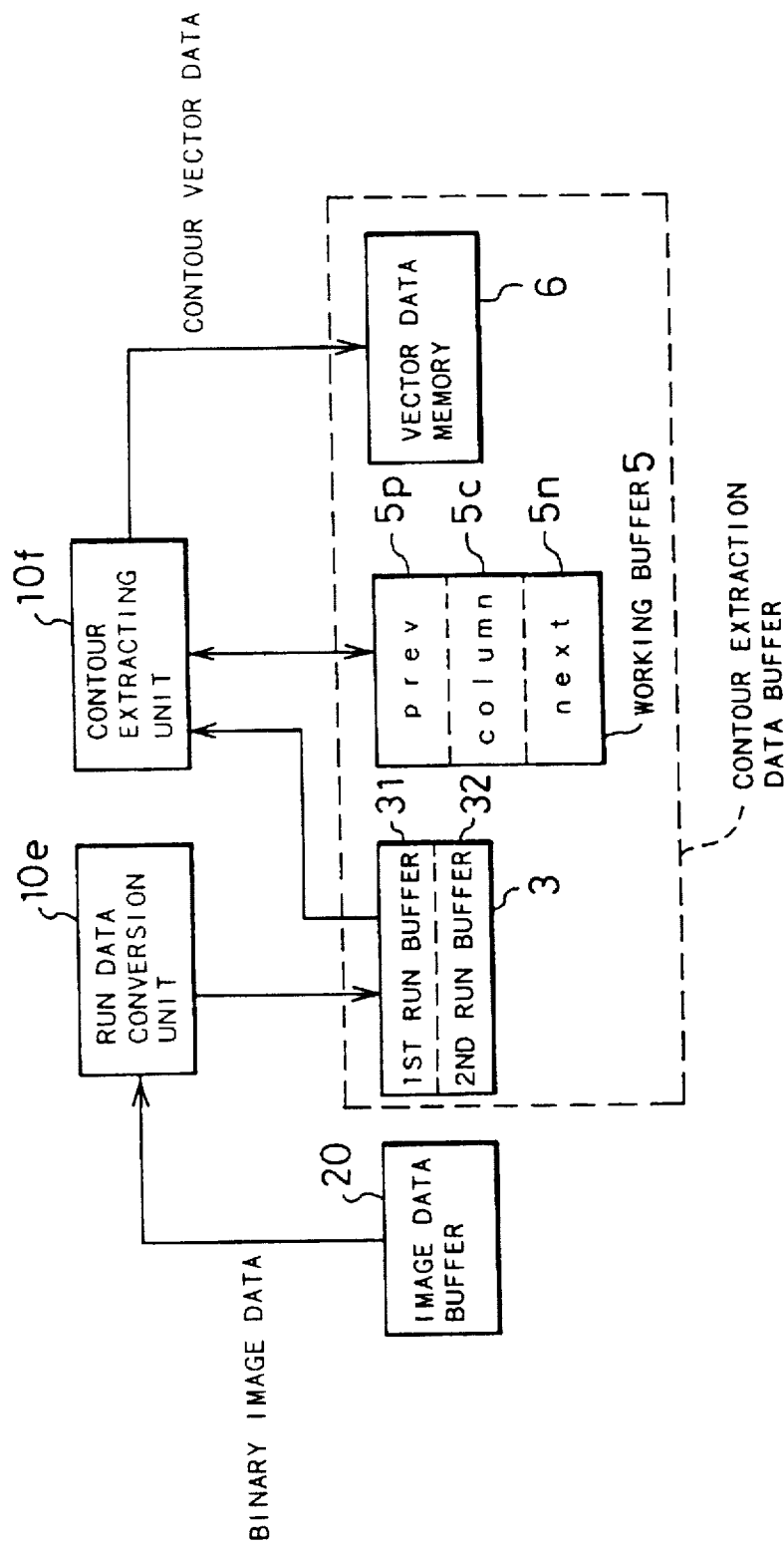
FIG. 29 is a block diagram showing a structure of a system regarding with contour extraction.

FIG. 29 is a block diagram showing a system structure concerning contour extraction. The run data conversion unit 10e, the contour extracting unit 10f, the image data buffer 20, and the contour extraction data buffer 24, all of which are shown in FIG. 13, are used for contour extraction. The contour extraction data buffer 24 includes a run data buffer unit 3, a working buffer unit 5, and a vector data memory 6.

The run data buffer unit 3 temporarily stores run data generated in the run data conversion unit 10e and includes a first run data buffer 31 for storing run data of a previous scanning line and a second run data buffer 32 for storing run data of a current scanning line.

The working buffer unit 5 temporarily stores data used in the contour extraction process and includes first through third registers, which are referred to as "prev. register 5p", "column register 5c", and "next register 5n". Details of these registers 5c, 5p, and 5n will be described later in detail.

The vector data memory 6 stores coordinate data of contour vector data and link pointers representing linkage of the coordinate data.

C2. Method of Converting image data into run-data

Figure 30A:
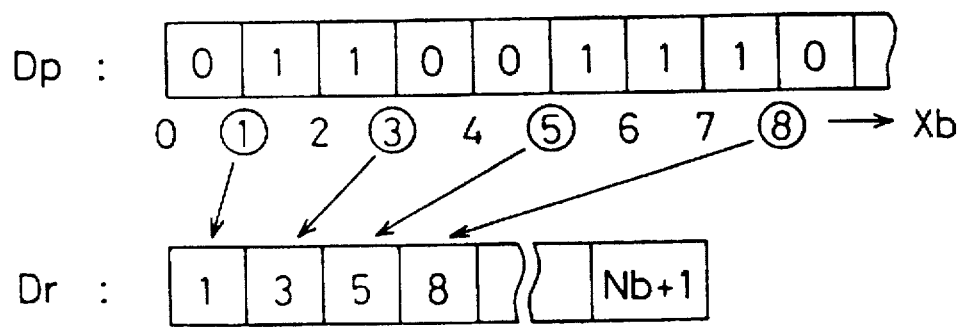
FIGS. 30(a) and 30(b) show a method of converting image data to run data executed in a run data conversion unit 10e.
Figure 30B:
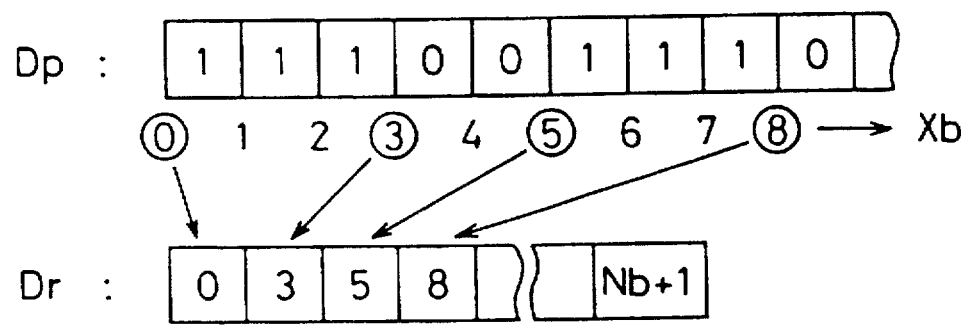

FIGS. 30(a) and 30(b) schematically illustrate a method of converting binary image data Dp into run-data Dr by the run-data conversion unit 10e. Each of FIGS. 30(a) and 30(b) shows a binary image data Dp, and run-data Dr obtained by converting the binary image data Dp. FIG. 30(a) is an example where the first value of the binary image data Dp on a scanning line is zero while it is one in FIG. 30(b).

The run-data Dr includes a sequence of the boundary coordinates Xb at which the value of the image data Dp changes. At the end of the run-data Dr for the given scanning line, the maximum value Nb of the boundary coordinate Xb plus one, or Nb+1, which is equal to the number of pixels on the scanning line plus one, is repeated three times as end data representing the end of the scanning line. The end data (Nb+1) accordingly defines the end of the run-data Dr for the given scanning line. When the first value of the binary image data on the scanning line is one as shown in FIG. 30(b), the first value of the run-data Dr is equal to zero.

C3. Linkage Process After Detection of Contour Vectors

FIGS. 31(a) through 35(c) illustrate the linkage process subsequent to detection of each contour vector. The linkage process denotes updating the linkage of contour vectors, or more concretely registering specific data representing start point and end point of each contour vector in the working buffer 5 and the vector data memory 6. The contour extraction unit 10f executes this linkage process.

In the description below, 'column[#Xb]' denotes the position of the boundary coordinate Xb in the column-register 5c or the data registered at that position, and 'prev[#Xb]' and 'next[#Xb]' have the similar meanings.

Figures 31A, 31B, 31C:
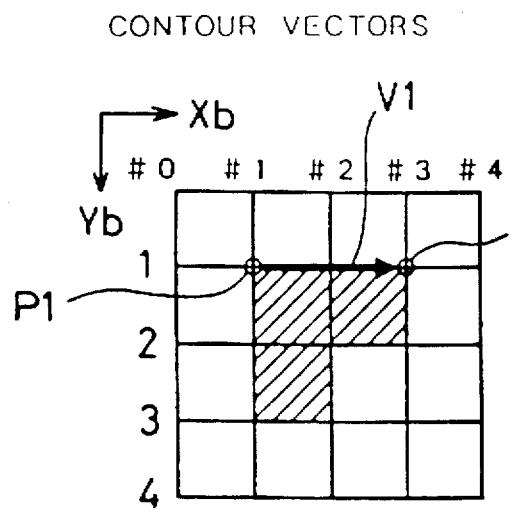
FIGS. 31(a) through 31(c) show linkage process subsequent to detection of each contour vector, where data is registered in the working buffer 5 and the vector data memory 6 of the apparatus.

FIG. 31(a) shows a detected contour vector V1. The boundary coordinates (Xb, Yb) of a start point P1 and an end point P2 of the vector V1 are respectively stored at addresses *1 and *2 in the vector data memory 6. Link data at each address of the vector data memory 6 indicates the address of another coordinate data which is linked with the coordinate data stored at each respective address. In this embodiment, the link data indicates the address at which the coordinate data of the end point of the vector is stored. For example, in FIG. 31(c), the coordinate data (1,1) of the start point P1 of the vector V1 is stored at address *1, and the link data at address *1 shows address *2 where the coordinate data (3,1) of the end point P2 is stored. The link data 'NC' stored at the address *2 indicates that there is no other address linked to address *2.

As shown in FIG. 31(b), the three registers of the working buffer 5 can store one data for each boundary coordinate Xb. Functions of the three registers are as follows:

The column-register 5c stores the address of the vector data memory 6 at which the coordinate data of the starting point of a vector sequence, or a series of linked vectors, is memorized, at the position corresponding to the boundary coordinate Xb of the starting point. In a similar manner, the address of the memory 6 for the coordinate data of the terminal point of the vector sequence is stored at the position corresponding to the boundary coordinate Xb of the terminal point. In FIG. 31(b), the address *1 of the vector data memory 6, at which the coordinate data (1,1) of the start point P1 is registered, is written at column[#1] corresponding to the boundary coordinate Xb=#1 of the start point P1 of the detected vector V1. The address of the vector data memory 6 will be hereinafter referred to as "address of the coordinate data." The address *2 of the coordinate data (3,1) of the end point P2 is written at column[#3] corresponding to the boundary coordinate Xb=#3 of the end point P2. The symbol '–' in the register shows that no valid data is registered there.

The previous-register 5p stores the value of the boundary coordinate Xb of the starting point of the vector sequence at the position corresponding to the boundary coordinate Xb of the terminal point of the vector sequence. In FIG. 31(b), the boundary coordinate Xb=#1 of the start point P1 of the vector V1 is registered at prev[#3] corresponding to the boundary coordinate Xb=#3 of the end point P2 of the vector V1.

The next-register 5n stores the value of the boundary coordinate Xb of the terminal point of the vector sequence at the position of the boundary coordinate Xb of the starting point of the vector sequence. In FIG. 31(b), the boundary coordinate Xb=#3 of the end point P2 of the vector V1 is registered at next[#1] corresponding to the boundary coordinate Xb=#1 of the start point P1 of the vector V1.

Data stored in these registers correspond to the correspondence data of the claimed invention.

FIGS. 32(a) through 32(c) show linkage process when another vector V2 is detected subsequent to the first vector V1. As will be described later in detail, the contour extraction unit 10f detects the vectors which extend along the axis of the boundary coordinate Xb or in the primary scanning direction, as a function of the run-data. The vector V2 is detected after the vector V1 accordingly. When the vector V2 is detected, specific data relating to the vector V2 is stored in the vector data memory 6 and the working buffer 5. Another vector V3 which extends along the boundary coordinate Yb or in the secondary scanning direction is detected as a function of the data for the vectors V1 and V2. The following steps (1) through (11) explain the registration of the specific data relating to the vector V2, the detection of the vector V3, and the registration of specific data concerned with the vector V3. Some of the symbols "(1)" through "(11)" indicating the following steps (1) through (11) are shown in the FIGS. 32(a) through 9(c) for further explanation. The arrows in those figures show either that one data is changed to the other data or that the data is used to point out some position.

Step (1): When the vector V2 is detected as shown in FIG. 32(a), the boundary coordinates (Xb, Yb) of a start point P3 and an end point P4 of the vector V2 are respectively stored at addresses *3 and *4 in the vector data memory 6 as shown in FIG. 32(c). Simultaneously, link data *4 representing linkage of the coordinate data (3,2) at the address *3 with the coordinate data (2,2) at the address *4 is registered at the address *3 in the vector data memory 6. Link data "NC"stored at the address *4 indicates that the coordinate data at the address *4 is not connected with any other address.

Step (2): As shown in FIG. 32(b), in the previous-register 5p, the boundary coordinate Xb=#3 of the start point P3 of the vector V2 is registered at prev[#2] corresponding to the boundary coordinate Xb=#2 of the end point P4 of the vector V2. In the next-register 5n, the boundary coordinate Xb=#2 of the end point P4 of the vector V2 is registered at next[#3] corresponding to the boundary coordinate Xb=#3 of the start point P3 of the vector V2.

Step (3): In the column-register 5c, the address *3 of the coordinate data (3,2) of the start point P3 is written at column[#3] corresponding to the boundary coordinate xb=#3 of the start point P3 of the vector V2. When other data has already been registered at the position, new data is written over it.

Step (4): When the contour extraction unit 10f tries to writes the address *3 at the column[#3] during the step (3) to find out that address *2 is already registered at the position, the unit 10f identifies the linkage between the address *2 and the address *3 and stores the address *3 as the link data at the address *2 in the vector data memory 6 as shown in FIG. 32(c). Thus another vector V3 is detected between the points P2 and P3 (FIG. 32(a)), and a new vector sequence is made which consists of the three vectors V1, V3, and V2 connected in this order. The new vector sequence has a starting point which is the start point P1 of the vector V1, and a terminal point which is the end point P4 of the vector V2.

FIGS. 33(a) through 33(c) show the data stored in the vector data memory 6 and the working buffer 5 after execution of the steps (1) through (4) as well as the processing of the subsequent steps (5) through (8).

Step (5): At the completion of the step (4), both prev[#3] and next[#3] stores some data. This indicates that the points P2 and P3 at the boundary coordinate Xb=#3 are connected to another point before them and to still another point after them. In other words, the points P2 and P3 at the boundary coordinate Xb=#3 are intermediate points of the vector sequence. The contour extraction unit 10f then updates the registered data in the working buffer corresponding to the boundary coordinate Xb=#3 according to the following steps (5) through (7). The updating of the registered data in the working buffer 5 will be hereinafter called ,"correspondence optimization process."

In the correspondence optimization process, the registered data in the next-register 5n are updated in the following manner. The contour extraction unit 10f first reads the boundary coordinate Xb=#1 stored at prev[#3] which corresponds to the coordinate data #3 under processing. The data #1 at prev[#3] indicates that the previous point connected to the points at the boundary coordinate Xb=#3 is located at the boundary coordinate Xb=#1. Referring to the coordinate #1, the extracting unit 10f reads the boundary coordinate Xb=#3 stored at next[#1]. The data #3 at next[#1] indicates that the next point connected to the points at the boundary coordinate Xb=#1 is located at the boundary coordinate Xb=#3. In order to eliminate the registered data concerning the intermediate points P2 and P3 from the working buffer 5, the registered data in the next-register 5n are to be updated such that they indicate that the point P4 is connected to the point P1. This updating is accomplished by rewrite the data at next[#1], which indicates the next point of the point P1, with the data #2 at next[#3], which indicates the next point of the points P2 and P3. Consequently, the data at next[#1] is changed to the coordinate data #2.

Step (6): Registered data in the previous-register 5p is updated in a similar manner. The contour extraction unit 10f first reads the data #2 at next[#3] corresponding to the boundary coordinate Xb=#3 of the intermediate points P2 and P3, and then reads the data #3 at prev[#2]. The data #3 at prev[#2] shows that the previous point of the points p2 and P3 is the point PA. In order to eliminate the data concerning the intermediate points P2 and P3 positioned at the boundary coordinate Xb=#3 from the working buffer 5, the data #1 at prev[#3] showing the boundary coordinate Xb of the previous point of the points P2 and P3 is stored at prev[#2] showing the boundary coordinate Xb of the previous point of the point P4.

Step (7): After updating the registered data in the previous-register 5p and the next-register 5n, the contour extraction unit 10f eliminates the registered data for the intermediate points P2 and P3 from the registers 5p, 5c, and 5n, that is, data at prev[#3], column[#3], and next[#3].

As described above, the correspondence optimization process according to the steps (5) through (7) updates the connection data stored in the previous-register 5p and the next-register 5n.

Step (8): In the column-register 5c, the address *4 of the coordinate data of the end point P4 is written at column[#2] corresponding to the boundary coordinate Xb=#2 of the end point P4. All the connection process following the detection of the vector V2 are thus completed.

FIGS. 34(a) through 34(c) show the registered data after the step (8). The data #1 at prev[#2] suggests that the terminal point of the vector sequence is located at the boundary coordinate Xb=#2 and that the starting point of the vector sequence is located at the boundary coordinate Xb=#1. The data #2 at next[#1] indicates that the starting point of the vector sequence is located at the boundary coordinate Xb=#1 and that the terminal point of the vector sequence is located at the boundary coordinate xb=#2. In the column-register 5c, the addresses *1 and *4 for the coordinate data of the starting point and the terminal point of the vector sequence are stored at the respective positions of the boundary coordinate Xb.

Figures 35A, 35B, 35C:
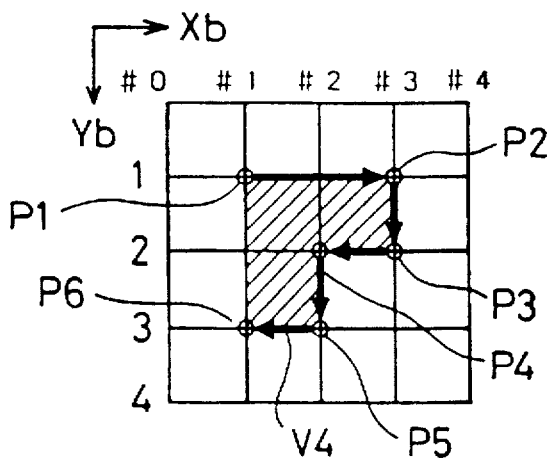
FIGS. 35(a) through 35(c) show linkage process subsequent to detection of each contour vector.

FIGS. 35(a) through 35(c) shows the processing when another vector V4 is further detected.

Step (9): When the vector V4 is detected, coordinate data (2,3) of a start point P5 and the same (1,3) of an end point P6 of the vector V4 are respectively registered at addresses *5 and *6 in the vector data memory 6. Through the same process as the above step (3), link data showing connection of the point P5 at the address *5 with the point P6 at the address 86 is also registered in the memory 6. This results in a new vector sequence including the six points P1 through P6 which are connected in this order.

Step (10): According to the same process as the above step (4), specific data are written at prev[#1] and next[#2], respectively. In the previous-register 5p, boundary coordinate xb=#2 of the start point P5 of the vector V4 is registered at prev[#1] corresponding to the boundary coordinate Xb=#1 of the end point P6 of the vector V4. In the next-register 5n, the boundary coordinate Xb=#1 of the end point P6 of the vector V4 is registered at next[#2] corresponding to the boundary coordinate Xb=#2 of the start point P5 of the vector V4.

The following expressions hold in this state:

$$\text{prev}[\#2]=\text{next}[\#2] \qquad \text{(Ex1)}$$

$$\text{prev}[\#1]=\text{next}[\#1] \qquad \text{(Ex2)}$$

Suppose that the boundary coordinate of a start point of a newly detected vector is Xs, and that the boundary coordinate of its end point is Xe, the above expressions (Ex1) and (Ex2) are rewritten as follows:

$$\text{prev}[Xs]=\text{next}[Xs] \qquad \text{(Ex1a)}$$

$$\text{prev}[Xe]=\text{next}[Xe] \qquad \text{(Ex2a)}$$

When the above expressions (Ex1a) and (Ex2a) hold, both the start point and the end point of the newly detected vector can be a starting point of a new vector sequence as well as its terminal point. This indicates that the new vector sequence forms a closed-loop.

Step (11): When detecting that the expressions (Ex1a) and (Ex2a) hold, the contour extraction unit 10f defines the start point P5 of the vector V4 as the starting point of the closed-loop vector sequence, and registers link data *1 at the address *6 showing that the coordinate data (1,3) of the end point P6 of the vector V4 is connected to the coordinate data at the address *1. As a result, a closed-loop vector sequence including all the points P1 through P6 is formed which defines the contour of an image area.

After a closed-loop vector sequence is formed, the boundary coordinates Xb of the start point and the end point which are lastly stored in the working buffer 5 are eliminated.

The contents of the registered data in the working buffer 5 and the vector data memory 6 are summarized as follows:

a) Column-register 5c: The address of the coordinate data of the starting point of a vector sequence is stored at the position corresponding to the boundary coordinate Xb of the starting point. In a similar manner, the address of the coordinate data of the terminal point in the vector sequence is stored at the position corresponding to the boundary coordinate Xb of the terminal point.

b) Previous-register 5p: The boundary coordinate Xb of the starting point of the vector sequence is written at the position corresponding to the boundary coordinate Xb of the terminal point.

c) Next-register 5n: The boundary coordinate Xb of the terminal point of the vector sequence is written at the position of the boundary coordinate Xb of the starting point.

d) Coordinate data in the vector data memory 6: This data shows the boundary coordinates (Xb, Yb) of a start point or an end point of the detected vectors.

e) Link data: This data shows connection of the start point and the end points of the detected vectors.

By using the working buffer 5 and the vector data memory 6, whenever detecting a vector parallel to the axis of the boundary coordinate Xb, the contour extraction unit 10f can register specific data of a starting point and a terminal point of a new vector sequence and update the linkage of the points in the vector sequence. Furthermore, when the vector sequence forms a closed-loop, the contour extracting unit 10f can detect the closed-loop without delay. As described above in detail, the contour extracting apparatus detects vectors at each scanning line by processing run-data while outputting contour vector data of a closed-loop vector sequence to external devices immediately after the detection of the closed-loop. In other words, the contour extracting apparatus can detect a contour of an image area without processing image data for all the scanning lines of the image, but by processing image data for one scanning line after another.

C4. Details of Linkage Process

Figure 36:
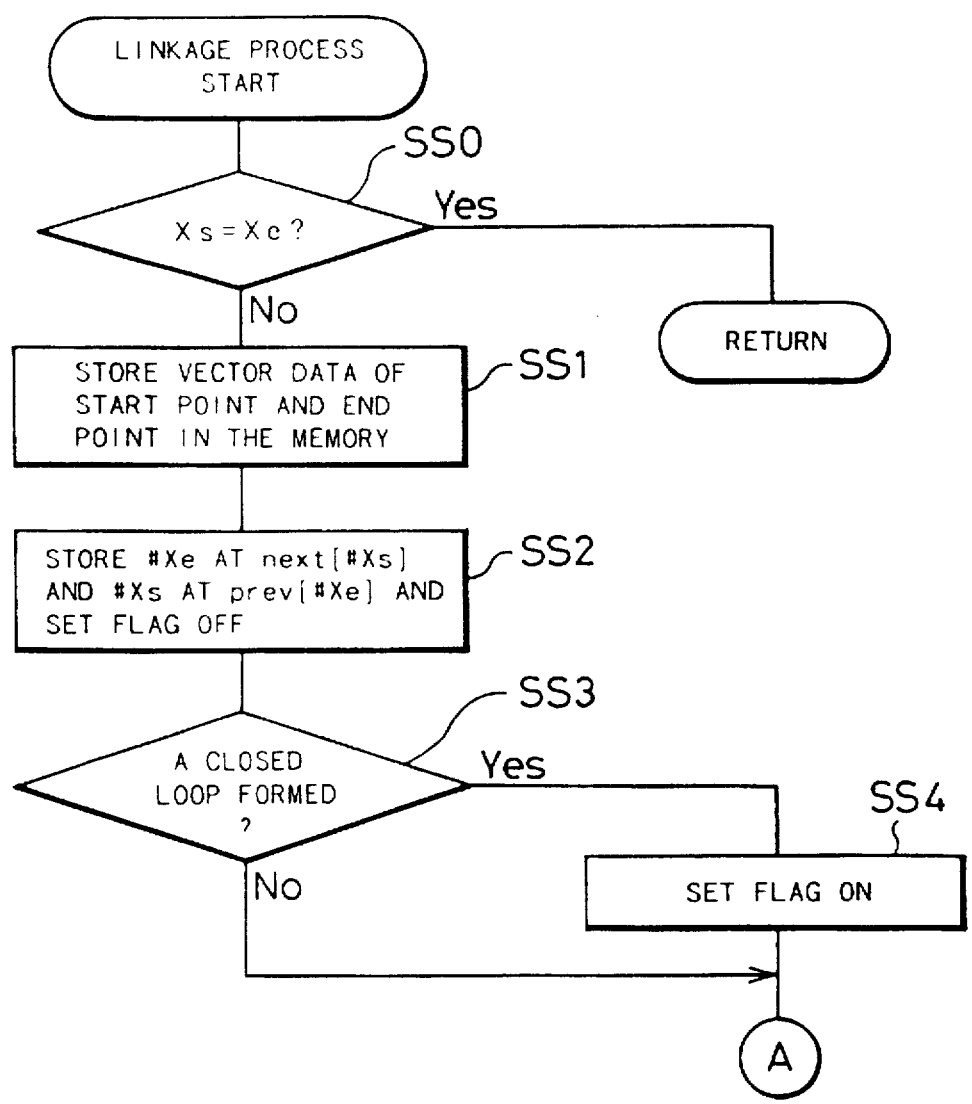
FIG. 36 is a flowchart showing details of the linkage process for connecting vectors.
Figure 37:
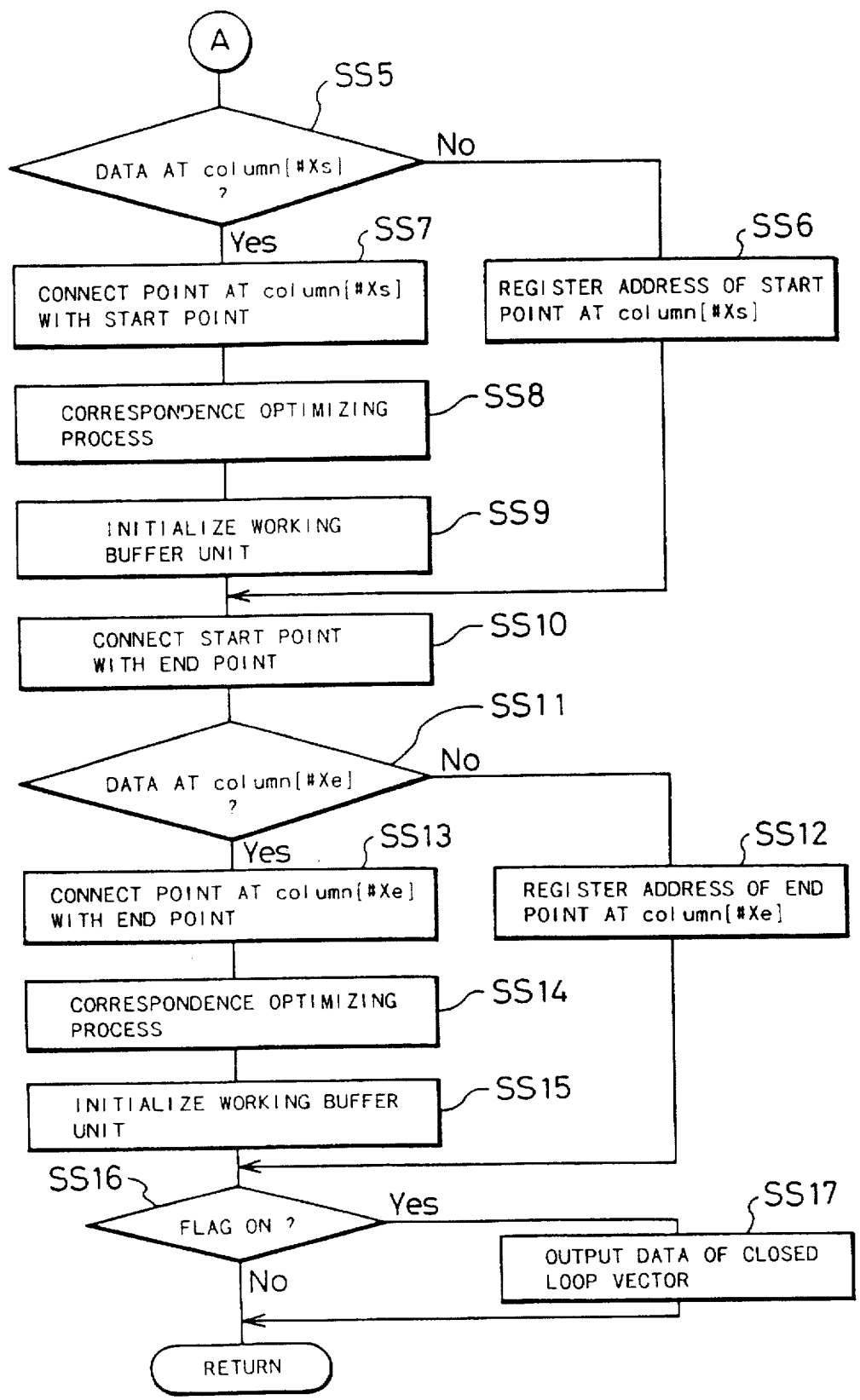
FIG. 37 is a flowchart showing details of the linkage process for connecting vectors.

FIGS. 36 and 37 are flowcharts showing the details of the linkage process of the vectors explained along with FIGS. 31(a) through 35(c).

At step SS0, X coordinate data Xs of a start point of a vector detected by the contour extraction unit 10f is compared with X coordinate data Xe of an end point of the vector. The program proceeds to step SS1 when Xs is not equal to Xe. Whereas the program quits the linkage process routine when Xs is equal to Xe. This is because no change is required in the current linkage state of the vector sequence when the X coordinate data Xs of the start point is equal to the X coordinate data Xe of the end point. The step SS0 effectively prevents conflict between linkage data in the registers of the working buffer 5.

At step SS1, coordinate data (Xs, Ys) of the start point and the same (Xe, Ye) of the end point for the detected vector are stored in the vector data memory 6. No link data has been registered yet at this stage.

At step SS2, coordinate data Xe and Xs are respectively stored at next[#Xs] and prev[#Xe], respectively, and a flag used in detecting a closed-loop is set OFF.

At step SS3, it is determined whether a vector sequence forms a closed-loop, that is, whether the above expressions (Ex1a) and (Ex2a) hold.

When it is judged that the vector sequence forms a closed-loop at step SS3, the program proceeds to step SS4 at which the flag is set ON, and subsequently to step SS5 in FIG. 37. When the vector sequence does not form a closed-loop, the program directly goes from step SS3 to step SS5 in FIG. 37.

At step SS5, it is judged whether some data has already been registered at column[#Xs]. When there is no data at column[#Xs], the program goes to step SS6 at which the address of the coordinate data of the start point of the newly detected vector is written at column[#Xs]. The program then proceeds to step SS10 at which link data showing the connection of the coordinate data of the start point with the coordinate data of the end point is stored in the vector data memory 6.

When there is address data previously registered at colunm[#Xs] at step SS5, the program goes to step SS7. At step SS7, that link data is written in the vector data memory 6, which connects the point indicated by the address previously registered at column[#Xs] with the start point which is newly stored at SS1. In other words, the coordinate data stored in the memory 6 at the address at column[#Xs] is connected with the coordinate data of the start point stored at step SS1. This process corresponds to the step (4) explained above along with FIGS. 32(a) through 32(c).

At step SS8, the contour extraction unit 10f executes the correspondence optimization process in the working buffer 5, which corresponds to the processing of the steps (5) and (6) along with FIGS. 33(a) through 33(c). The program then goes to step SS9 to initialize the data to nil which are stored at the position corresponding to the boundary coordinate Xs of the starting point in the registers of the working buffer 5. This process corresponds to the step (7) along with FIGS. 33(a) through 33(c). At step SS10, the link data showing the connection of the coordinate data of the start point with the coordinate data of the end point is stored in the vector data memory 6.

Steps SS11 through SS15 are the same processing as steps SS5 through SS10, but they are for the end point of the vector.

At step SS16, it is judged whether the flag for identifying a closed-loop is ON or OFF. When the flag is OFF, the program immediately exits from the linkage process routine. When the flag is ON, on the other hand, the program goes to step SS17, at which the vector data of the closed-loop vector is output to external devices, and then concludes the processing. "To output data to external devices" means, for example, to store the data in a magnetic disk 38. At step SS17, the coordinate data lastly registered in the vector data memory 6 is output first to the external devices, and the other coordinate data are successively output according to the link data. When the referred link data indicates the address of the coordinate data lastly registered, the contour extracting unit 10f stops the data output.

C5. Details of Vector Detection Process

Figure 38:
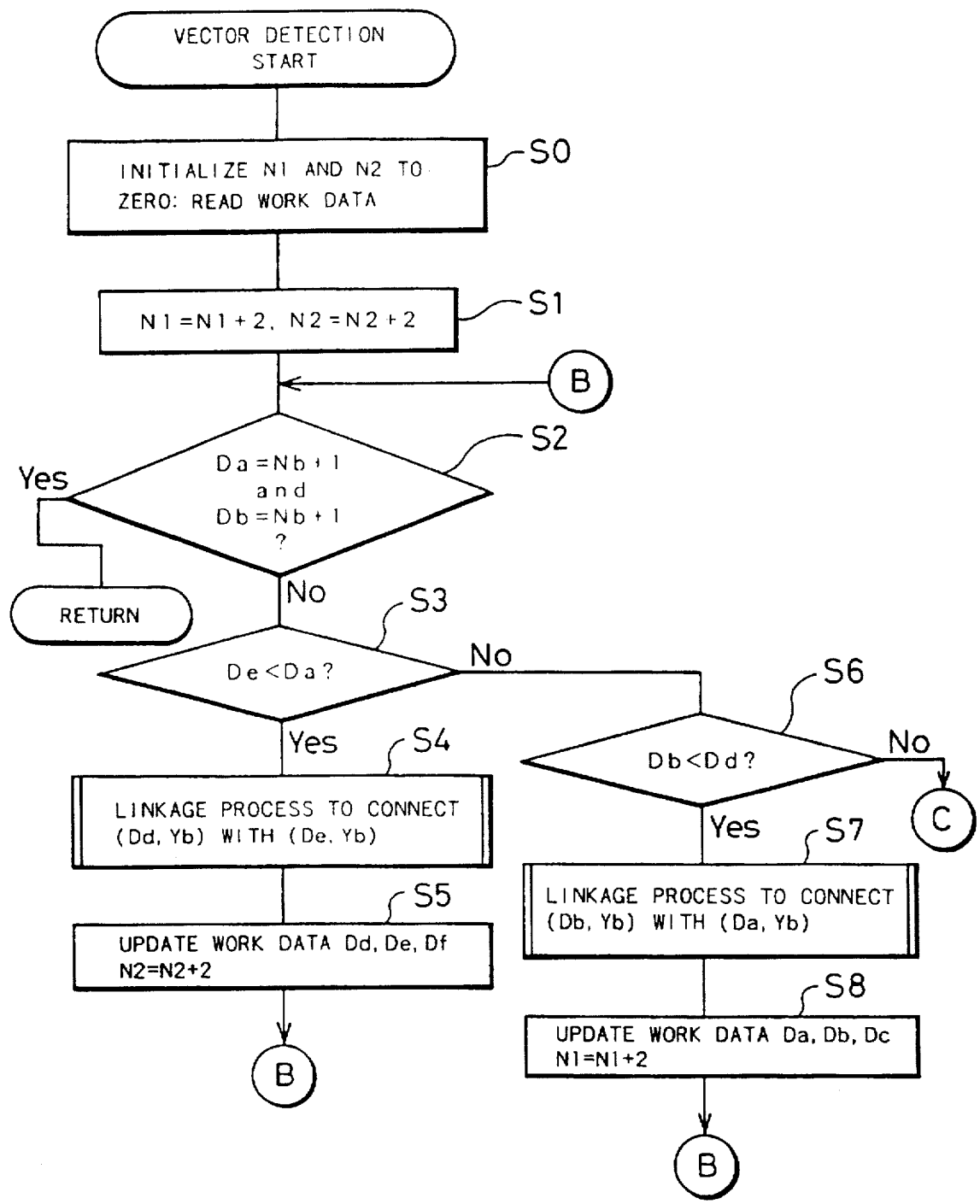
FIG. 38 is a flowchart showing steps of vector detection process.
Figure 39:
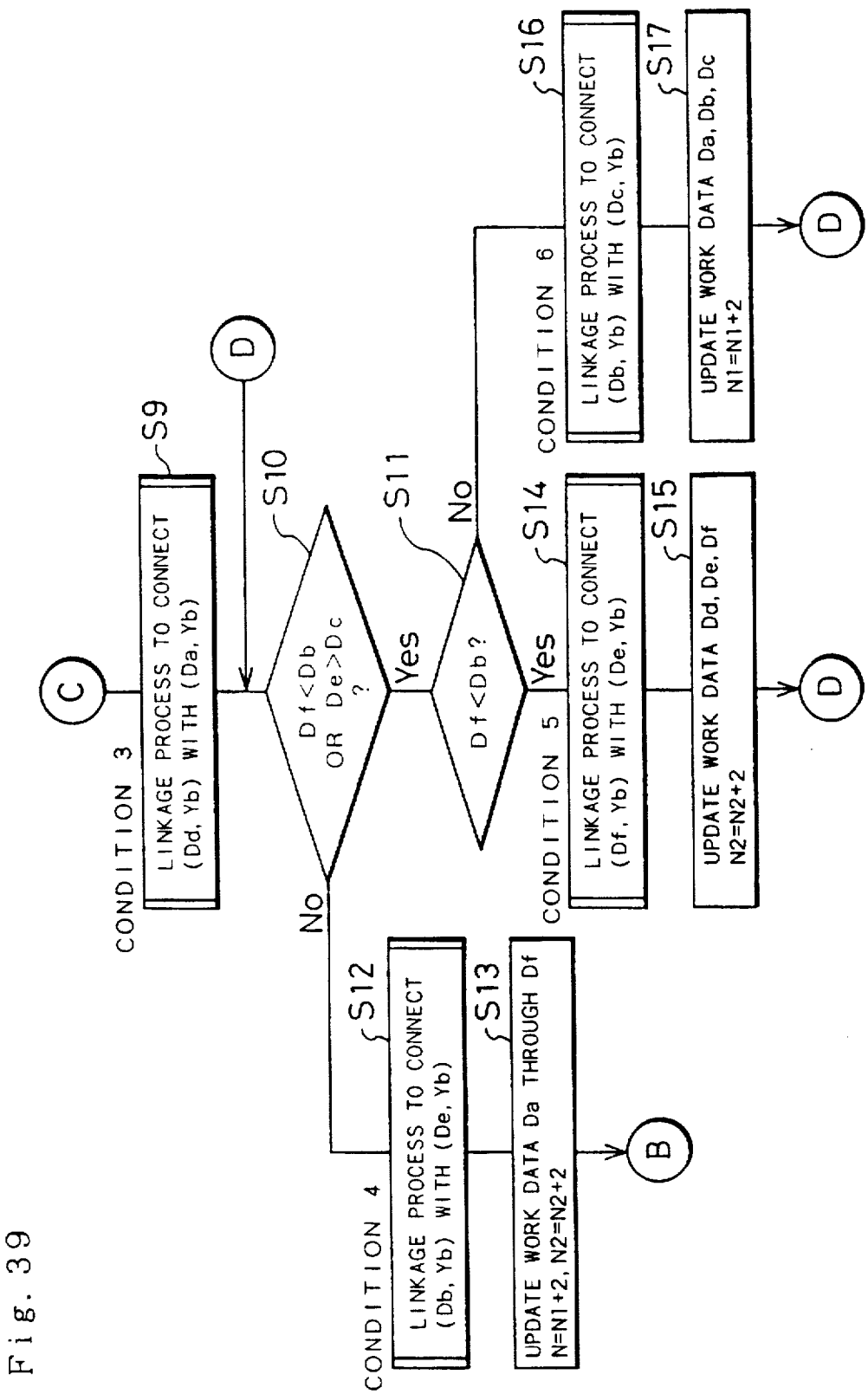
FIG. 39 is a flowchart showing steps of vector detection process.

FIGS. 38 and 39 are flowcharts showing the detailed steps of vector detection and the subsequent linkage process. The contour extraction unit 10f detects vectors as a function of run-data of two adjacent scanning lines stored in the run-data buffer 3.

When the program starts the vector detection routine at step S0, the following pointers N1 and N2 used in detecting vectors are initialized. FIGS. 40(a) through 40(c) illustrate the following pointers N1 and N2 and work data Da–Df.

First address pointer N1: This pointer indicates an address in the first run-data buffer 31, and is initialized to zero at step S0.

Second address pointer N2: This pointer indicates an address in the second run-data buffer 32, and is initialized to zero at step S0.

Work data Da through Df: Da denotes run-data stored at the address indicated by the first address pointer N1 in the first run-data buffer 31, and Db and Dc denote run-data subsequent to Da. Dd denotes run-data stored at the address indicated by the second address pointer N2 in the second run-data buffer 32, and De and Df denote run-data subsequent to Dd. The work data Da through Df are stored in the supplementary memory 16.

At step S1 shown in FIG. 38, the values of the address pointers N1 and N2 are respectively increased by two. This increment process implies that the addresses of the work data Da and Dd in the run-data buffers 31 and 32 are respectively updated by two as shown by the broken lines in FIGS. 40(a) and 40(b).

As explained previously along with FIGS. 30(a) and 30(b), the run-data at the address 0 in the run-data buffer 3 indicates the boundary coordinate Xb at which the binary image data changes from zero to one. Since the value of the address pointer N1 is increased by two, the work data Da, Db, and Dc always indicate the positions of the changes of the binary image data from zero to one, one to zero, and zero to one, respectively. The work data Dd, De, and Df indicate the same changes as the work data Da, Db, and Dc.

At step S2, the work data Da and Dd are respectively compared with the end data (Nb+1) which indicates the end of each scanning line. When the answer is YES at step S2, the program exits from the routine. On the contrary, when the answer is NO at step S2, the program proceeds to step S3 at which the two work data Da and De are compared with each other.

Figure 41:
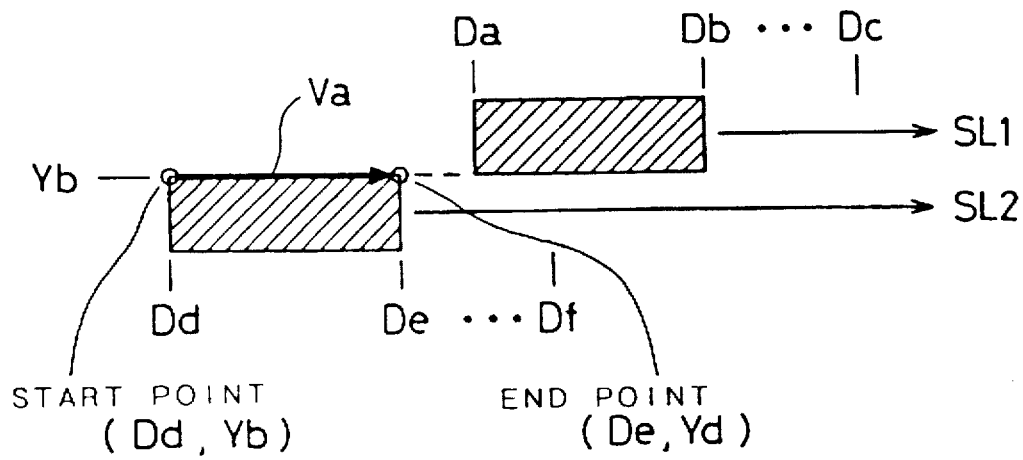
FIG. 41 is an explanatory view showing the configuration of image areas under Condition 1.

The program goes to step S4 when De is less than Da, while going to step S6 when De is not less than Da. FIG. 41 illustrates the image fragments when step S4 is to be executed. The work data Da, Db, and DC define an image fragment along a first scanning line SL1, and the work data Dd, De, and Df along a second scanning line SL2. The condition that De is less than Da will be hereinafter referred to as 'Condition 1'. In FIG. 41, Yb denotes a boundary coordinate in the secondary scanning direction between the first and the second scanning lines SL1 and SL2.

Since the work data Da, Db, and Dc always indicate the positions of the changes of the binary image data from zero to one, one to zero, and zero to one, respectively, as mentioned above, the value of the binary image data is always one between the positions indicated by the work data Da and Db, and it is zero between the positions indicated by the work data Db and Dc. In a similar manner, the value of the binary image data is always one between the positions indicated by the work data Dd and De, and it is zero between the positions indicated by the work data De and Df.

As clearly shown in FIG. 41, when De is less than Da, or under Condition 1, a vector Va extending from a point (Dd, Yb) to another point (De, Yb) is on the upper boundary of a black image area. At step S4, the contour extraction unit 10f executes the linkage process according to the steps shown in FIGS. 36 and 37 to thereby connect the point (Dd, Yb) with the point (De, Yb), and registers specific data concerning the vector Va in the working buffer 5 and the vector data memory 6.

After the linkage process is executed at step S4, the program proceeds to step S5 at which the work data Dd, De, and Df are updated and the second address pointer N2 is increased by two, and returns to step S2.

Figure 42:
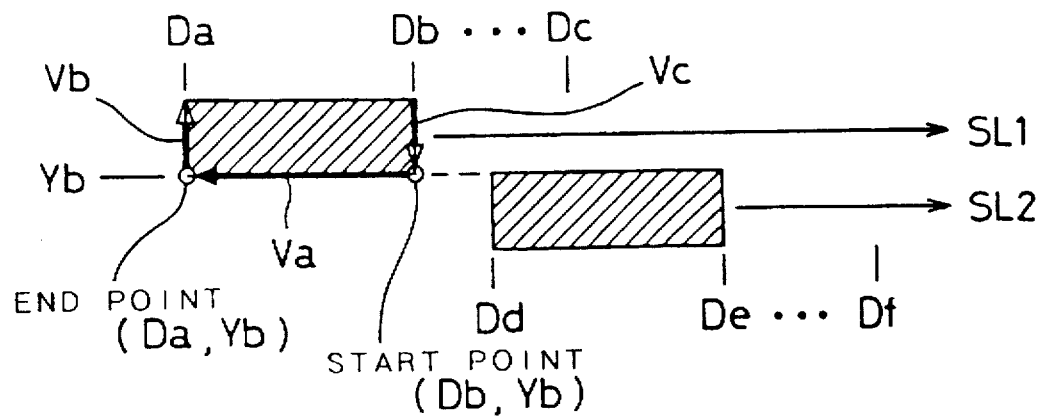
FIG. 42 is an explanatory view showing the configuration of image areas under Condition 2.

When De is not less than Da at step S3, the program goes to step S6 at which the work data Db is compared with the work data Dd. The program proceeds to step S7 when Db is less than Dd, while going to step S9 of FIG. 39 when Db is not less than Dd. FIG. 42 illustrates the image fragments under Condition 2 where step S7 is to be executed.

As shown in FIG. 42, Condition 2 is expressed as follows:

$$Da \leq De \text{ and } Db < Dd \qquad (\text{Ex3})$$

Under Condition 2, a vector Va extending from a point (Db, Yb) to another point (Da, Yb) is on the lower boundary of a black image area. At step S7, the contour extraction unit 10f executes the linkage process to connect the point (Db, Yb) with the point (Da, Yb), and registers specific data concerning the vector Va in the working buffer 5 and the vector data memory 6. The extracting unit 10f also executes the linkage process and registers specific data concerning a vector Vb extending upward from the point (Da, Yb) and another vector Vc extending downward to the point (Db, Yb).

After the linkage process is executed at step S7, the program proceeds to step S8 at which the work data Da, Db, and Dc are updated and the first address pointer N1 is increased by two, and returns to step S2.

When Db is not less than Dd at step S6, which state is referred to as 'Condition 3', the image fragments are in one of four states shown in FIGS. 43(a), 43(b), 44, and 45.

Condition 3 is expressed as:

$$Da \leq De \text{ and } Dd \leq Db \qquad (\text{Ex4})$$

In any of the four states under Condition 3, the contour extraction unit 10f executes the linkage process to connect one point (Dd, Yb) with another point (Da, Yb) as a vector Va at step S9 of FIG. 39, and registers specific data concerning the vector Va in the working buffer 5 and the vector data memory 6. The extracting unit 10f also executes the linkage process and registers specific data concerning a vector Vb extending upward from the point (Da, Yb).

At steps S10 and S11, the work data Df is compared with Db, and the work data De with Dc. Based on the results of the comparison, the above four states are classified into three conditions: that is, Condition 4 corresponding to step S12 and FIGS. 43(a) and 43(b); Condition 5 corresponding to step S14 and FIG. 44; and Condition 6 corresponding to step S16 and FIG. 45.

Figure 43A:
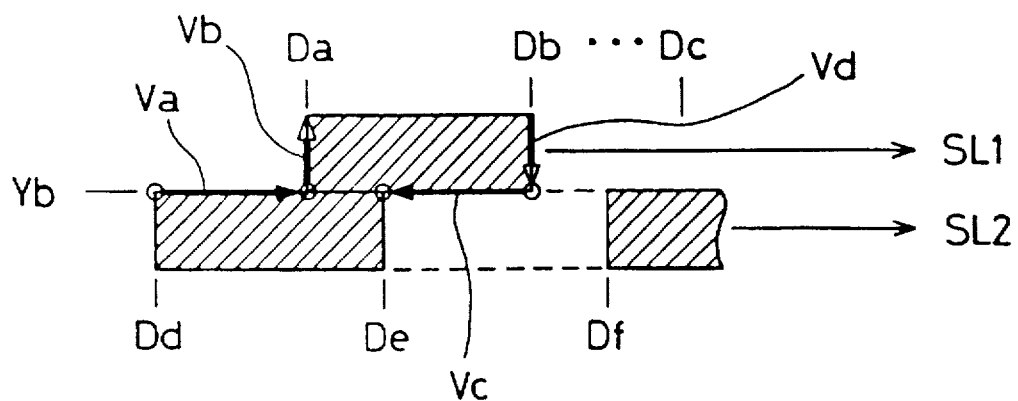
FIGS. 43(a) and 43(b) are explanatory views showing the configuration of image areas under Conditions 3 and 4.
Figure 43B:
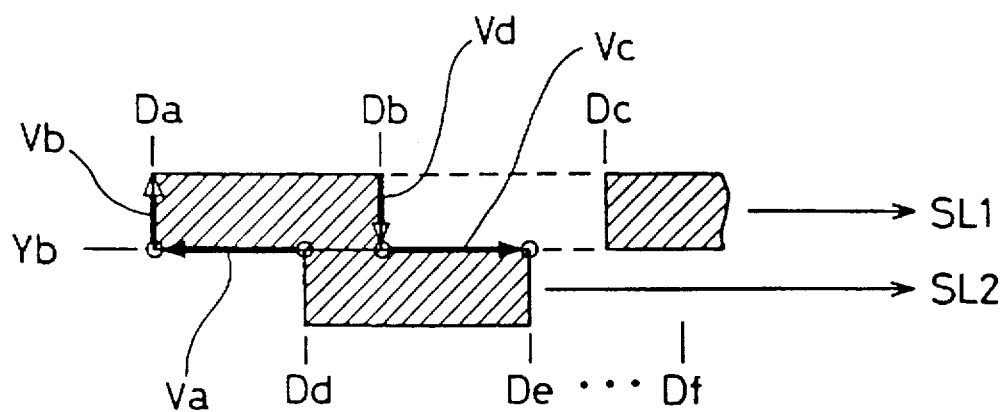

As shown in FIGS. 43(a) and 43(b), step S12 is executed when both Condition 3 and Condition 4 are met. Condition 4 is expressed as follows:

$$Db \leq Df \text{ and } De \leq Dc \qquad (\text{Ex5})$$

Figure 44:
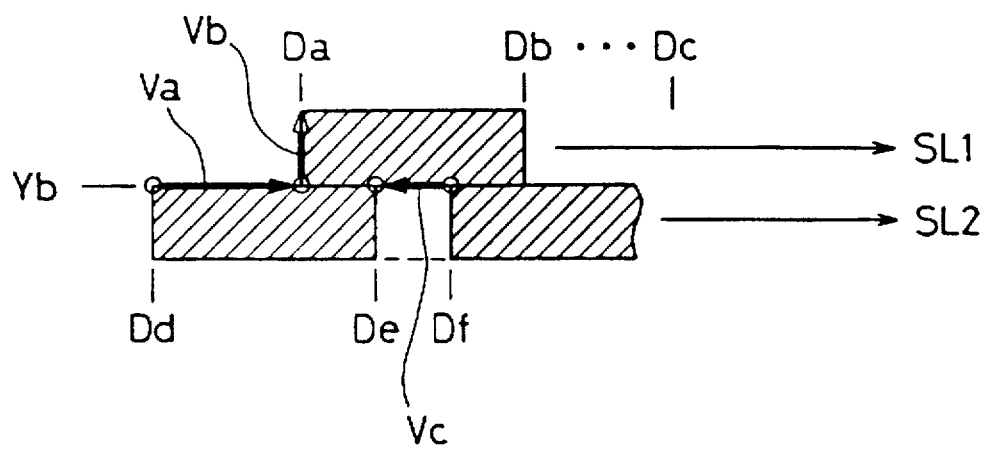
FIG. 44 is an explanatory view showing the configuration of image areas under Conditions 3 and 5.

Condition 4 holds in the state shown either in FIG. 43(a) or FIG. 43(b). Under Condition 4, the contour extraction unit 4 executes the linkage process to connect one point (Db, Yb) with another point (De, Yb) as a vector Vc at step S12, and registers specific data concerning the vector Vc in the working buffer 5 and the vector data memory 6. The extracting unit 10f also executes the linkage process and registers specific data concerning a vector Vd extending downward to the point (Db, Yb). After the linkage process is executed at step S12, the program proceeds to step S13 at which all the work data Da through Df are updated and both the first and second address pointers N1 and N2 are increased by two, and returns to step S2. AS shown in FIG. 44, step S14 is executed when both Condition 3 and Condition 5 are met. Condition 5 is expressed as:

$$Df < Db \qquad (\text{Ex6})$$

The contour extraction unit 10f executes the linkage process to connect one point (Df, Yb) with another point (De, Yb) as a vector Vc at step S14, and registers specific data concerning the vector Vc in the working buffer 5 and the vector data memory 6. After the linkage process is executed at step S14, the program proceeds to step S15 at which the work data Dd, De, and Df are updated and the second address pointer N2 is increased by two, and returns to step S10.

23

Figure 45:
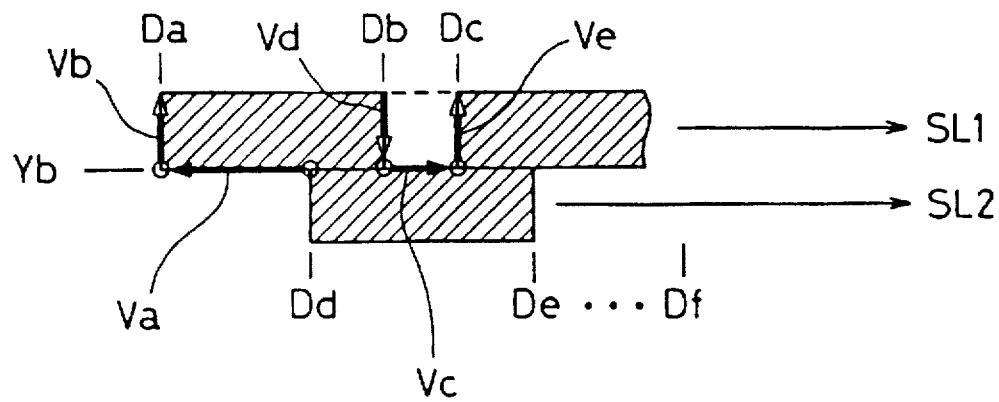
FIG. 45 is an explanatory view showing the configuration of image areas under Conditions 3 and 6.

As shown in FIG. 45, step S16 is executed when both Condition 3 and Condition 6 are met. Condition 6 is expressed as:

$$Dc < De \qquad (Ex7)$$

The contour extraction unit 10f executes the linkage process to connect one point (Db, Yb) with another point (Dc, Yb) as a vector Vc at step S16, and registers specific data concerning the vector Vc in the working buffer 5 and the vector data memory 6. The extracting unit 10f also executes the linkage process and registers specific data concerning a vector Vd extending downward to the point (Db, Yb) and another vector Ve extending upward from the point (DC, Yb). After the linkage process is executed at step S16, the program proceeds to step S17 at which the work data Da, Db, and Dc are updated and the first address pointer N1 is increased by two, and returns to step S10.

Under either Condition 5 or Condition 6, the program returns to step S10 and repeats the linkage process and updating of the work data until Condition 4 is met. When Condition 4 holds at step S10, the program goes to step S12 for executing process under Condition 4, and returns to step S2.

As described above in detail, the contour-extracting apparatus detects contour vectors on the boundary between two adjacent scanning lines as a function of run-data of the two scanning lines stored in the run-data buffer 3.

The method of extracting vectors as a function of run-data of two scanning lines is also described in "An Improved Algorithm for the Sequential Extraction of Boundaries from a Raster Scan" (David W. Capason, COMPUTER VISION, GRAPHICS, AND IMAGE PROCESSING, Vol.28, 109–125, 1984), and UK Patent GB 2,201,562A mentioned above.

C6. Overall Processing Procedure

Figure 46:
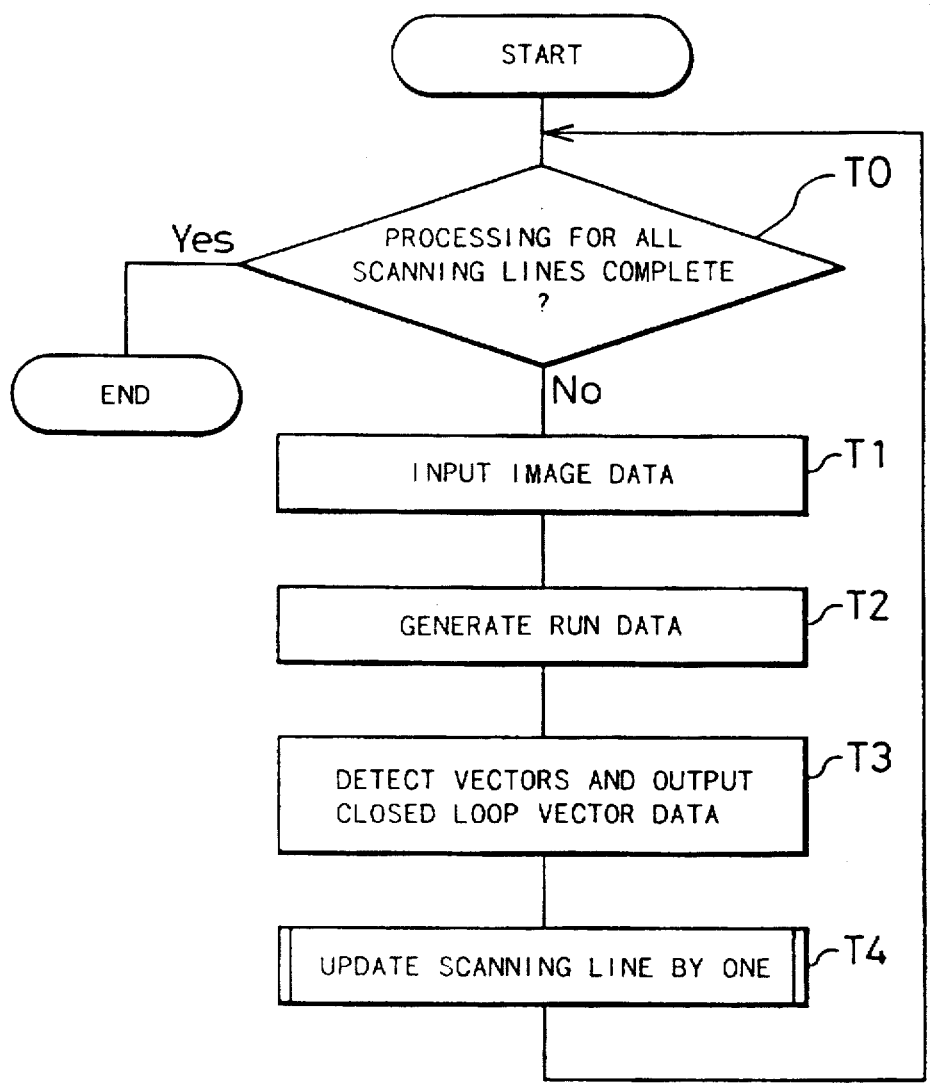
FIG. 46 is a flowchart showing steps of the whole processing in the embodiment.
Figures 48A, 48B, 48C, 48D:
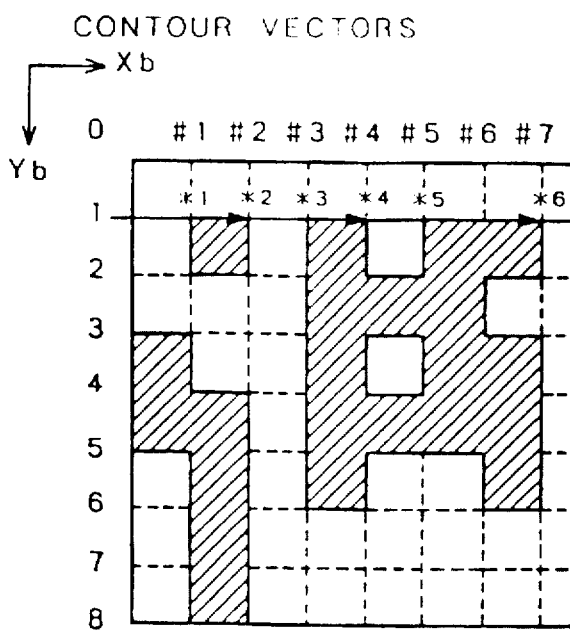
FIGS. 48(a) through 48(d) show a process for extracting contour vectors along each boundary scanning line.

FIG. 46 is a flowchart showing the overall processing in the embodiment.

When the program starts, it is judged whether the processing is completed for all the scanning lines on an image to be processed at step T0. When the answer is NO at step T0, the program proceeds to step T1 at which binary image data of one scanning line is read out from the image data buffer 20.

At step T2, the binary image data is converted to run-data. Since run-data of two scanning lines are stored together in the run-data buffer 3 as explained above, the run-data for the first scanning line is converted at step T2, and then the program skips steps T3, T4, T0, and T1 and returns to step T2 to generate the run-data of the second scanning line. In general, run-data of the N-th scanning line is stored in the second run-data buffer 32 while run-data of the (N-1)-th scanning line is stored in the first run-data buffer 31.

At step T3, vectors are detected according to the steps shown in FIGS. 38 and 39, and the detected vectors are linked with one another according to the steps shown in FIGS. 36 and 37. When a closed-loop vector is detected in the linkage process, data specifying the closed-loop vector is output at step T3.

The program then goes to step T4 at which the set of two adjacent scanning lines to be processed is updated by one scanning line, and repeats steps T0 through T4.

FIGS. 47(a) through 55(d) are explanatory views illustrating an example where contour vectors are detected according to the above method. In these figures, the whole image consists of 8×8 pixels, and includes three image areas R1, R2, and R3 (shaded in the figures) at which the value of the binary image data is one. Each set of four figures, such

24 as FIGS. 47(a) through 47(d), illustrate the result of the processing executed for one scanning line running through the pixel boundary according to the procedure shown in FIG. 46. A scanning line running on the pixel boundary will be herein after referred to as "boundary scanning line", and a scanning line running on the pixel centers will be referred to as "pixel scanning line". The run-data of a pixel scanning line above the current boundary scanning line is stored in the first run buffer 31 while the run-data of a pixel scanning line below the current boundary scanning line is stored in the second run buffer 32.

In FIGS. 47(a) through 47(d), the run-data of a pixel scanning line below the boundary scanning line at Yb=0, that is, the run-data representing an image segment of the uppermost pixel scanning line shown in FIG. 47(a), is stored in the second run-data buffer 32. Since none of the areas R1, R2, and R3 exist on this pixel scanning line, only the end data representing the end of the run-data (shown with 'e' in FIG. 47(b)) is stored in the second run-data buffer 32. In the state shown in FIGS. 47(a) through 47(d), there is no vector detected on the boundary scanning line at Yb=0, and no data is thus registered in either the working buffer 5 or the vector data memory 6.

As shown in FIGS. 48(a) through 48(d), three vectors are detected on the boundary scanning line at Yb=1. Coordinate data of a start point and an end point of each of the three vectors are stored in the vector data memory 6 as well as its link data. Data on the start and end points of these three vectors are also registered in the working buffer 5.

Figures 49A, 49B, 49C, 49D:
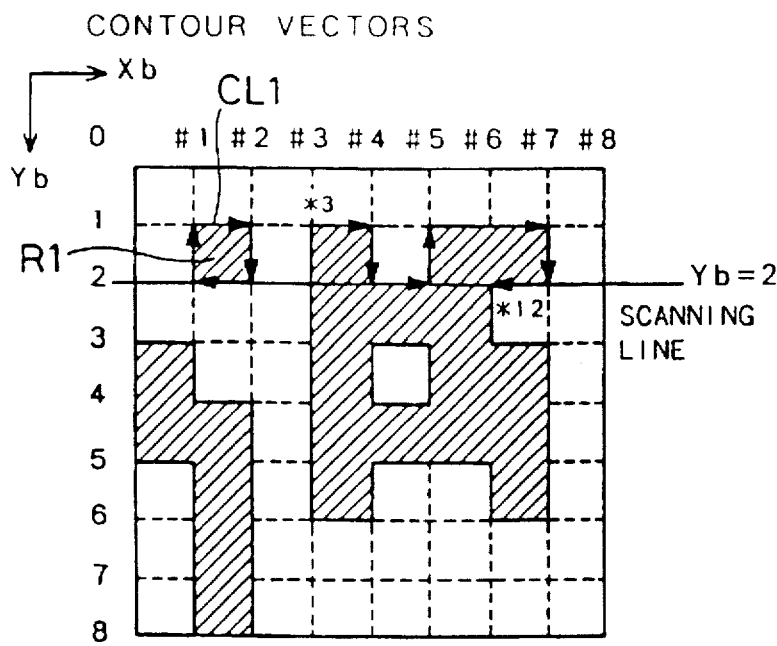
FIGS. 49(a) through 49(d) show a process for extracting contour vectors along each boundary scanning line.

In FIGS. 49(a) through 49(d), three other horizontal vectors are detected along the boundary scanning line at Yb=2 and vectors along the axis of the boundary coordinate Yb, that is, Five vertical vectors extending vertically in FIG. 49(a) are also detected to be linked with the horizontal vectors. A closed-loop vector CL1 of the area R1 is formed by connecting the coordinate data stored at addresses *1, *2, *7, and *8 in the vector data memory 6 of FIG. 49(d). Data specifying the closed-loop vector CL1 is then output to external devices, and they are eliminated from the working buffer 5 and the vector data memory 6.

In FIGS. 50(a) through 50(d), three other horizontal vectors are detected along the boundary scanning line at Yb=3 and connected with the vectors previously detected.

In FIGS. 51(a) through 51(d), a closed-loop vector CL2 defining the contour of a background area W2 surrounded by the area R2 is formed, and data specifying the closed-loop vector CL2 is output to the external devices.

In the similar manners, two other horizontal vectors are detected in FIGS. 52(a) through 52(d), and a closed-loop vector CL3 defining the contour of the area R2 is formed and output to the external devices in FIGS. 53(a) through 53(d). No vectors are newly detected in FIGS. 54(a) through 54(d). Another closed-loop vector CL4 defining the contour of the area R3 is formed and output to the external devices in FIGS. 55(a) through 55(d).

Figures 50A, 50B, 50C, 50D:
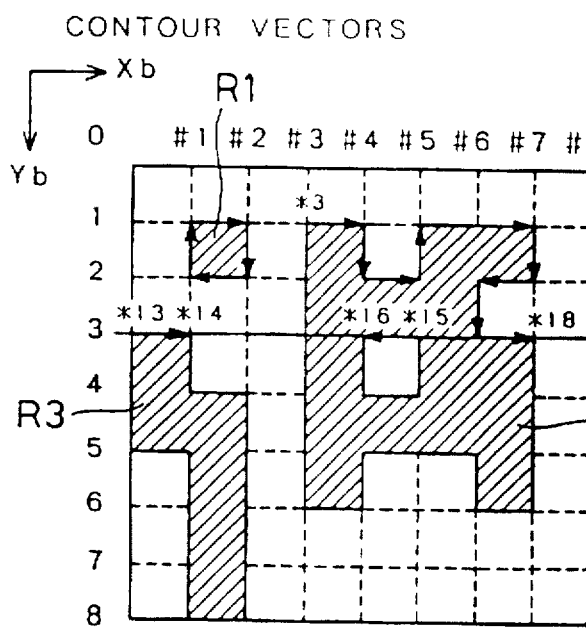
FIGS. 50(a) through 50(d) show a process for extracting contour vectors along each boundary scanning line.
Figures 52A, 52B, 52C, 52D:
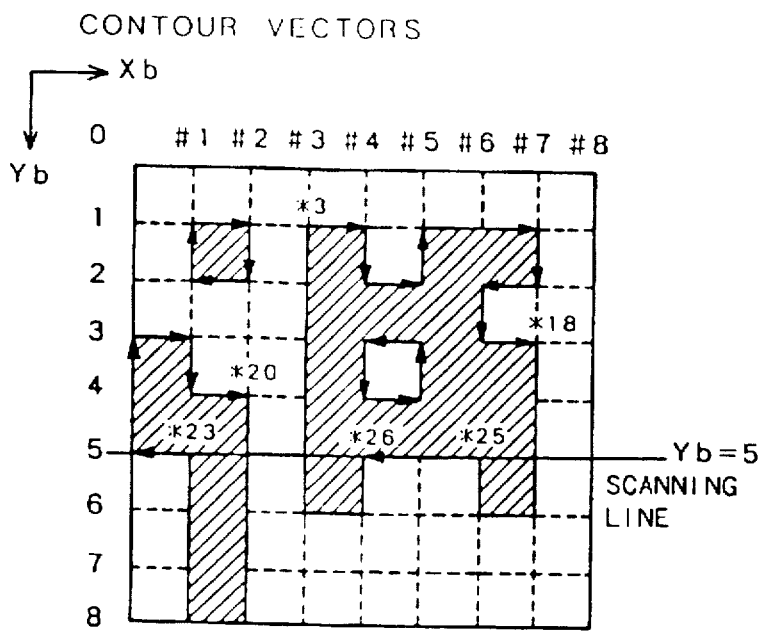
FIGS. 52(a) through 52(d) show a process for extracting contour vectors along each boundary scanning line.
Figures 53A, 53B, 53C, 53D:
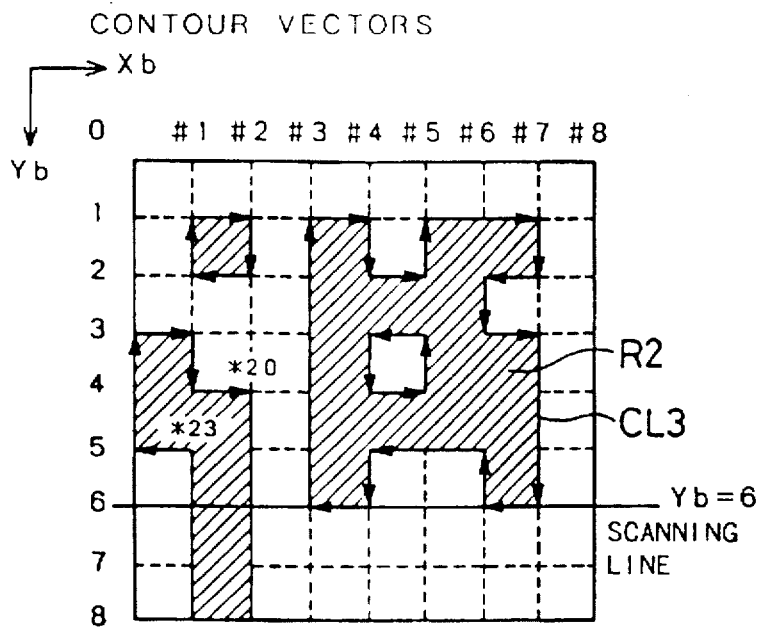
FIGS. 53(a) through 53(d) show a process for extracting contour vectors along each boundary scanning line.

As clearly shown in FIGS. 50(a), 51(a), and 52(a), when the whole image includes plural image areas (the areas R1 through R3 and the background area W1 in this example), plural sets of vector sequence are registered in the working buffer 5 and the vector data memory 6. Under such conditions, however, the value of the boundary coordinate Xb of a starting point of a certain vector sequence is not identical with the boundary coordinate Xb of a starting point or a terminal point of another vector sequence. Similarly, the boundary coordinate Xb of a terminal point of a certain vector sequence is not identical with the coordinate of a starting point or a terminal point of another vector sequence.

This can be attributed to the following reason. When the boundary coordinate Xb of a starting point or a terminal point of a first vector sequence is identical with the boundary coordinate Xb of a starting point or a terminal point of a second vector sequence, the first and the second vector sequences are connected vertically with each other at that boundary coordinate Xb to form a single connected vector sequence.

Taking into account of such characteristics about the points of vector sequences, each of the registers 5p, 5c, and 5n in the working buffer 5 is only required to store one piece of data corresponding to each boundary coordinate Xb. When a boundary coordinate Xb of a starting point or a terminal point of a first vector sequence is identical with another boundary coordinate Xb of a starting point or a terminal point of a second vector sequence, all the three registers 5p, 5c, and 5n is provided with specific data at the identical boundary coordinate Xb. This allows to identify the identical boundary coordinate Xb to be of an intermediate point in a single vector sequence, and the first vector sequence is linked with the second vector sequence. This processing is the correspondence optimization process described in detail along with FIGS. 33(a) through 33(c). When the above expressions (Ex1a) and (Ex1b) hold, a closed-loop vector is detected.

A significant feature of the contour extracting method is that the working buffer 5 allows to detect a closed-loop of contour vectors while successively updating the boundary scanning line to be processed one by one.

In the above contour extracting method, the run-data along one boundary scanning line, or along two pixel scanning lines, is successively processed, and a closed-loop vector sequence defining the contour of image areas is detected without processing all of the run-data for the whole image. The contour extracting method allows the downstream apparatus or devices to execute other processing on the image areas defined by the detected closed-loop vectors while the contour extracting apparatus is extracting the closed-loop vectors. The whole image can be therefore efficiently processed in relatively a short time.

C7. Modifications of Contour Extraction (1) The working buffer 5 can have any structure other than the above three registers 5p, 5c, and 5n as long as it includes registers for storing data representing the relationship between a starting point and a terminal point of each vector sequence.

(2) Vacant spaces of the vector data memory 6 can be managed to be used more effectively. FIG. 56 shows a method of managing vacant spaces in the vector data memory 6. In the state of FIG. 30, the data previously registered at addresses *1, *2, *7, and *8 have already been output as closed-loop vector data, whereby these addresses are now vacant. Under such a state, a vacancy address pointer BAP is used to indicate the address *1 of the first vacant space, thus allowing vector data which is newly detected to be stored in the vacant spaces. The address of the next vacant space is written as link data at each address of the vacant space; for example, the address *2 of the second vacant space is registered as the link data for the address *1; and the address *7 of the third vacant space is registered as the link data for the address *2. The vacancy address pointer BAP thus allows effective use of vacant spaces in the vector data memory 6.

D. Other Modifications

The present invention is not restricted to the above embodiment, but can be changed, altered, and modified to various applications without departing from the scope of the present invention. Some examples of modification are given below.

(1) The principle of the invention may be applicable to elimination of a undesirable image area in an image, for example, an electric wire running across the blue sky, a undesirable character, and a stain in a human face. More generally, the invention is applied to elimination of an irregularity or unevenness from a contour of an image.

(2) Although a choking width and a spreading width is determined according to the shape of the defect mask and set at a value no less than a width of the defect mask in the above embodiment, the choking and the spreading widths can be specified independently from the width of the defect mask.

Although the present invention has been described and illustrated in detail, it is clearly understood that the same is byway of illustration and example only and is not to be taken by way of limitation, the spirit and scope of the present invention being limited only by the terms of the appended claims.

What is claimed is:

1. An apparatus for correcting a multi-tone image comprising:

a first memory for storing first multi-tone image data representing image density for every pixel in said multi-tone image;

binarization mean for comparing said first multi-tone image data with each of a plurality of threshold values to thereby produce a plurality of first binary image data representing a plurality of binary images;

a second memory for storing said plurality of first binary image data;

contour correction means for correcting a contour of each of said plurality of binary images by executing image contraction by a predetermined width and image expansion by said predetermined width in this order on each of said plurality of first binary image data, to thereby produce a plurality of second binary image data, said predetermined width being commonly applied to said plurality of binary images; and restoration means for adding respective values of said plurality of second binary image data at each pixel position to produce second multi-tone image data representing a corrected multi-tone image.

2. The apparatus in accordance with claim 1, further comprising:

specification means for specifying a mask area to be corrected in said multi-tone image; and data correction means for extracting an image data segment representing said mask area of said corrected multi-tone image from said second multi-tone image data, and replacing a corresponding data segment of said first multi-tone image data with said image data segment to produce third multi-tone image data representing a corrected multi-tone image.

3. The apparatus in accordance with claim 2, wherein said contraction width is at least half of a width of said mask area.

4. The apparatus in accordance with claim 2, further comprising:

means for changing a data value of said first multi-tone image in said mask area to a predetermined value.

5. The apparatus in accordance with claim 4, wherein said predetermined value represents one of a white area and a black area.

6. The apparatus in accordance with claim 1, wherein said restoration means comprises:

means for adding said plurality of second binary image data with respect to each pixel to thereby produce said second multi-tone image data.

7. The apparatus in accordance with claim 1, wherein said restoration means comprises:
means for replacing a data value of one in each of said plurality of second binary image data by respective one of said plurality of threshold values, which is used in producing respective one of said plurality of first binary image data, to produce a plurality of intermediate image data, and over-writing said plurality of intermediate image data one after another in order of said plurality of threshold values to thereby produce said second multi-tone image data.

8. An apparatus for correcting a multi-tone image comprising:
first memory for storing first multi-tone image data representing image density for every pixel in said multi-tone image;
binarization means for comparing said first multi-tone image data with each of a plurality of threshold values to thereby produce a plurality of first binary image data representing a plurality of binary images;
a second memory for storing said plurality of first binary image data;
contour extraction means for converting said plurality of first binary image data into a plurality of first contour vector data each of which represents a contour of said plurality of binary images;
contour correction means for correcting a contour of each of said plurality of binary images by executing image contraction by a predetermined width and image expansion by said predetermined width in this order on each of said plurality of first contour vector data, to thereby produce a plurality of second contour vector data said predetermined width being commonly applied to said plurality of binary images;
reconversion means for reconverting said plurality of second contour vector data to a plurality of second binary image data; and
restoration means for adding respective values of said plurality of second binary image data at each pixel position to produce second multi-tone image data representing a corrected multi-tone image.

9. The apparatus in accordance with claim 8, further comprising:
specification means for specifying a mask area to be corrected in said multi-tone image; and
data correction means for extracting an image data segment representing said mask area of said corrected multi-tone image from said second multi-tone image data, and replacing a corresponding data segment of said first multi-tone image data with said image data segment to produce third multi-tone image data representing a corrected multi-tone image.

10. The apparatus in accordance with claim 9, wherein said contraction width is at least half of a width of said mask area.

11. The apparatus in accordance with claim 9, further comprising:
means for changing a data value of said first multi-tone image in said mask area to a predetermined value.

12. The apparatus in accordance with claim 11, wherein said predetermined value represents one of a white area and a black area.

13. The apparatus in accordance with claim 8, wherein said restoration means comprises:
means for assigning a value of one to every pixel in an area at a predetermined side of said contour represented by each of said plurality of second contour vector data, and adding said assigned value with respect to each pixel to thereby produce said second multi-tone image data.

14. The apparatus in accordance with claim 8, wherein said restoration means comprises:
means for assigning respective one of said plurality of threshold values, which is used in producing respective one of said plurality of first binary image data, to every pixel in an area at a predetermined side of said contour represented by each of said plurality of second contour vector data to thereby produce a plurality of intermediate image data, and over-writing said plurality of intermediate image data one after another in order of said plurality of threshold values to thereby produce said second multi-tone image data.

15. The apparatus in accordance with claim 8, wherein said contour runs on boundaries between pixels.

16. A method of correcting a multi-tone image comprising the steps of:
(a) providing first multi-tone image data representing image density for every pixel in said multi-tone image;
(b) comparing said first multi-tone image data with each of a plurality of threshold values to thereby produce a plurality of first binary image data representing a plurality of binary images;
(c) correcting a contour of each of said plurality of binary images by executing image contraction by a predetermined width and image expansion by said predetermined width in this order on each of said plurality of first binary image data, to thereby produce a plurality of second binary image data, said predetermined width being commonly applied to said plurality of binary images; and
(d) adding respective values of said plurality of second binary image data at each pixel position to produce second multi-tone image data representing a corrected multi-tone image.

17. The method in accordance with claim 16, wherein said step (a) comprises the step of specifying a mask area to be corrected in said multi-tone image; and
said method further comprises the step of:
(e) extracting an image data segment representing said mask area of said corrected multi-tone image from said second multi-tone image data, and replacing a corresponding data segment of said first multi-tone image data with said image data segment to produce third multi-tone image data representing a corrected multi-tone image.

18. The method in accordance with claim 17, wherein said contraction width is at least half of a width of said mask area.

19. The method in accordance with claim 17, wherein said step (a) further comprises the step of changing a data value of said first multi-tone image in said mask area to a predetermined value.

20. The method in accordance with claim 19, wherein said predetermined value represents one of a white area and a black area.

21. The method in accordance with claim 16, wherein said step (d) comprises the step of adding said plurality of second binary image data with respect to each pixel to thereby produce said second multi-tone image data.

22. The method in accordance with claim 16, wherein said step (d) comprises the steps of:

replacing a data value of one in each of said plurality of second binary image data by respective one of said plurality of threshold values, which is used in producing respective one of said plurality of first binary image data, to produce a plurality of intermediate image data; and over-writing said plurality of intermediate image data one after another in order of said plurality of threshold values to thereby produce said second multi-tone image data.

23. A method of correcting a multi-tone image comprising the steps of:

(a) providing first multi-tone image data representing image density for every pixel in said multi-tone image;

(b) comparing said first multi-tone image data with each of a plurality of threshold values to thereby produce a plurality of first binary image data representing a plurality of binary images;

(c) converting said plurality of first binary image data into a plurality of first contour vector data each of which represents a contour of said plurality of binary images;

(d) correcting a contour of each of said plurality of binary images by executing image contraction by a predetermined width and image expansion in this order on each of said plurality of first contour vector date, to thereby produce a plurality of second contour vector data, said predetermined width being commonly applied to said plurality of binary images;

(e) re-converting said plurality of second contour vector data to a plurality of second binary image data; and (f) adding respective values of said plurality of second binary image data at each pixel position to produce second multi-tone image data representing a corrected multi-tone image.

24. The method in accordance with claim 23, wherein said step (a) comprises the step of specifying a mask area to be corrected in said multi-tone image; and said method further comprises the step of:

(f) extracting an image data segment representing said mask area of said corrected multi-tone image from said second multi-tone image data; and (g) replacing with said image data segment a corresponding data segment of said first multi-tone image data to produce third multi-tone image data representing a corrected multi-tone image.

25. The method in accordance with claim 24, wherein said contraction width is at least half of a width of said mask area.

26. The method in accordance with claim 24, wherein said step (a) further comprises the step of:

changing a data value of said first multi-tone image in said mask area to a predetermined value.

27. The method in accordance with claim 26, wherein said predetermined value represents one of a white area and a black area.

28. The method in accordance with claim 23, wherein said step (e) comprises the steps of:

assigning a value of one to every pixel in an area at a predetermined side of said contour represented by each of said plurality of second contour vector data; and adding said assigned value with respect to each pixel to thereby produce said second multi-tone image data.

29. The method in accordance with claim 23, wherein said step (e) comprises the steps of:

assigning respective one of said plurality of threshold values, which is used in producing respective one of said plurality of first binary image data, to every pixel in an area at a predetermined side of said contour represented by each of said plurality of second contour vector data to thereby produce a plurality of intermediate image data; and over-writing said plurality of intermediate image data one after another in order of said plurality of threshold values to thereby produce said second multi-tone image data.

30. The method in accordance with claim 23, wherein said contour runs on boundaries between pixels.

* * * * *